US009996800B2

(12) United States Patent
Mathew et al.

(10) Patent No.: US 9,996,800 B2
(45) Date of Patent: *Jun. 12, 2018

(54) SYSTEMS, APPARATUS, AND METHODS FOR GENERATING PREDICTION SETS BASED ON A KNOWN SET OF FEATURES

(71) Applicant: Zoomph, Inc., Reston, VA (US)

(72) Inventors: Thomas Mathew, Vienna, VA (US); John William Seaman, Reston, VA (US); Ali Reza Manouchehri, Reston, VA (US); Jorge Luis Vasquez, Fairfax, VA (US); Lee Evan Kohn, Arlington, VA (US)

(73) Assignee: Zoomph, Inc., Reston, VA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/347,777

(22) Filed: Nov. 9, 2016

(65) Prior Publication Data
US 2017/0169337 A1 Jun. 15, 2017

Related U.S. Application Data

(63) Continuation of application No. 14/968,596, filed on Dec. 14, 2015, now Pat. No. 9,524,469.

(51) Int. Cl.
*G06N 7/00* (2006.01)
*G06N 5/02* (2006.01)

(52) U.S. Cl.
CPC ............. *G06N 7/005* (2013.01); *G06N 5/02* (2013.01)

(58) Field of Classification Search
CPC ............ G06N 7/005; G06N 7/02; G06N 5/02
(Continued)

(56) References Cited

U.S. PATENT DOCUMENTS 9,189,750 B1 * 11/2015 Narsky ................ G06N 99/005
2004/0078809 A1 * 4/2004 Drazin ................... G06Q 30/02
725/34

(Continued)

*Primary Examiner* — Dave Misir
(74) *Attorney, Agent, or Firm* — Leila A. Kanai; Stratus Law Group PLLC

(57) ABSTRACT

An individual having a plurality of first features and a second characteristic is identified. A plurality of second features associated with a second characteristic is determined. For each first feature among the plurality of first features, a respective probability distribution indicating, for each respective second feature, a probability that a person having the respective second feature has the first feature, is determined, thereby generating a plurality of probability distributions. A probabilistic classifier is used to combine the plurality of probability distributions, thereby generating a merged probability distribution. A Monte Carlo method is used to generate a prediction set based on the merged probability distribution, the prediction set including a plurality of prediction values for the second characteristic of the individual, each respective prediction value being associated with one of the plurality of second features. The prediction set is stored in a memory. The probabilistic classifier may include a Naïve-Bayes method. Prediction sets may be generated for each of a plurality of individuals, and used to predict a feature associated with a group. For example, an advertisement may be selected and displayed based on the predicted feature.

14 Claims, 51 Drawing Sheets

(58) Field of Classification Search
USPC .......................................................... 706/52
See application file for complete search history.

(56) References Cited

U.S. PATENT DOCUMENTS

| | | | | |
|---|---|---|---|---|
| 2004/0250214 | A1* | 12/2004 | McGlinchey | G06F 9/4446 715/762 |
| 2011/0106618 | A1* | 5/2011 | Ben-Moshe | G06Q 30/02 705/14.49 |
| 2014/0244388 | A1* | 8/2014 | Manouchehri | G06Q 50/01 705/14.53 |

\* cited by examiner

FIG. 6

SYSTEMS, APPARATUS, AND METHODS FOR GENERATING PREDICTION SETS BASED ON A KNOWN SET OF FEATURES

PRIORITY AND RELATED APPLICATIONS

This application is a continuation of U.S. patent application Ser. No. 14/968,596, filed on Dec. 14, 2015, which is hereby incorporated by reference herein in its entirety as if set forth herein.

TECHNICAL FIELD

This specification relates generally to systems, apparatus, and methods for predicting data, and more particularly to systems, apparatus, and methods for generating prediction sets for a characteristic based on a known set of features.

BACKGROUND

Social media has become a big part of the Internet. Many social media companies exist that allow users to post and share information to their network of friends. Companies and brands constantly search for opportunities to use such data to increase brand value. Monetizing on that data however, can be troublesome and burdensome because of the vast amount of data that need to be sifted through. One challenge faced by brands is that many attributes of an audience (such as gender, ethnicity, age, etc.) that is talking about a brand or topic on social media are hidden by the author because of privacy concerns.

For marketers and advertisers, analyzing demographic information concerning a target audience can provide valuable information. Knowledge of the demographics of a crowd of people at a venue such as a stadium can be very helpful in selecting appropriate advertisements to display to the crowd. Knowledge of the demographics of people reacting to a marketing campaign on social media can be helpful in market research. In other fields as well, obtaining accurate insight into individuals' behavior, of economic activity, etc., can provide useful information. Many companies and organizations frequently generate predictions for such unknown variables based on one or more known variables. However, in many instances obtaining accurate predictions for a desired item of information can be difficult. In many existing systems, simplistic assumptions are made to generate a prediction, often producing inaccurate results.

SUMMARY

In general, one innovative aspect of the subject matter described in this specification may be embodied in methods that include the actions of filtering social media data for content resources that match one or more search terms; providing the content resources to a user interface; receiving a selection of one or more of the content resources; receiving a selection to create a new visual based on data received; creating a visualization instance; and providing the visualization instance to be displayed on the user interface.

Other embodiments of these aspects include corresponding systems, apparatus, and computer-readable medium storing software comprising instructions executable by one or more computers, which cause the computers to perform the actions of the methods.

Another innovative aspect of the subject matter described in this specification may be embodied in methods that include the actions of receiving visualization settings at a server visualization loader; identifying visualization data sources; creating a visualization controller from the visualization data sources, visualization structure and visualization settings; providing to a visualization instance manager the visualization controller and generated visualization style; and creating with the visualization instance manager a visualization instance based on the visualization controller and generated visualization style.

Other embodiments of these aspects include corresponding systems, apparatus, and computer-readable medium storing software comprising instructions executable by one or more computers, which cause the computers to perform the actions of the methods.

Another innovative aspect of the subject matter described in this specification may be embodied in methods that include the actions of selecting all elements on a webpage, by a client loader that have a first attribute and make a request to a server loader for a visualization manager, including the value of all of the attributes. For each of the visual identifications sent with the request, look up the html, less, js, settings, and data sources by a server loader; running, at the server loader, each of a number of styles through a style generator with the associated settings; building by the server loader, the client instance manager and injecting the generated styles with the controllers; appending the styles for each of the loaded instances into a head of the webpage by the client instance manager; wait for the page to finish loading its own elements at the client instance manager; expose an API for interacting with instances at the client instance manger; and construct each of the Visual Instances using the controller at the client instance manager.

Other embodiments of these aspects include corresponding systems, apparatus, and computer-readable medium storing software comprising instructions executable by one or more computers, which cause the computers to perform the actions of the methods.

Another innovative aspect of the subject matter described in this specification may be embodied in methods that include the actions of filtering social media data for content resources; providing the content resources to a user interface; receiving a selection to create a new visual based on the content resources; creating a visualization instance based on settings associated with the new visual; and providing the visualization instance to be displayed on the user interface.

Other embodiments of these aspects include corresponding systems, apparatus, and computer-readable medium storing software comprising instructions executable by one or more computers, which cause the computers to perform the actions of the methods.

Another innovative aspect of the subject matter described in this specification may be embodied in methods that include the actions of identifying social media data for content resources based on preferences; receiving a selection to create a new visual for the content resources; identifying advertisements associated with the content resources; creating a visualization instance for the advertisements or the content resources based on settings associated with the new visual; providing the visualization instance to be displayed on the user interface.

In accordance with an embodiment, a system includes a processor, a memory communicatively coupled to the processor, and an individual data object store, communicatively coupled to the processor, configured to store a plurality of individual data objects each defining features of a respective individual. The system also includes a prediction set store, communicatively coupled to the processor, configured to store a plurality of prediction sets, and a prediction module, communicatively coupled to the memory, configured to identify an individual having a plurality of first features, generate an individual data object comprising data specifying the first features, store the individual data object in the individual data object store, for each first feature among the plurality of first features, determine a respective probability distribution indicating, for each respective second feature among a plurality of second features, a probability that a person having the respective second feature has the first feature, thereby generating a plurality of probability distributions, use a probabilistic classifier to generate a merged probability distribution based on the plurality of probability distributions, use a Monte Carlo method to generate a prediction set based on the merged probability distribution, the prediction set including a plurality of prediction values for the individual, each respective prediction value being associated with one of the plurality of second features, and store the prediction set in the prediction set store.

In one embodiment, the probabilistic classifier includes a Naive-Bayes method.

In another embodiment, the prediction module is further configured to define a scale comprising a plurality of numerical ranges, based on the merged probability distribution, and associate each of the plurality of numerical ranges of the scale with a respective second feature, based on the merged probability distribution.

In another embodiment, the prediction module is further configured to generate a plurality of random numbers, and generate a prediction set associated with a particular individual based on the plurality of random numbers.

In another embodiment, the prediction module is further configured to perform the following steps for each random number among the plurality of random numbers: identify, from among the plurality of numerical ranges, a particular numerical range associated with the respective random number, identify a second feature associated with the particular numerical range, and associate the respective random number with the identified second feature.

In another embodiment, the system further includes an advertisement module, communicatively coupled to the memory, configured to identify a plurality of individuals attending a live event at a venue, and determine a plurality of prediction sets associated with the plurality of individuals, select an advertisement image based on the plurality of prediction sets, and display the advertisement image on a display device associated with the plurality of individuals.

In another embodiment, the venue is one of a stadium, a conference center, a public space, and a commercial mall.

In another embodiment, the prediction module is further configured to determine a second probability distribution indicating, for each respective second feature, a probability that a person has the second feature, and use a probabilistic classifier to generate a merged probability distribution based on the plurality of probability distributions and the second probability distribution.

In accordance with another embodiment, a system for generating predictions of demographic information includes a processor, a memory communicatively coupled to the processor, and an individual feature store, communicatively coupled to the processor, configured to store a plurality of individual feature objects, an individual object comprising data indicating one or more features of an individual. The system also includes a prediction manager component communicatively coupled to the memory, the prediction manager component configured to receive information related to a plurality of individuals, and use a probabilistic classifier and a Monte Carlo method to generate a plurality of prediction sets associated with the plurality of individuals, based on the information, wherein each prediction set comprising a plurality of test results. The system also includes an advertisement module, communicatively coupled to the memory, configured to select an advertisement image based on the plurality of prediction sets, and display the advertisement image on a display device associated with the plurality of individuals.

In one embodiment, the prediction manager is further configured to identify a plurality of first features of the particular individual, for each first feature among the plurality of first features, determining a respective probability distribution indicating, for each respective second feature among a plurality of second features, a probability that a person having the respective second feature has the first feature, thereby generating a plurality of probability distributions, use a probabilistic classifier to generate a merged probability distribution based on the plurality of probability distributions, and use a Monte Carlo method to generate the prediction set based on the merged probability distribution.

In another embodiment, the probabilistic classifier includes a Naive-Bayes method.

In another embodiment, the prediction module is further configured to define a scale comprising a plurality of numerical ranges, based on the merged probability distribution, and associate each of the plurality of numerical ranges of the scale with a respective second feature, based on the merged probability distribution.

In another embodiment, the prediction module is further configured to generate a plurality of random numbers, and generate a prediction set associated with a particular individual based on the plurality of random numbers.

In another embodiment, the prediction module is further configured to perform the following steps for each random number among the plurality of random numbers: identify, from among the plurality of numerical ranges, a particular numerical range associated with the respective random number, identify a second feature associated with the particular numerical range, and associate the respective random number with the identified second feature.

In accordance with an embodiment, a system is provided. The system includes a feed module adapted to generate a feed comprising a plurality of items of social media content. The system also includes a template store adapted to store a plurality of templates, wherein each template includes a respective data source generator and a settings module. The system also includes a visual generation manager adapted to provide a first user interface displaying a plurality of icons each representing a respective one of the plurality of templates, receive from the user a selection of a template from the plurality of templates, provide a second user interface prompting the user to specify one or more settings, receive from the user settings information specifying the one or more settings, generate a visual instance comprising the settings information and a data source, wherein the data source comprises code adapted to render at least a portion of a visual based on the settings information and on one or more items of social media content selected from the feed, and store the visual instance in a memory. The system further includes a visual instance loader adapted to cause the visual instance to render a visual based on the settings information and on one or more items of social media content selected from the feed.

In one embodiment, the feed module obtains items of social media content including one of a message, a comment, a photo, and a video posted to an online social networking service.

In another embodiment, the plurality of templates include a first template for generating a first visual instance adapted to generate a first visual that includes a line graph of social media activity, a second template for generating a second visual instance adapted to generate a second visual that includes a heat map of social media activity, and a third template for generating a third visual instance adapted to generate a third visual that includes a sentiment analysis of social media activity.

In another embodiment, the system also includes at least one processor adapted to add to an item of social media content a tag defining a characteristic of the item of social media content.

In another embodiment, the at least one processor is further adapted to identify an individual attending a live event taking place in a venue, select an item of social media content associated with the individual, the item of social media content having a first tag, select an advertisement image having a second tag that matches the first tag, generate a visual instance adapted to display the selected item of social media content and the advertisement image simultaneously, and cause the visual instance to display the selected item of social media content and the advertisement image simultaneously on a display device located in the venue.

In another embodiment, the venue is one of a stadium, a conference center, a retail store, and a commercial mall.

In accordance with an embodiment, a system includes a processor, a memory communicatively coupled to the processor, and an individual data object store, communicatively coupled to the processor, configured to store a plurality of individual data objects each defining features of a respective individual. The system also includes a prediction set store, communicatively coupled to the processor, configured to store a plurality of prediction sets. The system also includes a prediction module, communicatively coupled to the memory, configured to identify an individual having a plurality of first features, generate an individual data object comprising data specifying the first features, and store the individual data object in the individual data object store. The prediction module is also configured to, for each first feature among the plurality of first features, determine a respective probability distribution indicating, for each respective second feature among a plurality of second features, a probability that a person having the respective second feature has the first feature, thereby generating a plurality of probability distributions, use a probabilistic classifier to generate a merged probability distribution based on the plurality of probability distributions, use a Monte Carlo method to generate a prediction set based on the merged probability distribution, the prediction set including a plurality of prediction values for the individual, each respective prediction value being associated with one of the plurality of second features, and store the prediction set in the prediction set store.

In one embodiment, the probabilistic classifier includes a Naive-Bayes method.

In another embodiment, the prediction module is further configured to define a scale comprising a plurality of numerical ranges, based on the merged probability distribution, and associate each of the plurality of numerical ranges of the scale with a respective second feature, based on the merged probability distribution.

In another embodiment, the Monte Carlo method is further configured to generate a plurality of random numbers, and generate a prediction set associated with a particular individual based on the plurality of random numbers.

In another embodiment, the Monte Carlo method is further configured to perform the following steps for each random number among the plurality of random numbers: identify, from among the plurality of numerical ranges, a particular numerical range associated with the respective random number, identify a second feature associated with the particular numerical range, and associate the respective random number with the identified second feature.

In another embodiment, the system further includes an advertisement module, communicatively coupled to the memory, the advertisement module further configured to identify a plurality of individuals attending a live event at a venue, determine a plurality of prediction sets associated with the plurality of individuals, select an advertisement image based on the plurality of prediction sets, and display the advertisement image on a display device associated with the plurality of individuals.

In accordance with another embodiment, a method is provided. A visual template is selected from a plurality of stored visual templates, wherein the visual template includes a data source generator and a settings module, a user interface indicating one or more settings that must be specified to create the visual instance is provided, and settings information specifying the one or more settings are received from a user. A visual instance is generated based on the visual template and the settings information, the visual instance comprising the settings information and a data source adapted to render a visual based on the settings information and on one or more items of social media content selected from a feed. The visual instance is stored in a memory. The visual instance is caused to display the visual.

In accordance with an embodiment, a method is provided. An individual having a plurality of first features and a second characteristic is identified. A plurality of second features associated with a second characteristic are determined. For each first feature among the plurality of first features, a respective probability distribution indicating, for each respective second feature, a probability that a person having the respective second feature has the first feature, is determined, thereby generating a plurality of probability distributions. A probabilistic classifier is used to generate a merged probability based on the plurality of probability distributions. A Monte Carlo method is used to generate a prediction set based on the merged probability distribution, the prediction set including a plurality of prediction values for the second characteristic of the individual, each respective prediction value being associated with one of the plurality of second features. The prediction set is stored in a memory.

In one embodiment, the probabilistic classifier includes a Naive-Bayes method.

In another embodiment, a scale comprising a plurality of numerical ranges is defined, based on the merged probability distribution. Each of the plurality of numerical ranges of the scale is associated with a respective second feature, based on the merged probability distribution.

In another embodiment, a plurality of random numbers is generated, and a prediction set is generated based on the plurality of random numbers.

In another embodiment, the following steps are performed for each random number among the plurality of random numbers: a particular numerical range associated with the respective random number is identified, from among the plurality of numerical ranges, a second feature associated with the particular numerical range is identified, and the respective random number is associated with the identified second feature.

In another embodiment, a plurality of individuals attending a live event at a venue are identified, and a plurality of prediction sets associated with the plurality of individuals are generated.

In another embodiment, an advertisement image is selected based on the plurality of prediction sets, and the advertisement image is displayed on a display device associated with the plurality of individuals.

In another embodiment, the venue is one of a stadium, a conference center, a public space, and a commercial mall.

In another embodiment, a second probability distribution indicating, for each respective second feature, a probability that a person in a population has the second feature, is determined. A probabilistic classifier is used to generate a merged probability distribution based on the plurality of probability distributions and the second probability distribution.

In accordance with another embodiment, a system includes at least one memory adapted to store data defining features of one or more individuals, and at least one processor. The at least one processor is adapted to identify an individual having a plurality of first features and a second characteristic and determine a plurality of second features associated with a second characteristic. The at least one processor is also adapted to perform the following step for each first feature among the plurality of first features: determine a respective probability distribution indicating, for each respective second feature, a probability that a person having the respective second feature has the first feature, thereby generating a plurality of probability distributions. The at least one processor is further adapted to use a probabilistic classifier to combine the plurality of probability distributions, thereby generating a merged probability distribution, use a Monte Carlo method to generate a prediction set based on the merged probability distribution, the prediction set including a plurality of prediction values for the second characteristic of the individual, each respective prediction value being associated with one of the plurality of second features, and store the prediction set in the at least one memory.

In accordance with another embodiment, a system for generating predictions of demographic information, the system includes a processor, a memory communicatively coupled to the processor, an individual feature store, communicatively coupled to the processor, configured to store a plurality of individual data objects, an individual data object comprising data indicating one or more features of an individual, and a prediction manager component communicatively coupled to the individual feature store, the prediction manager component configured to receive information related to a particular individual, and create and store in the individual data store a prediction set comprising a plurality of test results.

In accordance with another embodiment, a system includes a plurality of display devices located at respective locations in a venue and at least one memory adapted to store data defining features of one or more individuals. The system also includes at least one processor adapted to identify a plurality of individuals at a venue, the plurality of individuals associated with a particular location in the venue, obtain a plurality of prediction sets associated with the plurality of individuals, select an advertisement image based on the plurality of prediction sets, and display the selected advertisement image on a particular display device associated with the particular location.

In one embodiment, the at least one processor is further adapted to add a first tag to the advertisement image, obtain an item of social media content associated with at least one of the individuals among the plurality of individuals, add a second tag to the item of social media content, and display the item of social media content and the advertisement image on the particular display device, if the first tag matches the second tag.

Other embodiments of these aspects include corresponding systems, apparatus, and computer-readable medium storing software comprising instructions executable by one or more computers, which cause the computers to perform the actions of the methods.

Further embodiments, features, and advantages, as well as the structure and operation of the various embodiments are described in detail below with reference to accompanying drawings.

BRIEF DESCRIPTION OF THE FIGURES

Embodiments are described with reference to the accompanying drawings. In the drawings, like reference numbers may indicate identical or functionally similar elements.

FIGS. 3-12 are screenshots of the engagement platform.

DETAILED DESCRIPTION

A system will be described that allows users to create visualizations.

Figure 1:
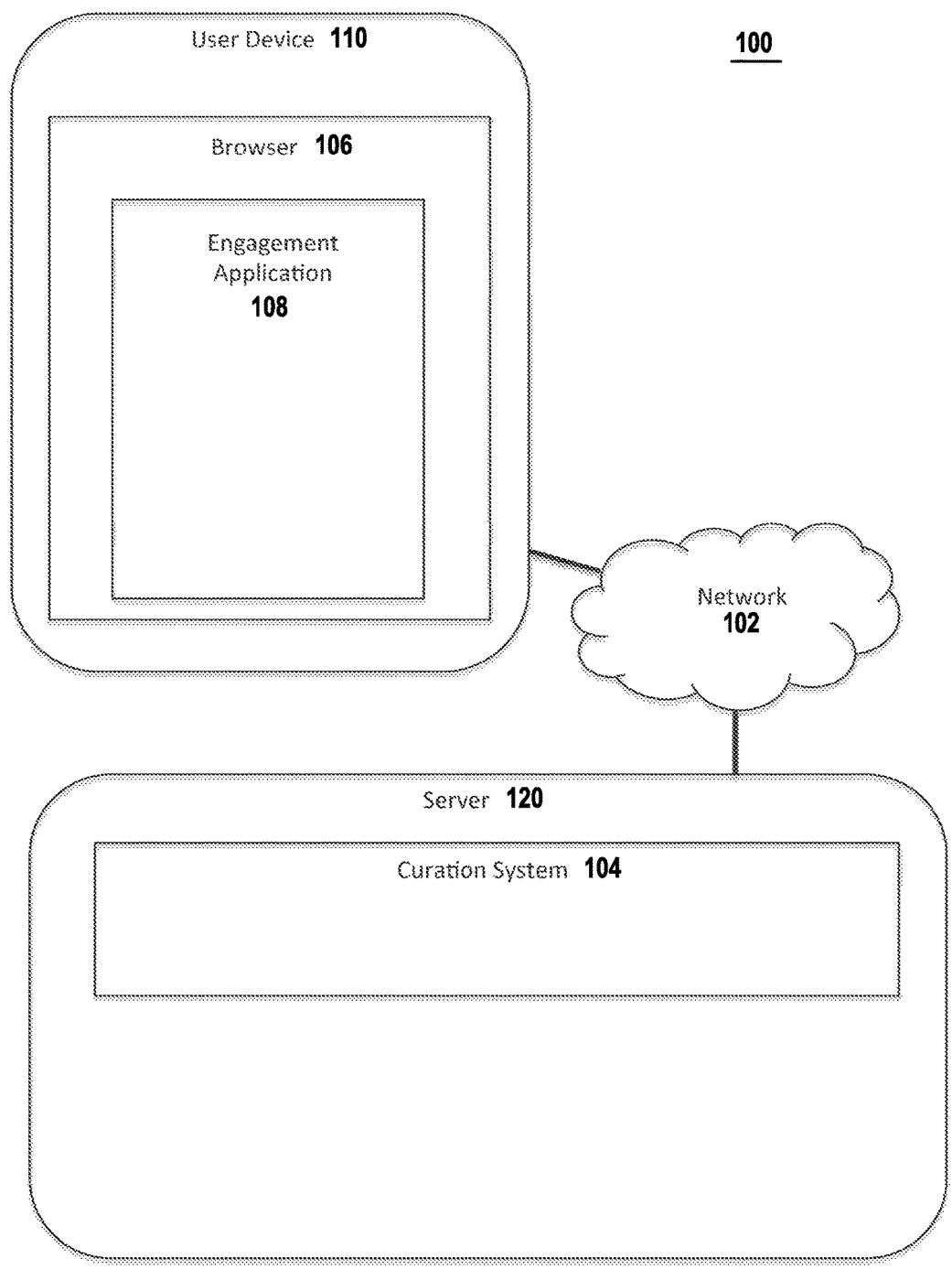
FIG. 1 illustrates a system for an engagement platform.

FIG. 1 illustrates an example of a networked system 100 of devices, perhaps mobile devices such as mobile phones, tablets or computers. The devices may be networked over network 102. Network 102 may be any network or combination of networks that can carry data communications. Such a network 102 may include, but is not limited to, a local area network, metropolitan area network, and/or wide area network such as the Internet. Network 102 can support protocols and technology including, but not limited to, World Wide Web (or simply the "Web"), protocols such as a Hypertext Transfer Protocol ("HTTP") and HTTPS protocols, and/or services. Intermediate web servers, gateways, or other servers may be provided between components of the system shown in FIG. 1, depending upon a particular application or environment.

A user may operate a user interface on user device 110 to create engagement content on server 120. User device 110 may be coupled to server 120 over network 102. Server 120 includes curation system 104, which may be used to provide information to user device 110. Engagement application 108 may be implemented on or implemented with one or more computing devices, such as user device 110.

In one embodiment, the functionality of engagement application 108 and/or curation system 104 may be provided through a browser 106 on computing devices, such as user device 110. Curation system 104 on server 120 may host the service and serve it to device 110 and any other computing devices. Any combination of implementations may provide, through a browser, the functionality represented by the example implementations of systems 108 and 110 shown in FIG. 1 and in the screenshots and flowchart of FIGS. 3-14. Any stages shown in flowchart of FIG. 14 that involve displaying content may be considered to provide the content for display in a browser.

Browser 106 may be any commonly used browser, including any multi-threaded or multi-process browser. In one embodiment, the functionality of engagement application 108 can be provided through browser 106. The functionality of any of the components or flowcharts shown in the figures may be provided through the browser executed on device 110, server 120 or any other computing device. The web pages or application provided through the browser may be served from server 120, device 110, or any other computing device. Different windows or views may be shown through browser 106.

In one embodiment, users can monitor social media data and create visualizations around the data. A visualization is a packaged set of resources that can be loaded into a web page. Each visualization contains definitions for structure, style, and functionality. The visualizations are data driven and can implement multiple data sources. They also expose configurable settings. Structure: The structure of the visualization is defined using HTML. Rather than defining an entire page, the HTML only defines a fragment of HTML that will be injected into an existing page. Style: The style of the components is defined using the Less language. The Less is then compiled to CSS against the visualization settings and a built-in library of Less Mixins and Less Variables. Functionality: The functionality of the visualization is defined using JavaScript and is used by the client's browser to instantiate the visualization. Settings: Settings for the visualization can be broken into two categories: style and functionality. Style settings are converted into Less variables and injected into style defined for the visualization.

Functionality settings are converted into a JavaScript object and injected into the JavaScript controller. All settings not otherwise designated are injected into the JavaScript controller as a JavaScript object. These settings are used to allow the users to configure the functionality of the visualization. Data Sources: Data sources define what data the visualization will consume. The data source definitions are injected into the JavaScript controller, optionally along with the actual data. If the data is not included in the initial load, it can be loaded asynchronously. Loader: Part of embedding a visualization into a page is including a small client-side loading script. The client-side loading script finds all embeds on the page and sends one batch load request to the server. The server then dynamically builds a script to send back to the client. The script contains the initialization functions for each of the visualizations. Once the script is sent back to the client, it initializes all of the visualizations and tracks them through the lifetime of the page. It also defines an API for interacting with the visualizations.

The JavaScript controller can reside on the server visualization loader, which can all reside on the server 120 and/or the curation system 104. In one embodiment, the visualizations can be for the advertisements associated with the social media data as described further below. The data sources can reside on server 120. In one embodiment, the server visualization loader is the server 120. The visualization instance manager can reside on user device 110. In one embodiment, the visualization instance manager is the engagement application 108. In another embodiment, the visualization instance manager is on the user device 110 along with the engagement application 108.

In one embodiment, from a dashboard a user can select to create a new visual. They then select a category and a specific template. The user gives the visual a title and selects a feed to use as a default data source. The feed is a social media conversation as described in further detail below. The user can edit the settings related to the visualization. The visualization is then embedded in to a webpage.

The edit page a user can use to edit the settings provides color picker controls, calendar picker controls, file upload controls, and other custom controls as well as validation on input and a much better user experience. It is not possible to enter invalid configuration through this page but it is also more restrictive to the values that can be entered. Additional settings can be added to instances latter by the end user through the advanced edit screen but those additional setting would not be available to edit through the normal edit page.

Figure 2:
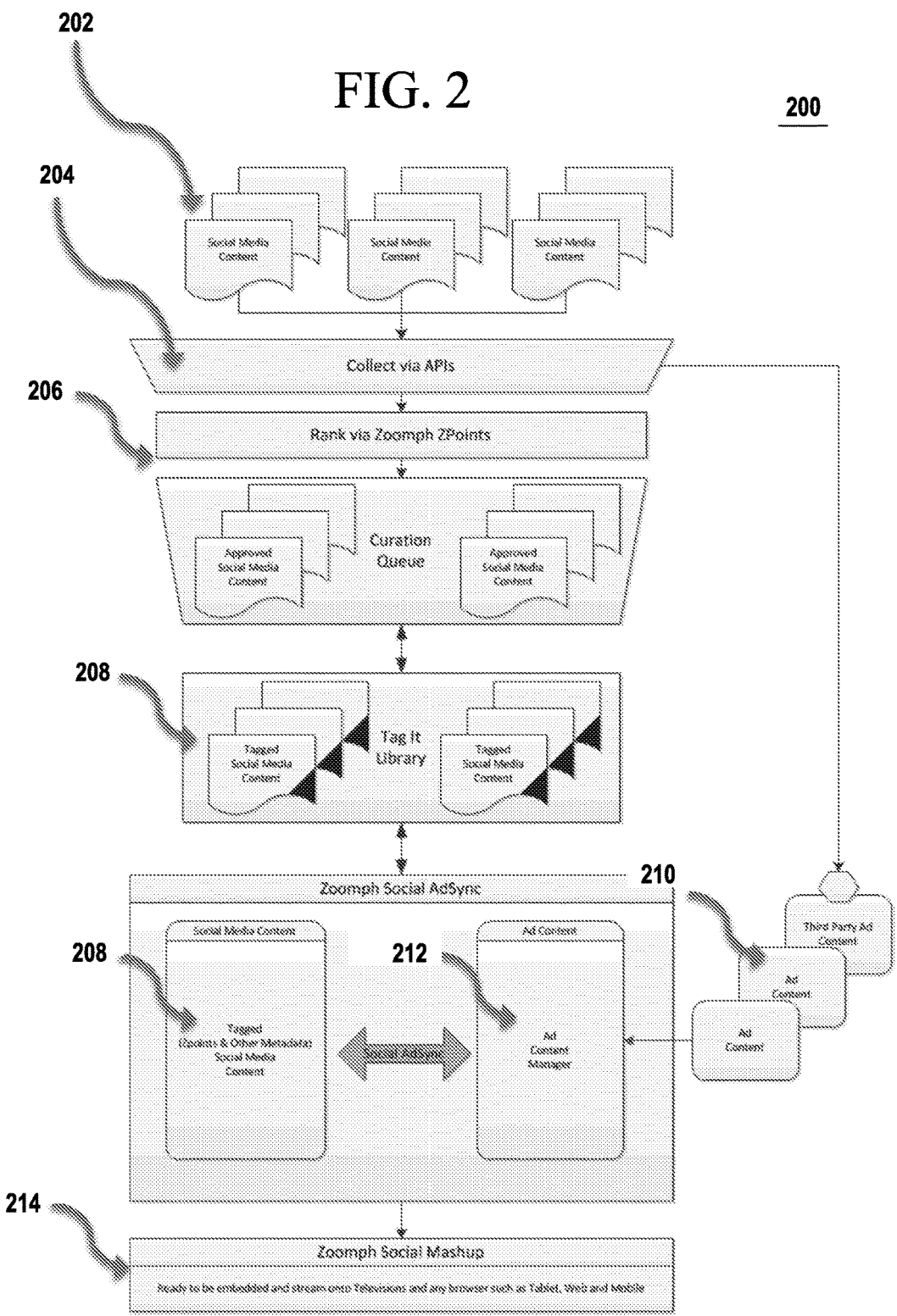
FIG. 2 illustrates a system for an engagement platform.

FIG. 2 is a block diagram 200 of the functionality of engagement application 108 and the curation system 104. The curation system 104 in combination with the engagement application 108 collects social content 202 by providing its users with the ability to retrieve content from social media platforms such as Twitter (an online social networking service that enables users to send and read short 140-character messages called "tweets"), Facebook (an online social networking service that allows users to create a profile page, post information, comments, photos and videos, exchange messages, etc.) and Instagram (an online social networking and online photo-sharing and video-sharing service) as well as others. Content is collected via Application Programming Interface (API) 204 from Twitter Stream API, Facebook Social Graph API, Instagram API, and other third party APIs. The curation system 104 in combination with the curation system 108 also allows users to create visualizations in connection with the collected social content 202.

Using points, users can rank social media content 206. One way users can rank content is by measuring its influence. Curation system 104 ranks the influence of social media content by using its own proprietary algorithm. The algorithm ranks the influence of social media content, as content is inserted onto the database, by providing a point score.

Points measure influence within the context of a social media conversation. With Points the influence of both who is speaking and what is being said can be measured. Points measures the influence of authors as well as the influence of the content shared on social media itself.

In one embodiment, the point system can use different factors to generate points for each content resource. There are four factors that can be used: the origination of the content resource, the content of the content resource (whether its images, text, or video), the number of subscribers (followers and friends) of the author of the content resource or the individual(s) that rebroadcast/reused the content resource, and the rating of the content resource (likes, favorites, comments, retweets, reply's, shares etc.). A like is an indication by a user that they prefer or they like a content resource. A favorite is when a user saves a content resource as a resource that they want to keep as a favorite. Each content resource can include comments by other users. A retweet is when a content resource is broadcast again by a different user. A share is when a user shares a content resource with one or more other individuals. Each of these likes, favorites, comments, retweets, replys, shares, etc can be counted for each content resource. Curation system 104 can combine these factors and these counts in a number of ways to determine the score, for example adding them or multiplying them.

In one embodiment, a weight can be assigned to different factors as well, for example, a weight of 3 may be added for a content resource that is liked versus a content resource that is not. Curation system 104 can apply the weight to each resource's count for example in determining the point score.

Curation system 104 can keep track of all the relevant data within a conversation, and utilizes the data to estimate the attention given to any author or piece of content.

Figure 3:
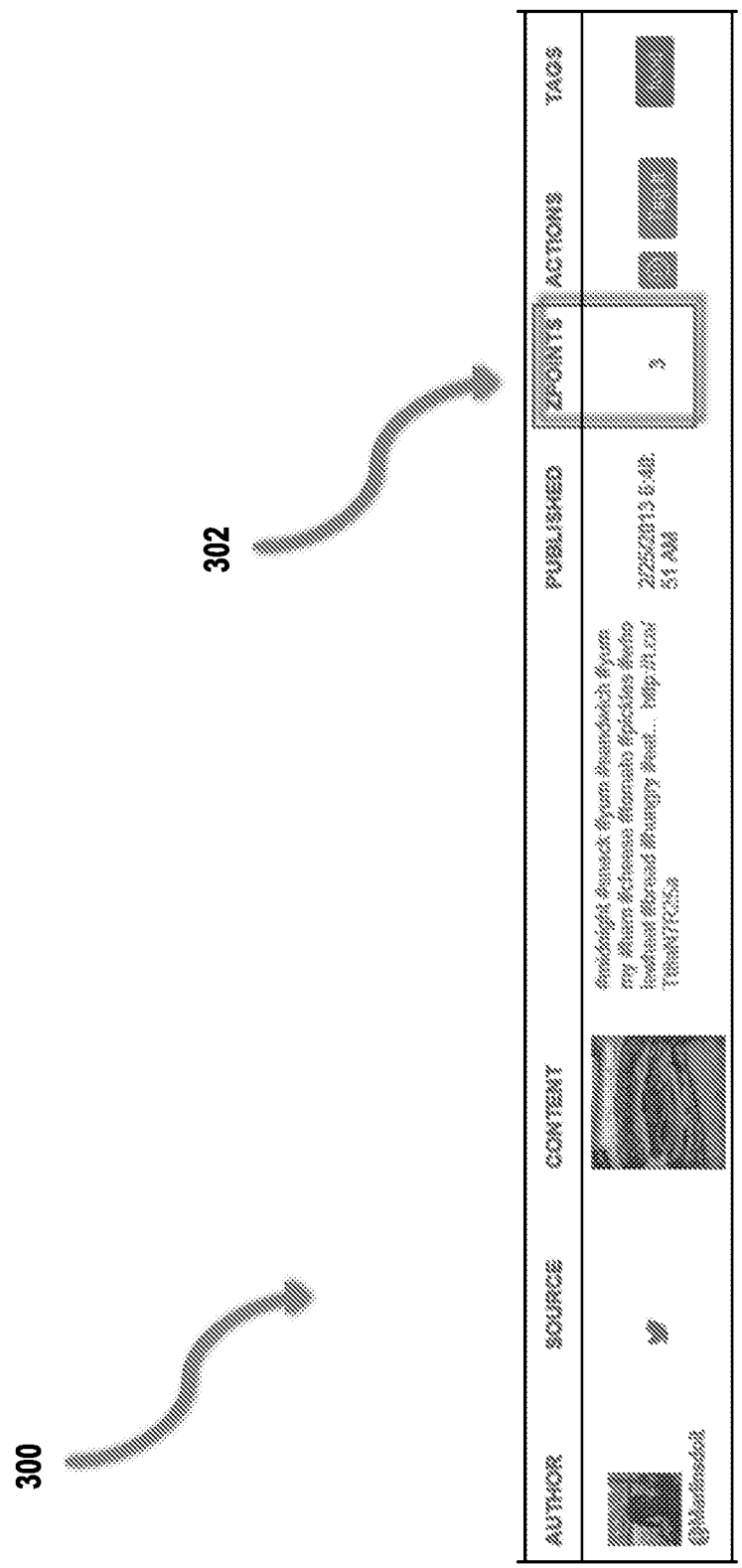

The algorithm updates the Points score for social media content at predefined intervals to constantly serve the most real-time Points score, as shown in FIG. 3. FIG. 3 displays one piece of content 300. The points score shown is ZPoints 302. In this example, the Points are called ZPoints but can be called by any name. The Points scores are updated in real-time to reflect the potentially rapid additions, changes, etc. to social media conversations. Items, authors and feeds' influence are accumulated over time to show cumulative totals of influence for each item, author or feed.

In one embodiment, social media content can be curated. In a curation queue in curation system 104, users can view content and determine an action to take on that content. The curation queue provides its users with the ability change the status of social media content, or content resources, with status such as Pending, Approved, Rejected, Spam, Q&A. Users can tag each content piece or content resource. Tagging is the ability to take social media content and append additional metadata. Tagging is done in order to classify and organize social media content so that the system can serve up the most applicable social media content alongside the appropriate advertisements. Tagged social media content 208 can then be created. The tagged social media content 208 can be matched with ad content 210 by an ad manager 212. A content display 214 can be generated with the tagged social media content 208 and the ad content 210.

Figure 4:
Figure 5:
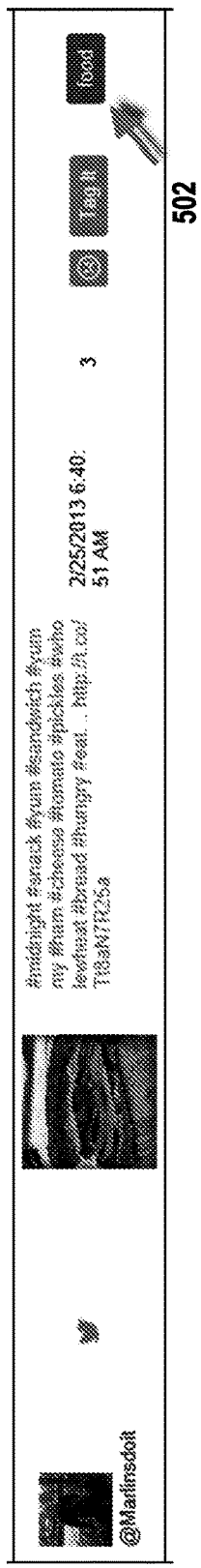

FIG. 4 shows a curation queue 400 with tagging functionality. Curation system 104 tags social media content by providing a tagging functionality. The tagging functionality provides for various tagging features. Manual text Tagging is a feature to allow users to manually tag social media content. Intelligent Text Tagging is feature to auto-tag text-based social media content.

The process to manually tag can be summarized in four steps. The user identifies content to be tagged in the curation queue. The user clicks the "tag it" button associated with the item. Engagement system 108 can prompt the user to type in a keyword in a free-form text field. Engagement system 108 appends that keyword metadata to the social media content resource and save the tag in the "Tag It" Library. Curation system 104 can store the keyword metadata appended to the social media content resource.

Intelligent image tagging is a feature to auto-tag image-based social media content. The process to intelligent image tagging can be summarized in four steps. Curation system 104 automatically identifies an image within the social media content resource to be tagged in the curation queue.

Curation system 104 leverages image recognition services (internally or via third party API) to processes and recommend tags.

Curation system 104 can include an image recognition service that can identify objects in images (logos, Places, Faces, Products, Text). The objects can be sent to a service to be identified. For example, a third party service that can identify objects in images. In another embodiment, a database can be would be used as a service, that would match database object, which would be pre-tagged with metadata. These database objects, would then be compared against image objects. If a match is made, then the tags from the database objects are copied onto the image object.

The service then provides us additional information in the form of tags (metadata) for the objects through the API back to curation system 104.

Curation system 104 can access a "Tag It Library" to retrieve any existing and applicable tags or creates a new tag to append as metadata to the specific social media item (image). A user can override or adjust the tag that was automatically associated with the image for verification and accuracy.

In one embodiment, in the manual tagging process, a user is able to click on a "Tag It" button in the curation queue, as well as being able to create tags, and use existing tags, and attach one or more tags to social media content. A use can click on a "Done" button in order to save the selected tag(s). As shown in the example, the tag can then appear alongside the actions in the "Tag" column 'Food' as shown in the tag 502 of FIG. 5

Figure 6:
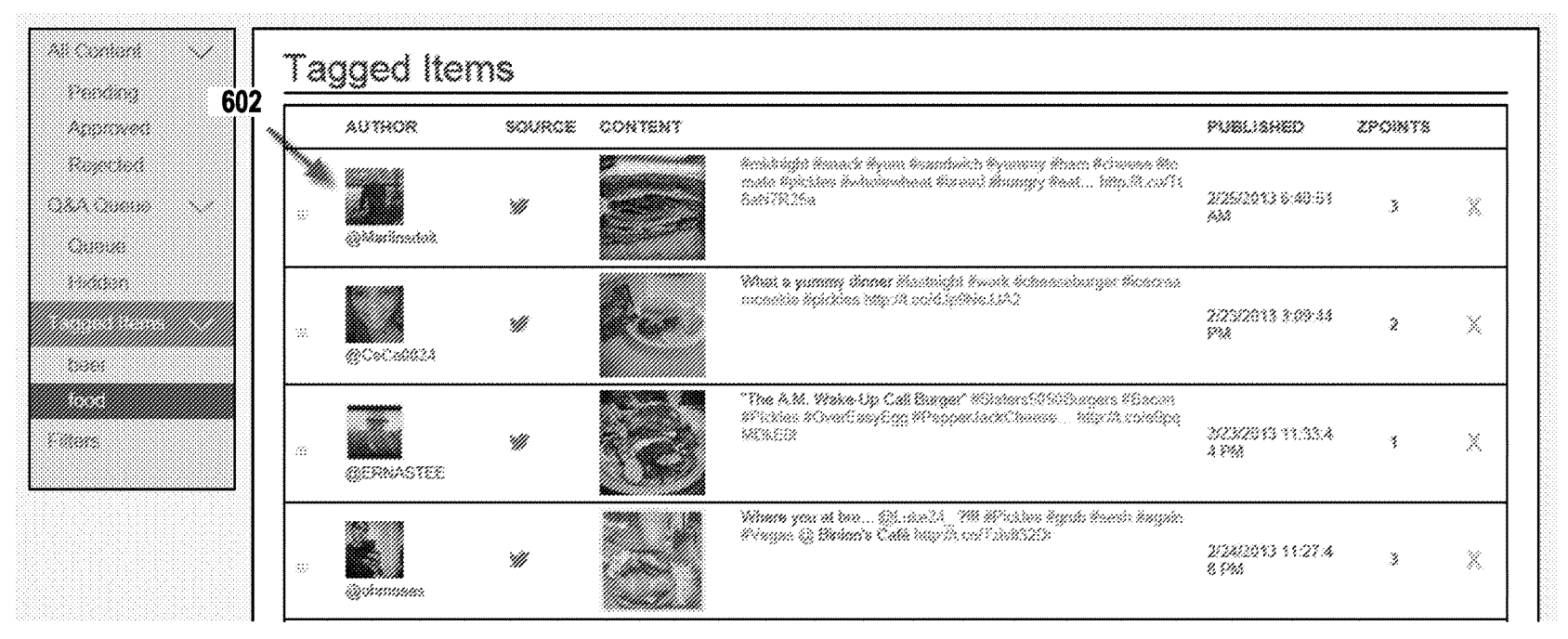

By saving the selected tag, the social media content can appear under the "Tagged Items Queue" 602 as shown in FIG. 6. If a user needs to remove a tag from an item they can do so from the "Tagged Items Queue" by clicking the "x" alongside the content. Once a tag is added to social media content, it is instantly available for use by curation system 104.

In one embodiment, curation system 104 provides the ability to create content displays, or they may be called Social Mashups, which are a combination of various data: curated, tagged social media content (text and images) ranked by points and advertisements (uploaded through the curation system 104 or integrated through 3$^{rd}$ party ad engines).

Curation system 104 allows users to bring together relevant and influential data, based on points scores, social media content from multiple platforms and conversations by selecting: 1. A layout to display social media content alongside relevant ads 2. social content types: trends clouds, streaming social content, and streaming Social pictures 3. ad content, and 4. conversation source, which are feeds.

A feed is a social media conversation defined by designated search terms i.e. keywords, #hash tags and @handles. The feed includes social media data that is curated.

Trend clouds are visual depictions of frequently used words in social media conversations. Streaming social content relates to scrolling text displaying the curated and tagged text. Streaming social pictures are revolving photos displaying the curated and tagged images. Again, all influential social media content would be ranked and selected to be used with points.

A content display combines various data; curated, tagged social media content (text and images) ranked by points, and advertisements (uploaded through content curation system 104 or integrated through 3$^{rd}$ party ad engines).

Figure 7:
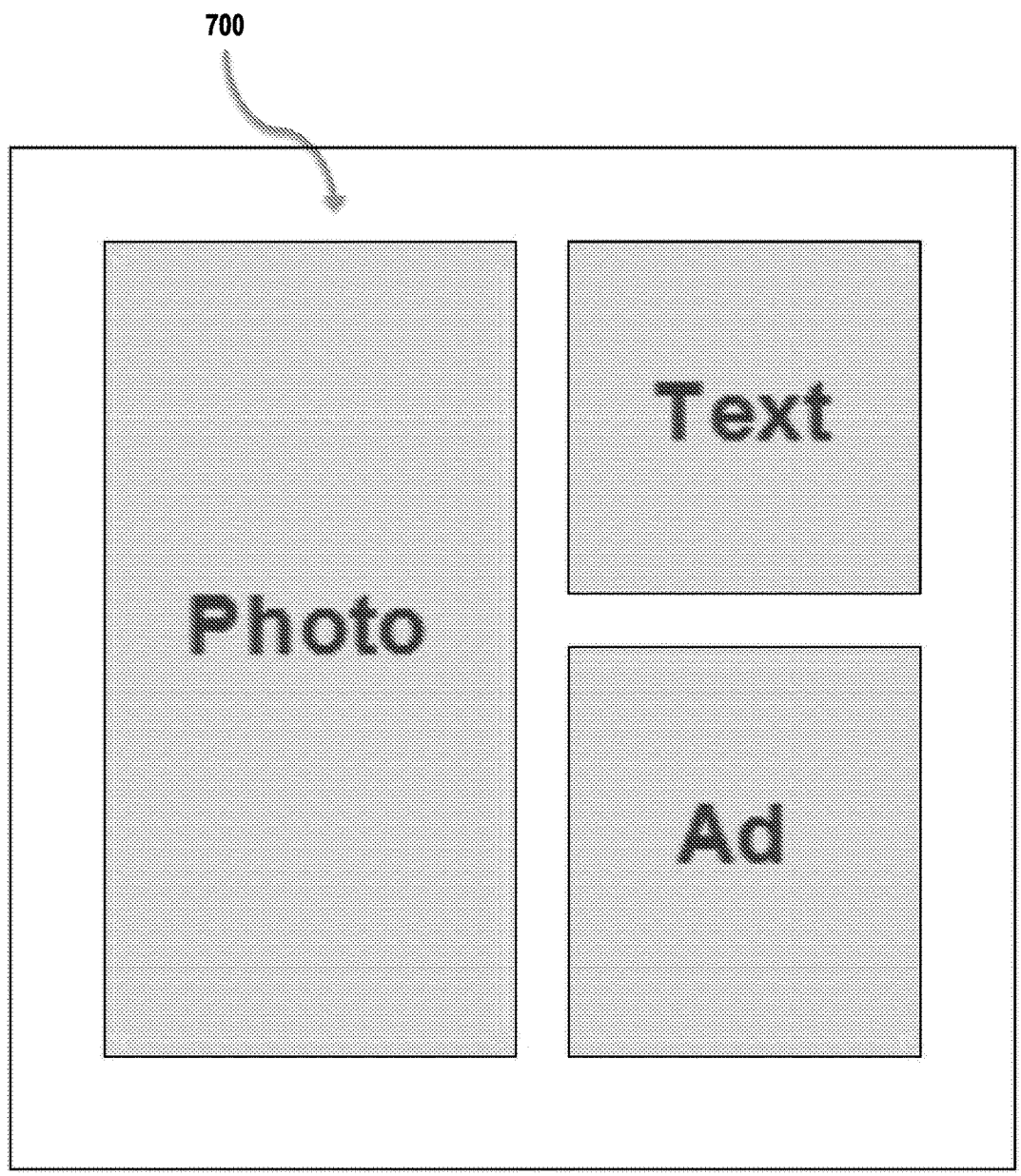
Figure 8:
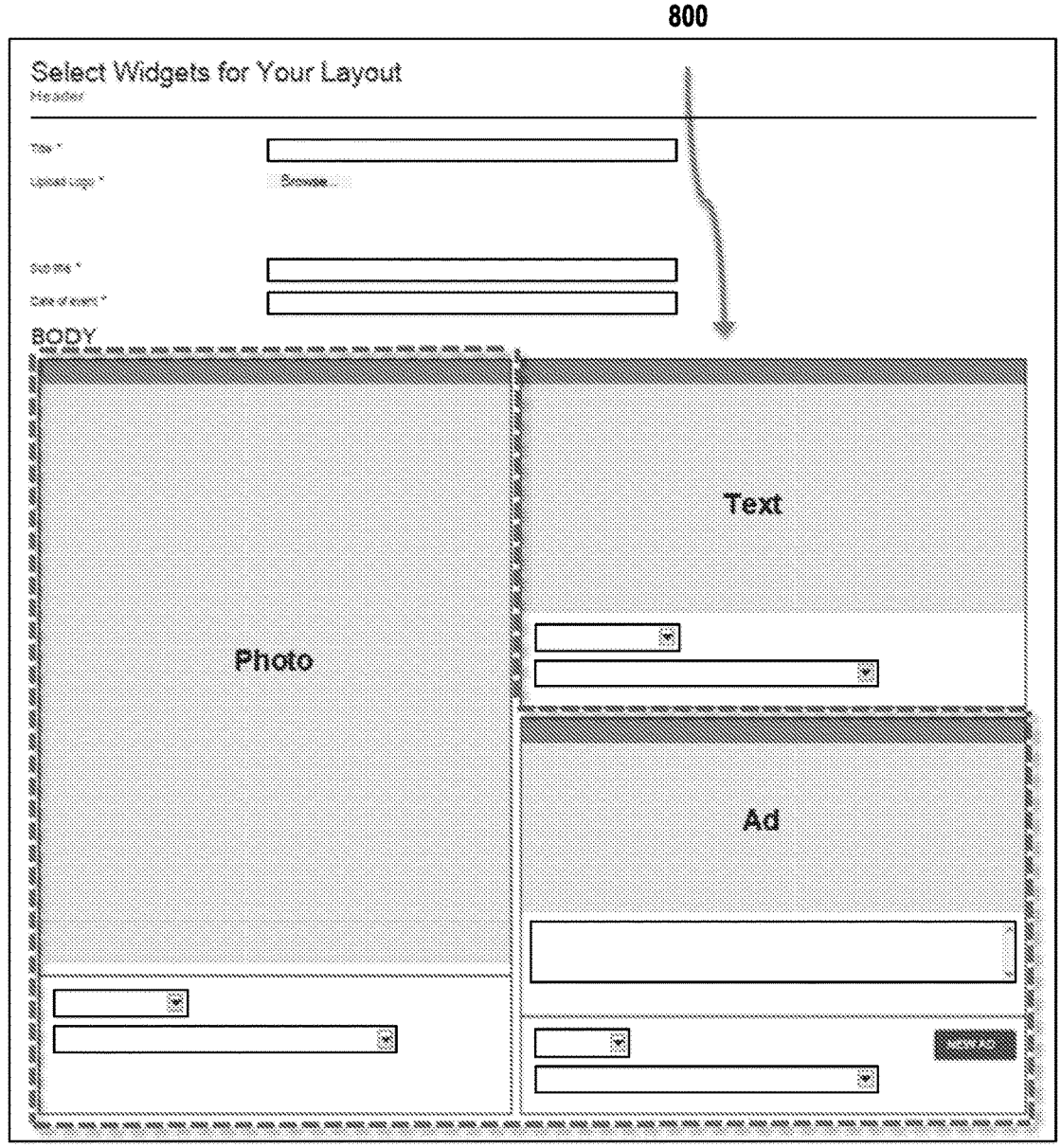

In one embodiment, to build a content display a user can select a layout that includes advertisements. A content display 700 is shown in FIG. 7. A user can configure the content display, within the selected layout 800 as shown in FIG. 8.

Advertisements can be configured through the ad content by defining an ad campaign and associating a tag to an ad campaign. A user can define the ad campaign and associate one or more tags to each ad campaign.

Figure 9:

A user is able create a new ad campaign and to associate the campaign with a tag previously established through the curation queue. Users can also create a brand new tag within this step. A new ad 900 is shown in FIG. 9. Users can also leverage a "Tag It" library, which saves previously saved tags.

Figure 10:
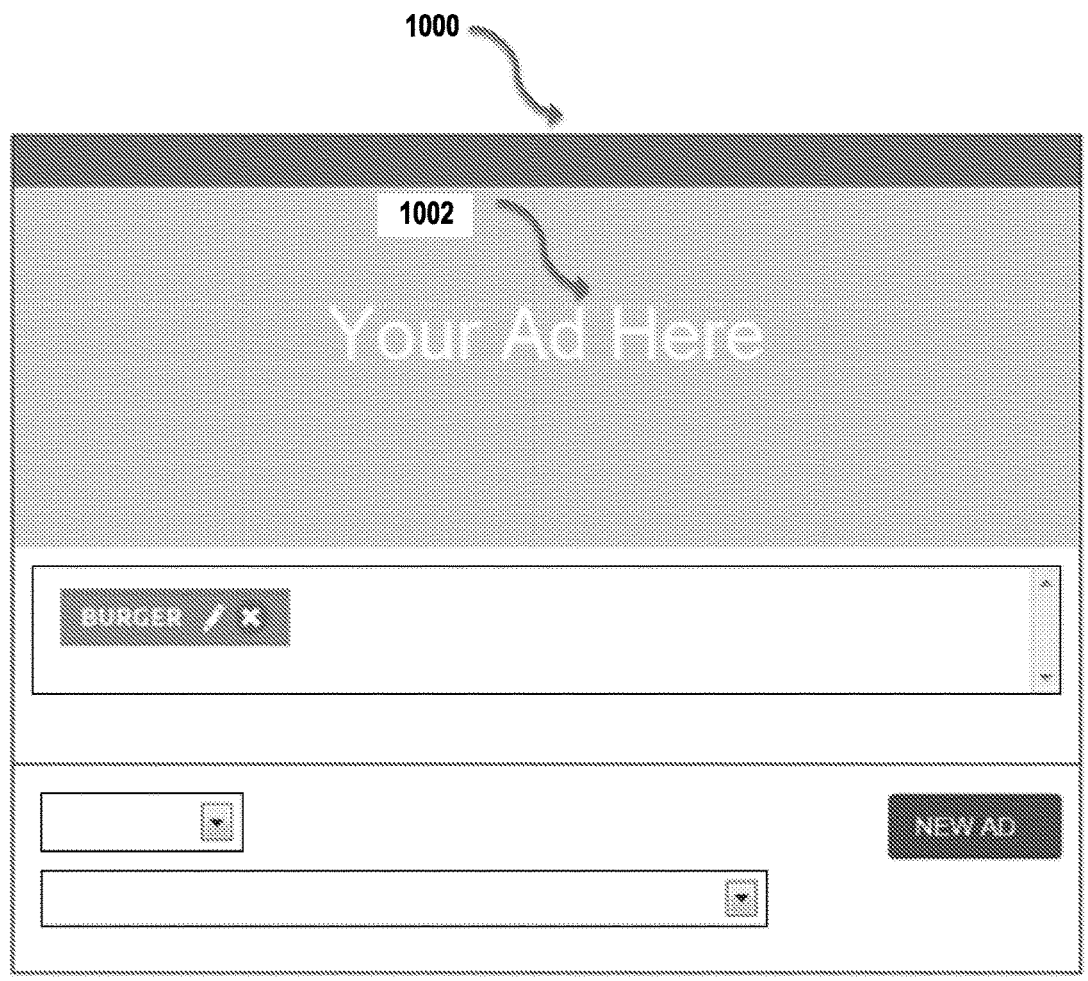

FIG. 10 is an ad widget 1000 within the content display. A user can to create multiple "Ads" to appear in the ad content area 1002 shown in FIG. 10. All tags selected for this ad campaign can appear in the area below the ad campaign image.

In one embodiment, a user can connect a feed (for example: Collected, Ranked and Approved social media content within the Curation Queue) for the ad content. The user can associate any of the previously created feeds with the ad campaign. This can establish the social media content to be synchronized.

In one embodiment, a user creates an ad campaign including a campaign name, tags, URLs, and an image. Then the user can configure an ad content area in the content display or layout, and in the content display the user can select one or more tags and a feed to associate with the ad content area of the content display. Therefore once data from a feed, either an image or text is shown in the data portion of the content display, and the tags is associated with tags, if the tags match the tags that the user selected for their ads when they created the ads, the ads are then shown in the ad content area next to the content.

In one embodiment, when a user configures a part of the layout for an advertisement, the user can select one or more tags and a feed to associate with the section of the layout.

Figure 11:
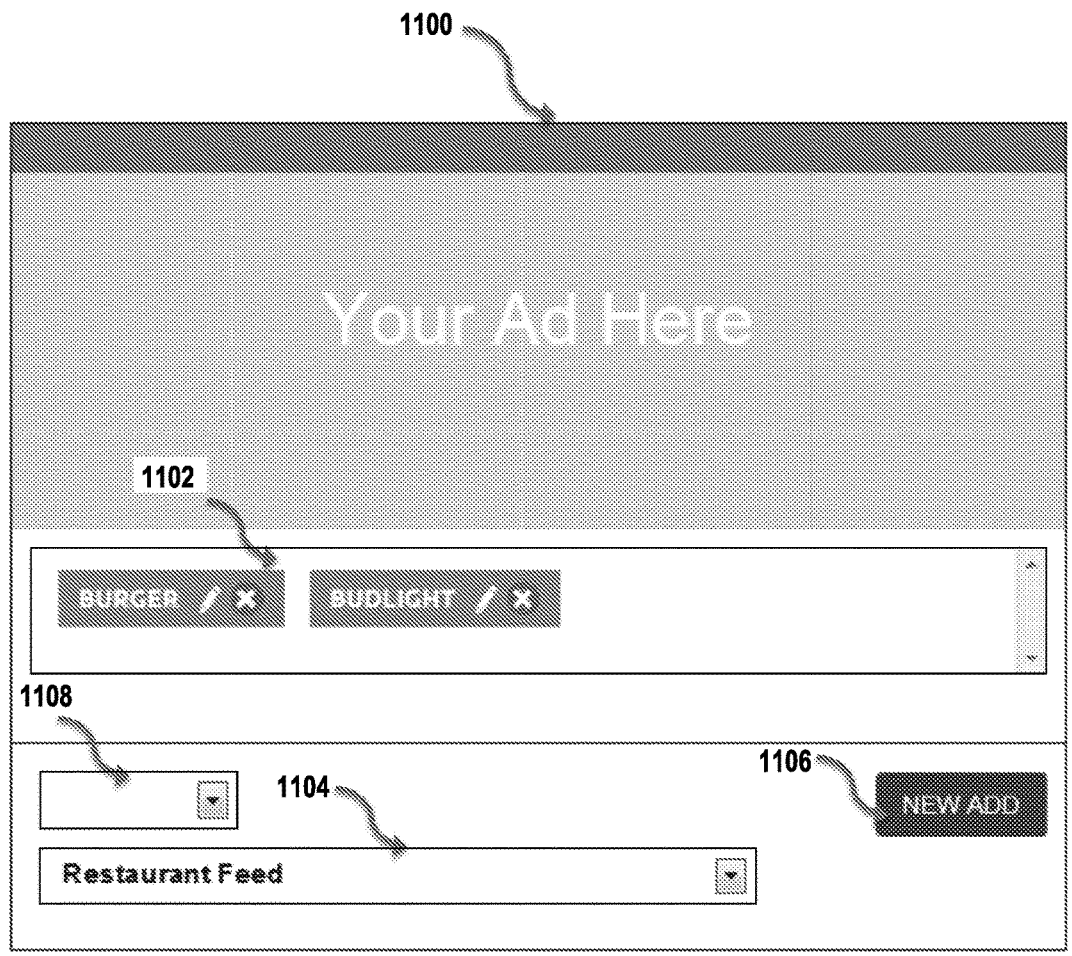

FIG. 11 is a widget feed configuration 1100. The widget feed configuration 1100 is the ad widget on the layout where the user actually determines what tags 1102 to use and the feed 1104. The user can also crate the new ad campaign here as well by clicking on New Add 1106. As shown in FIG. 11, the user can also select from the dropdown 1108 whether the user wants to use streaming social content or streaming social pictures.

Figure 12:
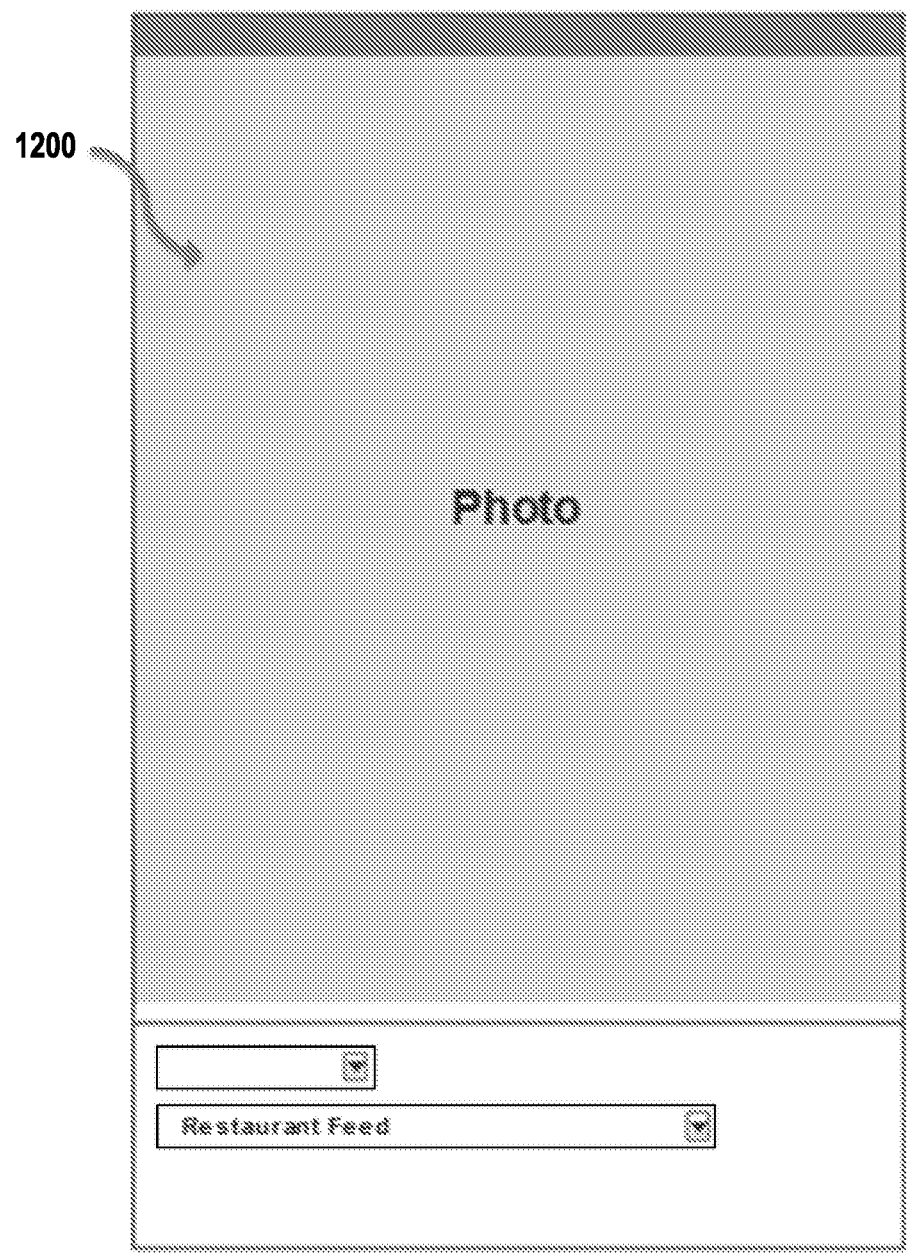

In one embodiment, social media content can be configured to sync to ad content. First, the user selects social media content. The user must select either streaming social pictures or the streaming social content to sync with their ads. Then the user selects a feed. For example, a user can pick a feed for the photo content 1200 as shown in FIG. 12.

Figure 13:
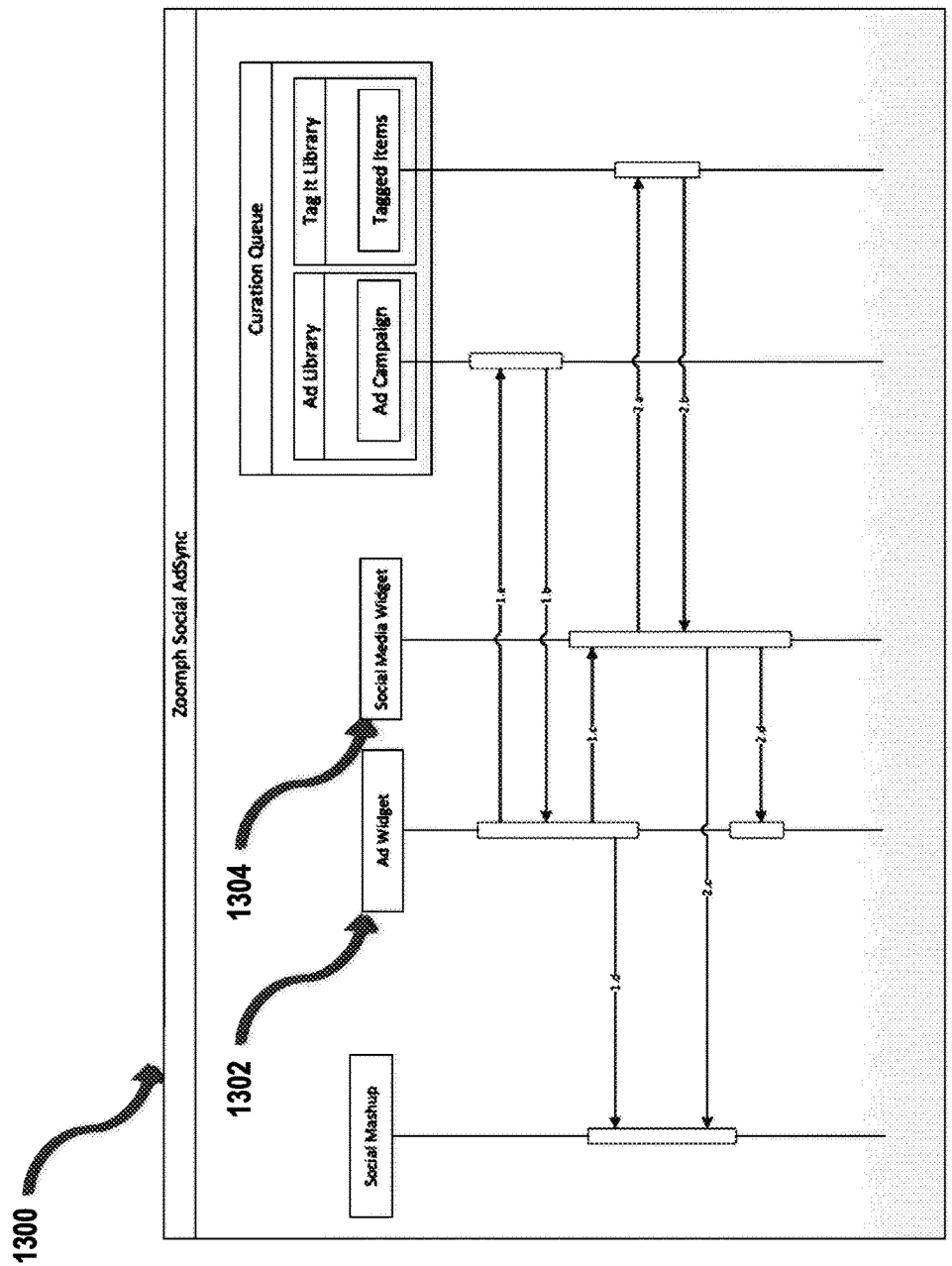
FIG. 13 is a sequence diagram in accordance with an embodiment.

FIG. 13 is a sequence diagram 1300. In a first step, the ad content of the content display, or the Ad Widget 1302 of the layout initializes communication with a list of campaigns. The Ad Widget 1302 queries for an "Ad Campaign" from the "Ad" Library. The Ad Widget 1302 receives the "Ad Campaign" from the "Ad" Library. The Ad Widget 1302 extracts the Ad Campaign's tag attribute and notifies the "Social Media Widget" of the "Tag" to use for retrieval of social media content. The Ad Widget 1302 serves up the Ad Campaign imagery, along with the Ad Campaign hyperlink onto the content display.

In a second step, the social media widget 1304 responds to the communication. It queries approved social media items from the "Tag It Library" for batches of a predetermined number of one or more tagged items. For example the predetermined number can be 4. If the system finds more than a predetermined number of tagged social media items for a specific campaign, for example if the predetermined number is 4, and it found 6 items, the system grabs the necessary number of items for the rotation and recycled amongst Tagged Social Media items. It receives the tagged items from the Tag It Library. It displays items for designated batch on the content display, or Social Mashup as is described in the figure. Once all social media items have been displayed for an ad campaign, the Social Media Widget 1304 notifies the Ad Widget 1302 to query for the next "Ad Campaign", hence starting the process again.

In one embodiment, if the system does not find any tagged items, the system will retrieve a predetermined number of untagged social media items from the approved queue to display. If the system finds less than a predetermined number of tagged items (i.e. a set of 3), the system will retrieve the remaining social media items (1 in this case) from the approved queue in order to complete its batch, while an ad campaign is displayed.

Figure 14:
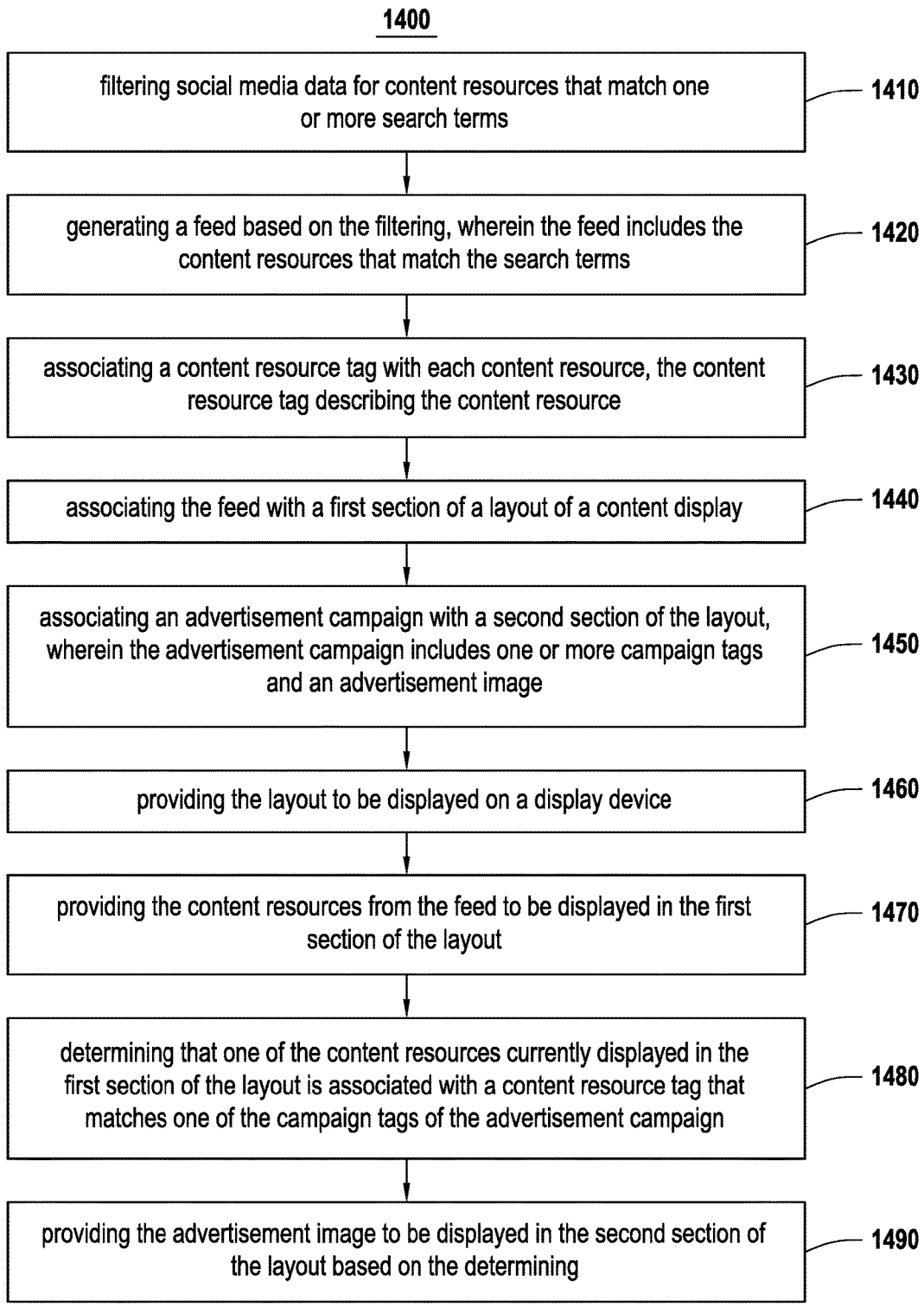
FIG. 14 illustrates a flowchart of an example process.

FIG. 14 illustrates a flowchart of an example process 1400. The process may be implemented by curation system 104 or engagement system 108.

At stage 1410, social media data is filtered for content resources that match one or more search terms. A user can generate one or more filters by using search terms. The search terms can be used to search social media data such as the data on Facebook, Instragram, and Twitter. The terms are compared to each piece of data on these platforms and if the terms match or are responsive to the content, the content is pulled from these platforms. In one embodiment, a hashtag or any other symbol can be used a part of the search terms.

At stage 1420, a feed is generated based on the filtering, wherein the feed includes the content resources that match the search terms. The user can generate multiple feeds based on different search terms. A single feed can also include multiple search terms. Once a feed is generated which includes one or more search terms, it can be continuously updated to include any new content resources that match or are responsive to the search terms in the feed.

At stage 1430, a content resource tag with is associated each content resource, the content resource tag describing the content resource. The tag can be associated with the content resource in a number of ways as describe above. The user can manually tag each content resource based on the text or the images in the content resource. The user can select one or more tags to use to tag the content resource. In one embodiment, the content resources can be automatically tagged using text recognition and/or image recognition. The tags are words that are similar to the text found in the text recognition. In one embodiment, the tags are words used to describe the image or images in the content resource.

At stage 1440, the feed is associated with a first section of a layout of a content display. The content display may be the content display 700 of FIG. 7. A user can select a layout of a content display. The content display can include one or more section and the sections can be populated with feed data, text or advertisement data. The user can designate where the feed data will be displayed on the content display. The user can also designate where the advertisements will be displayed on the content display. The first section can for example include a widget or a content widget with the functionality described.

At stage 1450, an advertisement campaign is associated with a second section of the layout of content display, wherein the advertisement campaign includes one or more campaign tags and an advertisement image. The user can select the advertisement campaign to associate with the second section of the layout of the content display. The user can select to show more than one advertisements and therefore associate one campaign with one section of the layout and a second campaign with a second section of the layout. The second section can for example include a widget or an ad widget with the functionality described.

At stage 1460, the layout to be displayed is provided on a display device. The layout includes the various sections of text and advertisement data.

At stage 1470, the content resources from the feed are provided to be displayed in the first section of the layout, wherein each content resource is displayed in the layout for a predetermined amount of time. When the layout is provided, the data displayed in the layout is continuously changing and updating. The section of the layout that includes the feed data displays the content resources from the feed, where each item is shown at a preset interval. If more than one section is associated with a feed, then the data from the second feed is shown in that section.

At stage 1480, a determination is made that one of the content resources currently displayed in the first section of the layout is associated with a content resource tag that matches one of the campaign tags of the advertisement campaign. Curation system 104 may determine that a content resource, such as an image is displayed, that is associated with a content resource tag, such as a metadata tag, describing the content resource that matches one of the campaign tags of the advertisement campaign generated by a user. Curation system 104 can compare the campaign tag with the content resource tag to make this determination.

At stage 1490, the advertisement image is provided to be displayed in the second section of the layout based on the determining, wherein the advertisement image is displayed simultaneously with the content resource in the first section. When curation system 104 determines that the two tags match, or the two tags are a close match, the advertisement image associated with the ad campaign of the campaign tag is provided to be displayed in the layout of the content display. The advertisement is displayed while the content resource with the matching tag is displayed.

In one embodiment, the curation system 104 and/or engagement system 108 can be used for creating and visualizations. It provides a way for both non-technical users and developers to customize visualizations. Visualizations created within the system can be embedded in any web page. It also provides a novel way of loading the visualizations to minimize the amount of data that must be transferred.

The curation system 104 may be a visualization instance manager as described herein.

The engagement system 108 may be a server visualization loader. The server visualization loader can include a visualization controller and generated visualization style. The visualization controller can be JavaScript and get as input visualization data sources and visualization structure which can be html. The generated visualization style can be CSS, and can receive the visualization settings, the visualization style, and the global less library.

Every visual has an underlying template. The template defines a default HTML/CSS/JS implementation. It also has a set of settings that can be configured including colors, text, and images. The templates are grouped into categories for organizational purposes. A template can also have themes. Each theme provides one or more of HTML/CSS/JS. These implementations will override the template implementation when that theme is selected. Template settings provide a definition for all of the configuration options available for a given template. These definitions include type of setting, default value, and validation requirements. An instance is a concrete implementation of a template. An instance can also define one or more of HTML/CSS/JS. If any of these are defined on the instance, the will overwrite what is defined on the theme or template. The instance also contains a set of setting values. This set contains values for the definitions found in the template settings as well as custom settings defined for that specific instance. Data sources define what data is going to be available for the instance. Data sources can be searches within Zoomph, analytical data, or external API's.

In one embodiment, the curation system 104 or engagement system 108 can perform a process that includes filtering social media data for content resources that match one or more search terms. The social media data can be a part of a social media feed. The process can further include providing the content resources to a user interface of a client device. The process can further include receiving a selection of one or more of the content resources. The process can further include receiving a selection to create a new visual based on data received; creating a visualization instance; and providing the visualization instance to be displayed on the user interface. The visualizations template can be selected by the user to be displayed. The visualizations can be displayed on a number of different user interfaces. The process in which the visualizations are built is described further below.

In one embodiment, the curation system 104 or engagement system 108 can perform a process that includes filtering social media data for content resources that match one or more search terms; receiving visualization settings at a server visualization loader; identifying visualization data sources; creating a visualization controller from the visualization data sources, visualization structure and visualization settings; providing to a visualization instance manager the visualization controller and generated visualization style; and creating with the visualization instance manager a visualization instance based on the visualization controller and generated visualization style.

In another embodiment, the curation system 104 or engagement system 108 can perform a process that includes electing all elements on a webpage, by a client loader, that have a first attribute and make a request to a server loader for a visualization manager, including the value of all of the attributes. for each of the visual identifications sent with the request, look up the html, less, js, settings, and data sources by a server loader; running, at the server loader, each of a number of styles through a style generator with the associated settings; building by the server loader, the client instance manager and injecting the generated styles with the controllers; Appending the styles for each of the loaded instances into a head of the webpage by the client instance manager; Wait for the page to finish loading its own elements at the client instance manager; Expose an API for interacting with instances at the client instance manger; and Construct each of the Visual Instances using the controller at the client instance manager.

In another embodiment, the curation system 104 or engagement system 108 can perform a process that includes filtering social media data for content resources; providing the content resources to a user interface; receiving a selection to create a new visual based on the content resources; creating a visualization instance based on settings associated with the new visual; and providing the visualization instance to be displayed on the user interface.

In another embodiment, the curation system 104 or engagement system 108 can perform a process that includes identifying social media data for content resources based on preferences; receiving a selection to create a new visual for the content resources; identifying advertisements associated with the content resources; creating a visualization instance for the advertisements or the content resources based on settings associated with the new visual; providing the visualization instance to be displayed on the user interface. A user can select to create a visual for the advertisements in addition to the social media content resources.

The visualizations are seamlessly integrated into a webpage selected by the user.

In one embodiment, there is an advanced edit screen for the visualizations. From here a user can edit the raw value of the settings they saw in the other screens, edit the data sources (ties in with the precompute backend) and edit the structure/style/functionality.

Every visual that a user can create is tied to a Template. A template provides a default structure/style/functionality. Templates can have one or more Themes. Each theme can override one or more of the structure/style/functionality. After a new visual is created through the process I outlined in the previous document, one or more of the structure/style/functionality can be overridden through the Advanced Edit screen seen below.

Settings that start with an '@' will be used to override the less variables that are in the first few lines of the CSS pane.

The JavaScript pane it defines a single constructor function. This function takes:

InstanceId—unique id within the system

Elem—the DOM element on the client page where the visual is to be placed

HTML—all the code that is defined in the HTML page

Config—a key/value pair of all the settings that are not prefixed with an '@'

DataSources—all of the data sources defined in the data sources pane

The first step of the visualization loader is to retrieve all of the information relating to each visual from the database. This data includes the id, structure (html), style (less), functionality/controller (js), controller settings, style settings (less variable), and data sources.

Data sources correlate to data endpoints within the back end. These could return searches in Zoomph data, analytical information, or hooks into external API's. Zoomph searches and analytical information are implemented using the precompute backend.

In one implementation, the visualization manager does the following in order: 1) Load any additional external resources required by the visualization instances, 2) Inject the styles for each of the instances into the client page's head 3) Wait for the page to finish loading 4) Run the constructor for each of the visualization instances.

In another implementation, there will be an API for each visual instance so that external JavaScript on the page can interact with individual instances. Some of the operations that can be performed include: Destroy/Remove instance from page, Reload instance, Instance specific methods (i.e. programmatically triggering actions that would normally be triggered through user input)

System 100 may be software, firmware, or hardware or any combination thereof in a computing device. A computing device can be any type of computing device having one or more processors. For example, a computing device can be a computer, server, workstation, mobile device (e.g., a mobile phone, personal digital assistant, navigation device, tablet, laptop, or any other user carried device), game console, set-top box, kiosk, embedded system or other device having at least one processor and memory. A computing device may include a communication port or I/O device for communicating over wired or wireless communication link(s).

Computing devices such as a monitor, all-in-one computer, smart phone, tablet computer, remote control, etc., may include a touch screen display that accepts user input via touching operations performed by a user's fingers or other instrument. For example purposes, a touch sensor grid may overlay the display area. The touch sensor grid contains many touch sensitive areas or cells that may be used to locate the area closest to the input of a user's touch.

Example touch operations using a touch screen display may include (but are not limited to) pinching, finger (or other stylus or object) touches, finger releases, and finger slides. Finger slides may be circular or any other shape, direction or pattern. The touch screen display may include a screen or monitor that may render text and/or images.

Figure 15:
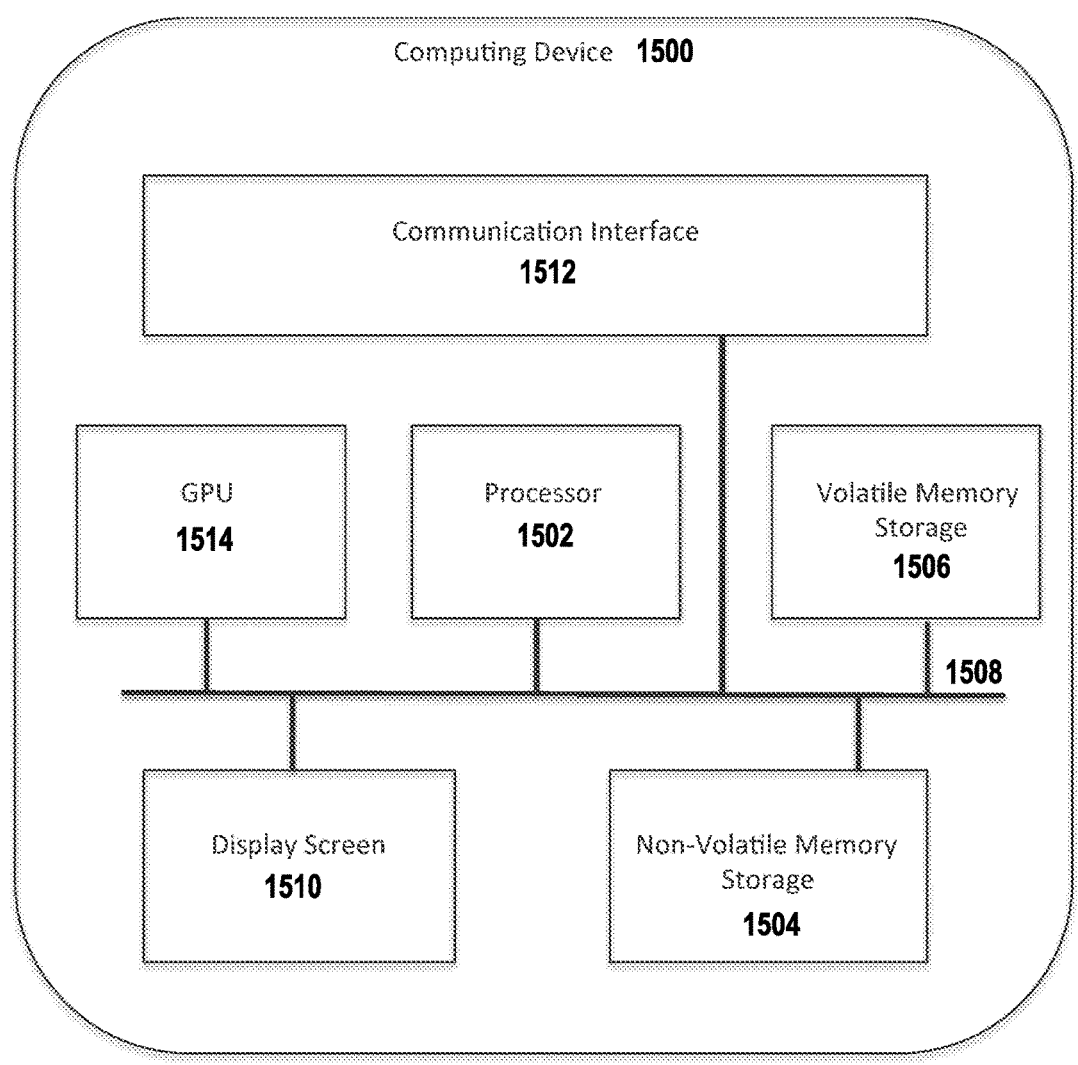
FIG. 15 is a diagram of an example computer device used to implement the system.

FIG. 15 is an example computer system 1500 in which embodiments of the present invention, or portions thereof, may be implemented as computer-readable code. For example, the components of systems 104 and 108 may be implemented in one or more computer systems 1500 using hardware, software implemented with hardware, firmware, tangible computer-readable media having instructions stored thereon, or a combination thereof and may be implemented in one or more computer systems or other processing systems. Components in FIGS. 1-14 may be embodied in any combination of hardware and software.

Computing devices, such as devices 110 or server 120, may include one or more processors 1502, one or more non-volatile storage mediums 1504, one or more memory devices 1506, a communication infrastructure 1508, a display screen 1510 and a communication interface 1512.

Processors 1502 may include any conventional or special purpose processor, including, but not limited to, digital signal processor (DSP), field programmable gate array (FPGA), application specific integrated circuit (ASIC), and multi-core processors.

GPU 1514 is a specialized processor that executes instructions and programs, selected for complex graphics and mathematical operations, in parallel.

Non-volatile storage 1504 may include one or more of a hard disk drive, flash memory, and like devices that may store computer program instructions and data on computer-readable media. One or more of non-volatile storage device 1504 may be a removable storage device.

Memory devices 1506 may include one or more volatile memory devices such as but not limited to, random access memory. Communication infrastructure 1508 may include one or more device interconnection buses such as Ethernet, Peripheral Component Interconnect (PCI), and the like.

Typically, computer instructions are executed using one or more processors 1502 and can be stored in non-volatile storage medium 1504 or memory devices 1506.

Display screen 1510 allows results of the computer operations to be displayed to a user or an application developer.

Communication interface 1512 allows software and data to be transferred between computer system 1500 and external devices. Communication interface 1512 may include a modem, a network interface (such as an Ethernet card), a communications port, a PCMCIA slot and card, or the like. Software and data transferred via communication interface 1512 may be in the form of signals, which may be electronic, electromagnetic, optical, or other signals capable of being received by communication interface 1512. These signals may be provided to communication interface 1512 via a communications path. The communications path carries signals and may be implemented using wire or cable, fiber optics, a phone line, a cellular phone link, an RF link or other communications channels.

Examples of systems, methods, and apparatus for collecting and curating social media content, and synchronizing displays of selected items of social media content and related advertisements are described in U.S. patent application Ser. No. 13/801,564, filed Mar. 13, 2013, which is incorporated herein by reference in its entirety and for all purposes.

Existing systems for displaying advertisements do not provide the capability to synchronize the display of advertisements with related items of social media content at venues where live events are held. Systems and methods described herein advantageously provide the capability to synchronize the display of advertisements with related items of social media content at venues where live events, such as sporting events, conferences, concerts, etc., are held.

Figure 16:
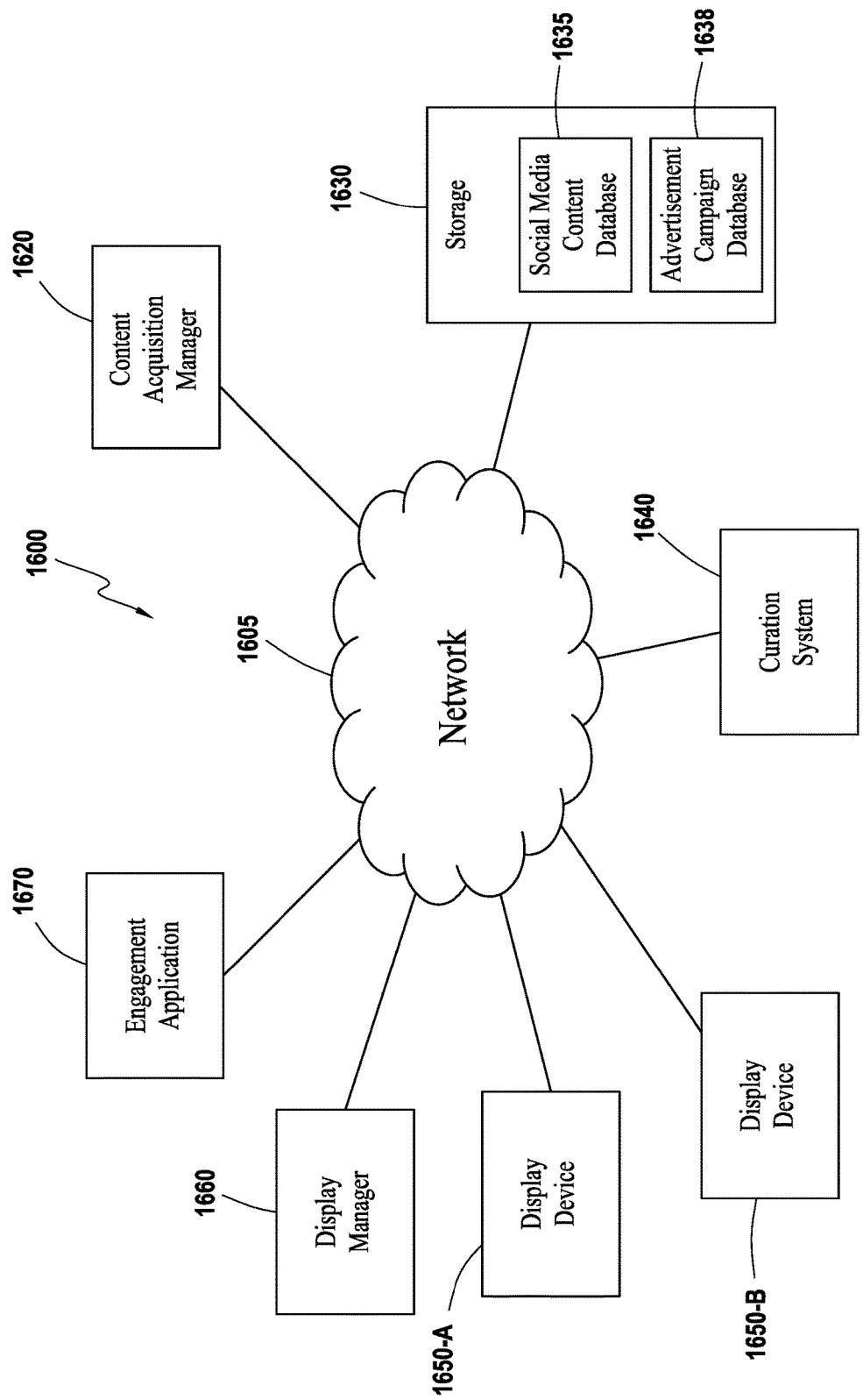
FIG. 16 shows a social content and advertisement synchronization system in accordance with an embodiment.

FIG. 16 shows a social content and advertisement synchronization system in accordance with an embodiment. System 1600 includes a network 1605, a content acquisition manager 1620, a storage 1630, a curation system 1640, a plurality of display devices 1650-A, 1650-B, etc., a display manager 1660, and an engagement application 1670.

Network 1605 may include, without limitation, the Internet and/or other types of networks such as a wireless network, a wide area network (WAN), a local area network (LAN), an Ethernet network, a storage area network, etc.

Content acquisition manager 1620 is connected to network 1605. Content acquisition manager 1620 accesses sources of social media content and searches for items of social media content that satisfy one or more parameters. For example, content acquisition manager 1620 may access social media websites such as Twitter, Facebook, YouTube, etc., and obtain tweets, messages, comments, images, posted updates, photos, videos, etc., that contain a specified hashtag, contain a specified word, contain a specified image, etc. In an illustrative example, content acquisition manager 1620 may search for Facebook posts that contain the words "XYZ Company." Content acquisition manager 1620 may compile a plurality of items of social media content into a feed. Content acquisition manager 1620 stores items of social media content in storage 1630.

Storage 1630 stores data including items of social media content. For example, items of social media content may be stored in a social media content database 1635 maintained in storage 1630.

Curation system 1640 functions in a manner similar to curation system 104 described above. Curation system 1640 enables users to access stored items of social media content and to curate these items in the manner described above. For example, a user may examine each item of social media content in one or more feeds, and either delete the item, tag the item, or perform another action with respect to the item. Curation system 1640 is similar to curation system 104 described above.

Each display device 1650 is adapted to display text, graphics, and other types of content. For example, display devices 1650-A, 1650-B may be televisions, very large-screen televisions (sometimes referred to as jumbotrons), display screens on computers or cell phones, smart TVs, Internet-enabled TVs, apps on television, etc.

Display manager 1660 access stored items of social media content and causes the content to be displayed on display devices 1650. Display manager 1660 may also cause other types of content, such as advertisements, to be displayed on display devices 1650.

Engagement application 1670 functions in a manner similar to engagement application 108 described above. Thus, for example, engagement application 1670 enables a user to access and interact with curation system 1640, and to manage social media content, via a user device.

A social content and advertisement synchronization system such as that described herein may be implemented in a variety of environments. For example, a social content and advertisement synchronization system may be used to collect and curate social media content, and display the curated social media content along with advertisements on a website available on the World Wide Web, via a personal computer or via a cell phone application.

In another embodiment, a social content and advertisement synchronization system may be used to collect and curate social media content, and display the curated social media content along with advertisements on a display device, in a synchronized manner, at a live event such as a sporting event, a conference, a meeting, a concert, a party, etc.

Figure 17:
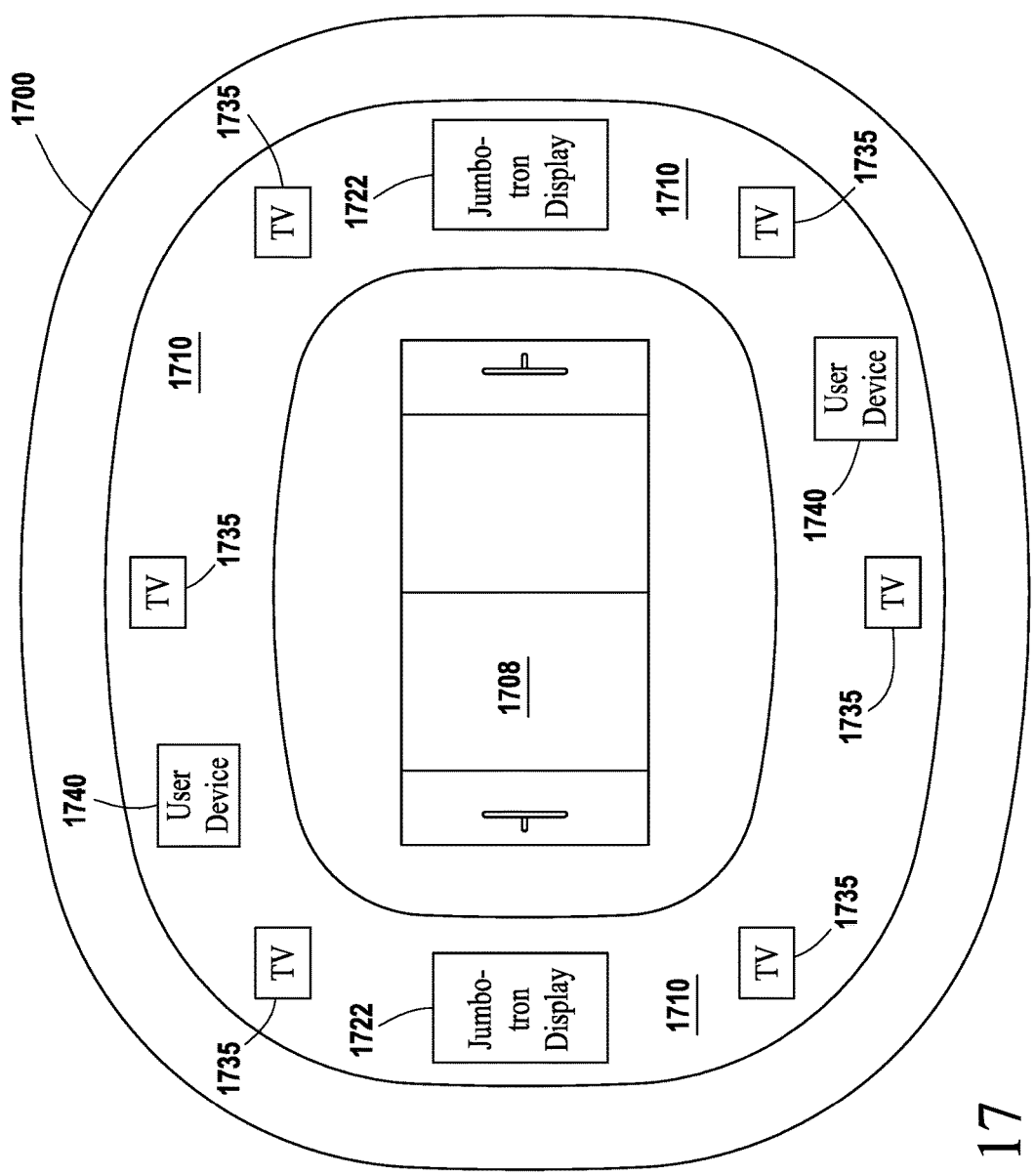
FIG. 17 shows a venue for a live event in accordance with an embodiment.

FIG. 17 shows a venue for a live event in accordance with an embodiment. Sports stadium 1700 includes a field of play 1708, which may be a football field, a baseball field, a basketball court, an ice rink, etc., and a spectator area 1710, which typically includes seating, bleachers, etc. A plurality of display devices are disposed at selected locations in the spectator area 1710. In the illustrative embodiment, the display devices include, without limitation, very large-screen jumbotron television screens 1722, regular television screens 1735, and user devices 1740, which may include cell phones, laptop computers, etc., carried by individuals. Some user devices 1740 may include a cell phone app adapted to receive and display items of social media content, and advertisements, from system 1600. In other embodiments, other types of display devices may be used, including smart TVs, Internet-enabled TVs, apps on television, etc.

Figure 18:
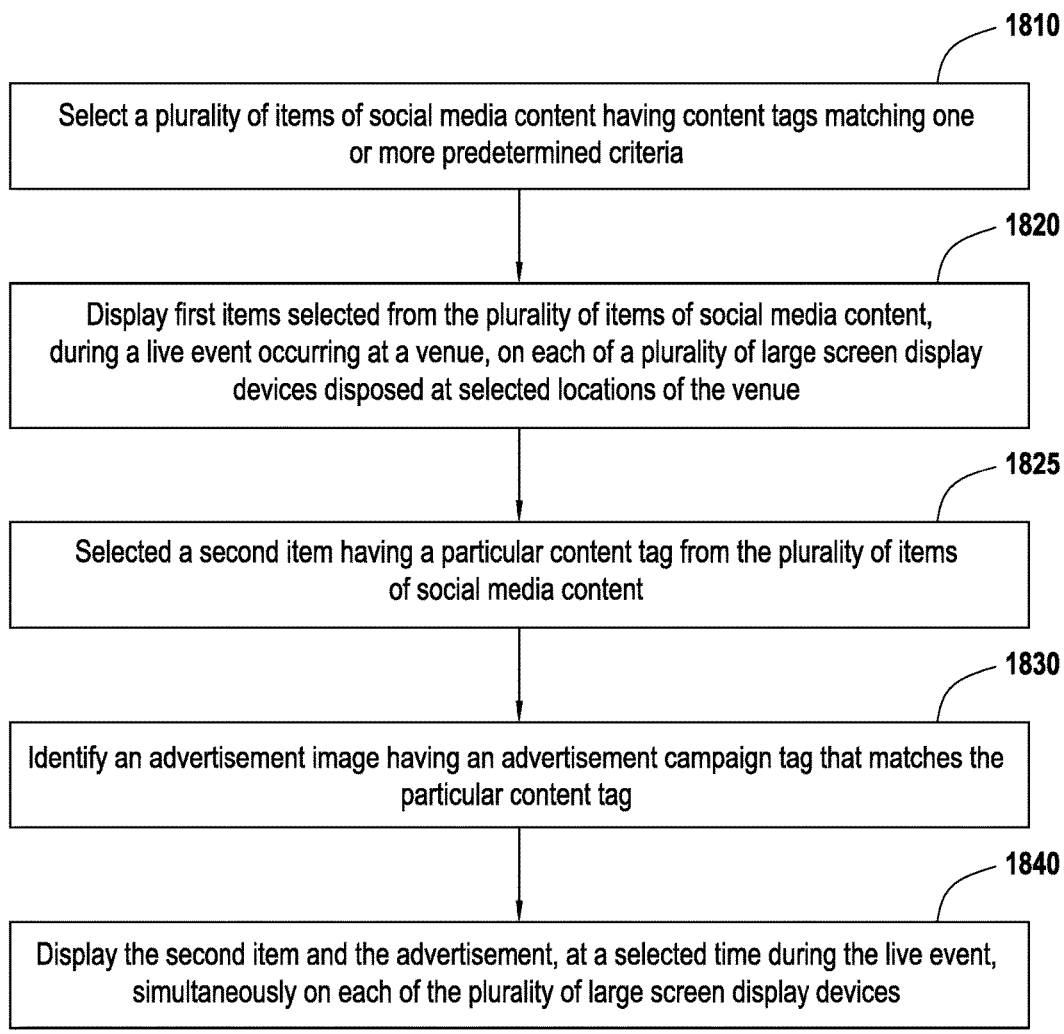
FIG. 18 is a flowchart of a method of displaying curated social media content on a display device during a live event in accordance with an embodiment.

In accordance with an embodiment, previously curated social media content is displayed on the display devices during the sporting event. FIG. 18 is a flowchart of a method of displaying curated social media content on a display device during a live event in accordance with an embodiment. In the illustrative embodiment, a sports team organization, Team XYZ, uses social content and advertisement synchronization system 1600 to collect and curate items of social media content related to Team XYZ. Thus, in the manner described above, items of social media content including, for example, tweets, posts on personalized social media pages, photos, blog posts, etc., that mention Team XYZ or are related to Team XYZ are collected and stored in social media content database 1635. Team XYZ then curates the items by, for example, deleting undesired content items (including, for example, posts using profane language), approving selected content items, tagging selected content items, etc. For example, Team XYZ may add tags to selected items of social media content, such as a tag indicating "fans cheering at Team XYZ game," a tag indicating "fan wearing Team XYZ jersey," a tag indicating "vehicle with Team XYZ bumper sticker," a tag indicating "President Obama at Team XYZ game," etc.

Referring again to FIG. 17, when Team XYZ plays a game in stadium 1700, selected items of social content are retrieved and displayed on the various display devices located throughout stadium 1700. Thus, at step 1810, a plurality of items of social media content having content tags matching one or more predetermined criteria are selected. For example, curation system 1640 or engagement application 1670 may allow Team XYZ to specify one or more key words or other parameters, such as "fans cheering at Team XYZ game" and "fan wearing Team XYZ jersey." Social media content database 1635 is accessed (by curation system 1640 and/or engagement application 1670), and approved items of social media content having tags matching the specified tags are retrieved and used to create a feed. Thus, in the illustrative embodiment, a feed of various photos may be generated showing fans cheering at Team XYZ games and fans wearing Team XYZ jerseys. The feed may include a sequence of photos and/or photos arranged in a mosaic arrangement.

Figure 19:
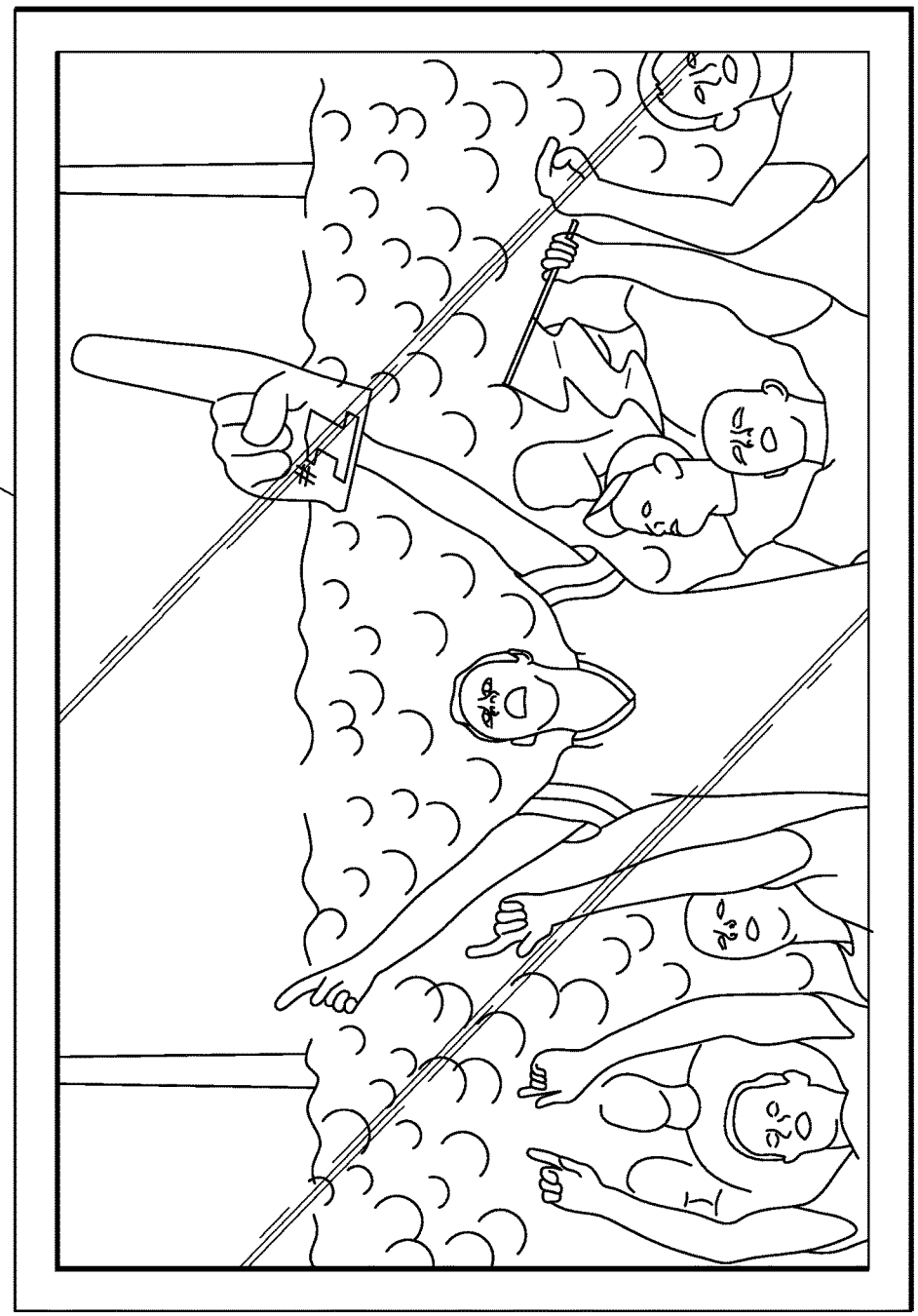
FIG. 19 shows a photo of fans cheering during a game displayed on a display device.

At step 1820, first items selected from the plurality of items of social media content are displayed, during a live event occurring at a venue, on each of a plurality of large screen display devices disposed at selected locations of the venue. Team XYZ may specify that photos of fans at Team XYZ games are to be shown continuously while the game is being played, from time to time, or at predetermined intervals. In the illustrative embodiment, display manager 1660 accesses social media content database 1635 and retrieves and displays items of social media content based on the user's input. FIG. 19 shows a photo of fans cheering during a game displayed on a display device 1900, which may be a jumbotron television, for example. In the illustrative embodiment, the photos in the feed are displayed on jumbotron displays 1722, on TVs 1735, and on user devices 1740, while game play is occurring. The items in the feed may be displayed on all the display devices in the stadium. Furthermore, photos may be displayed individually in sequence, or multiple photos may be displayed as a mosaic on each particular screen. As the feed is updated, new or additional photos may be displayed. The photos may be displayed using all or a portion of a display screen.

While in the illustrative embodiment, photos are displayed, in other embodiments, other types of social media content items may be retrieved and displayed, such as tweets, posts, videos, articles, designs, etc. A feed may include any type of social media content.

Team XYZ may further wish to display advertisements for a team jersey that is selling in local stores. Thus, prior to the sporting event, an advertisement campaign for the team jersey, including advertisement images, for the Team XYZ jerseys, is prepared in the manner described above. A tag "fan wearing Team XYZ jersey" is added to the advertisement campaign. Referring to FIG. 16, the advertisement images and advertisement campaign tags may be stored in advertisement campaign database 1638 in storage 1630.

Prior to the sporting event, Team XYZ further specifies that when any item of social media content having the tag "fan wearing Team XYZ jersey" appears on the display screens, the advertisement image associated with the advertisement campaign is to be displayed on the screen along with the social media content.

At step 1825, a second item having a particular content tag is selected from the plurality of items of social media content. In the illustrative embodiment, Team XYZ may specify that the photos having a tag "fan wearing Team XYZ jersey" are to be displayed on the display devices at a particular time during the sporting event—e.g., when halftime begins in a football game, between the second and third innings of a baseball game, etc. Accordingly, display manager 1660 retrieves items of social media content having a tag "fan wearing Team XYZ jersey." These items may include photos or other types of content.

At step 1830, an advertisement image having an advertisement campaign tag that matches the particular content tag is identified. Team XYZ also specifies that the advertisement image relating to the team jersey advertisement campaign, which also has the matching tag "fan wearing Team XYZ jersey," is to be displayed along with the photos having the tag "fan wearing Team XYZ jersey." Display manager 1660 accesses advertisement campaign database 1638 and retrieves an advertisement image having the tag "fan wearing Team XYZ jersey." At step 1840, the second item and the advertisement image are displayed, at a selected time during the live event, simultaneously on each of the plurality of large screen display devices. Display manager 1660 causes the second item and the advertisement image to be displayed together at a selected time, such as at 2:30 PM during the live event. Alternatively, the second item and the advertisement image may be displayed simultaneously upon the occurrence of a selected event during the live event.

Figure 20:
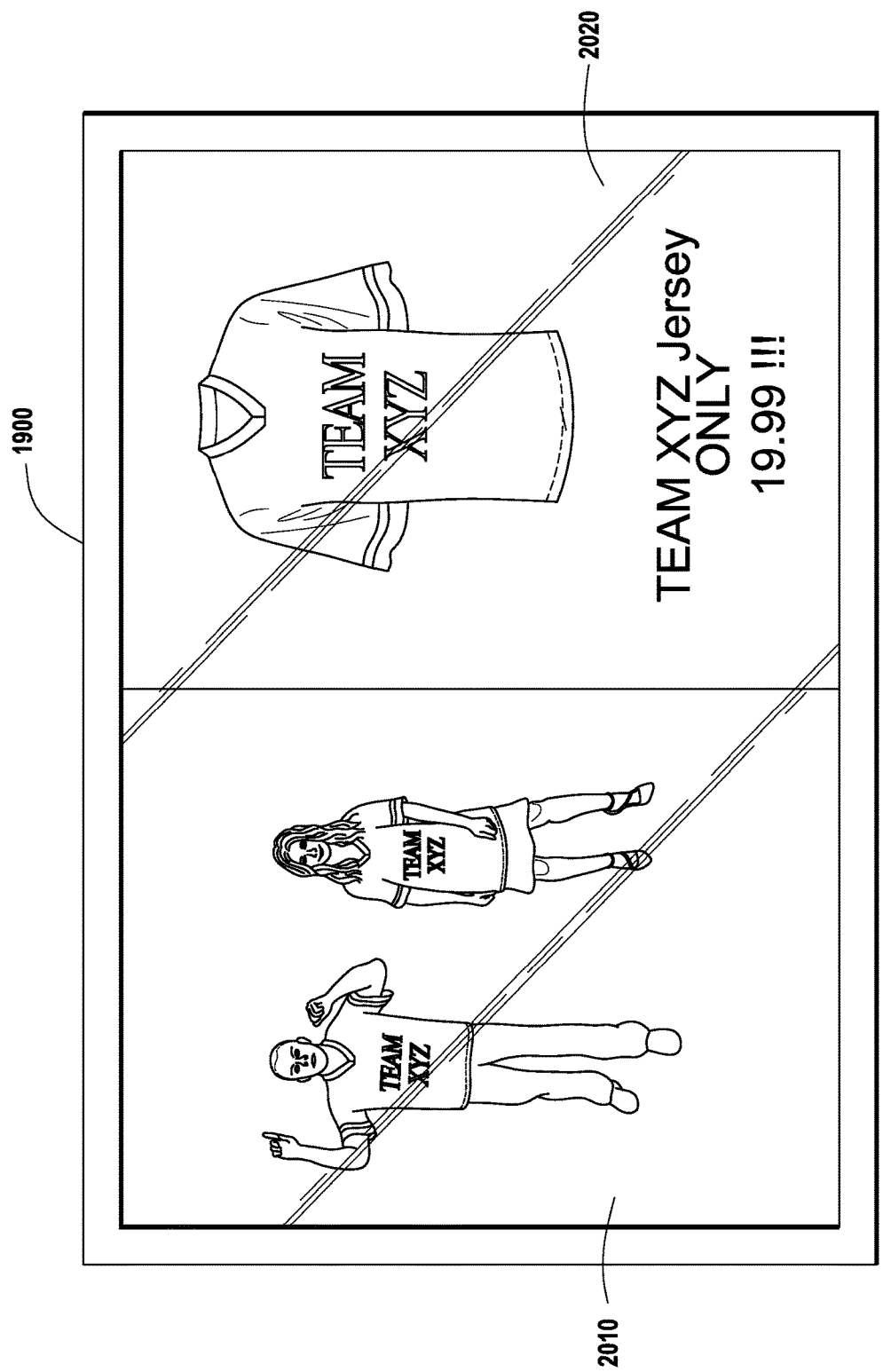
FIG. 20 shows a photo of fans and an advertisement image displayed on a display device in accordance with an embodiment.

In the illustrative example, the selected event is the beginning of halftime during a football game. Thus, when halftime begins, a photo having the tag "fan wearing Team XYZ jersey" is selected from the feed and displayed on the display screens in the stadium. FIG. 20 shows a photo of fans wearing Team XYZ jerseys and an advertisement image for the Team XYZ jersey displayed on a display device. The photo is displayed in a first portion of the screens (e.g., the left side of the screens), and the advertisement image is displayed in a second portion of the screens (e.g., the right side of the screens), alongside the photo.

While in the illustrative embodiment, data relating to social media content, advertisement campaign data, and tags are stored in one or more databases, in other embodiments, data may be stored in other forms. For example, in another embodiment, social media content objects and advertisement objects may be used to store data. For example, a social media content data store may be created in storage 1630 (or elsewhere) to store a plurality of social media content objects, where each social media content object includes an item of social media content and a social media content tag. Similarly, a plurality of advertisement objects may be created and stored in an advertisement campaign store, where each advertisement object storing an advertisement image and an advertisement campaign tag. Curation system 1640 and/or engagement application 1670 may create and manage such objects.

While systems and methods have been described herein in the context of a sporting event, the systems and methods described herein may be implemented in other live events including conferences, concerts, parties, etc. For example, during a conference held at a conference venue (e.g., a hotel, a conference center, etc.), a feed of social media content items may be displayed on display screens located at various locations in the conference venue. Then, between the presentations of two keynote speakers during the conference, selected items of social media content having a particular tag, and advertisements images having matching tags, may be displayed simultaneously on the display screens.

Online social networks, such as Twitter, Facebook, YouTube, etc., have become important modes of communication in today's world. Many announcements, ideas, and other communications are conveyed initially, primarily, and sometimes exclusively, through social networks. In many industries, such as marketing, and in other areas of human activity, such as politics, monitoring communications that occur in online social media provides invaluable information. Indeed in today's world, gauging sentiment on social media is often a crucial component to the success of many political campaigns, advertising campaigns, product launches, movie debuts, celebrity events, etc. However, with the number of daily items of social media content on popular topics now frequently exceeding one hundred million, and sometimes exceeding one billion, no existing commercially available computer or software application is capable of handling and analyzing such large amounts of social media content quickly enough to produce useful results. There is a need for systems and methods capable of gathering and analyzing very large quantities.

Figure 21:
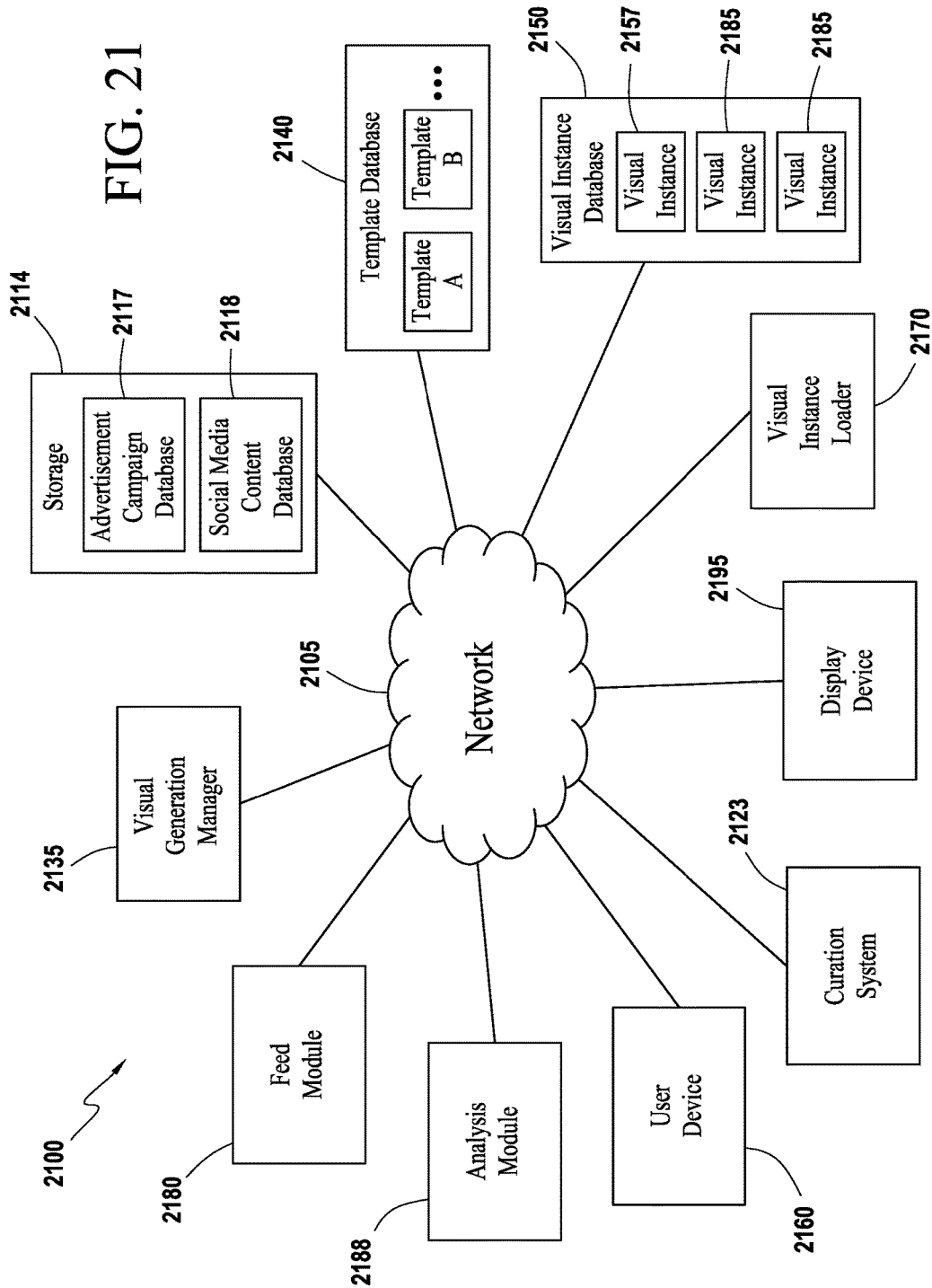
FIG. 21 shows a visual management system in accordance with an embodiment.

In another embodiment, a visual management system generates a visual instance, which may then be displayed. FIG. 21 shows a visual management system in accordance with an embodiment. Visual management system 2100 includes a network 2105, a visual generation manager 2135, a template database 2140, a visual instance database 2150, a visual instance loader 2170, a display device 2195, a feed module 2180, an analysis module 2188, a storage 2114, a curation system 2123, and a user device 2160. In other embodiments, a visual management system may include other components not shown in FIG. 21.

Network 2105 may include, without limitation, the Internet and/or other types of networks such as a wireless network, a wide area network (WAN), a local area network (LAN), an Ethernet network, a storage area network, etc.

Visual generation manager 2135 provides a user interface that a user may access to create a visual. For example, the user interface may allow a user to select a template and specify one or more settings and other parameters associated with the selected template. When a user uses a template to generate a visual instance, the visual instance is stored in visual instance database 2150.

Template database 2140 stores a plurality of visual templates. Each visual template includes information defining selected characteristics that may be used to generate a visual instance.

While in the illustrative embodiment of FIG. 21, a database is used to store templates, in other embodiments, templates may be stored in a different type of data structure or in another manner. For example, a data repository may be used, a data store may be used, etc.

Visual instance database 2150 stores one or more visual instances. In other embodiments, visual instances may be stored in a different type of data structure or in another manner.

Visual instance loader 2170 may from time to time render a visual instance. For example, visual instance loader 2170 may access a visual instance stored in visual instance database 2150 and render the visual instance on a webpage.

Feed module 2180 accesses one or more sources of social media content and obtains selected items of social media content. For example, feed module 2180 may access social media websites such as Twitter, Facebook, Instagram, Google+, etc., and obtain items of social media content such as, for example (and without limitation), tweets, Facebook posts, comments, messages, blog posts, photographs, videos, etc., which satisfy predetermined criteria. Feed module 2180 aggregates the items of social media content to generate a feed. The feed may include a chronological sequence of items of social media content, for example. Feed module 2180 may obtain items of social media content and add the items to the feed in real-time or approximately real-time.

Analysis module 2188 analyzes items of social media content in the feed and generates information related to the content. For example, analysis module 2188 may examine items of social media content mentioning a particular Company X and generate statistics indicating a first percentage of items of content that show a positive sentiment toward the company and a second percentage of items that show a negative sentiment toward the company.

Display device 2195 is a display device capable of displaying a visual. Display device 2195 may be a television, a jumbotron television, a display screen of a computer, a touch screen device, a display screen of a cell phone, etc.

Curation system 2123 functions in a manner similar to curation system 1640 described above in the illustrative embodiment of FIG. 16. Storage 2114 stores various types of data. In the illustrative embodiment, an advertisement campaign database 2117, which stores information for an advertisement campaign, including advertisement images, is stored in storage 2114. A social media content database 2118, which may include, for example, tagged items of social media content, is also stored in storage 2114.

User device 2160 is a computer or other processing device that a user may employ to access visual generation manager 2135 to create a visual instance, for example.

In accordance with an embodiment, visual templates are created a priori. Each visual template is directed at a particular type of visual (e.g., a template for generating and displaying a heat map of social media activity, a template for generating and displaying a line graph indicating mentions in social media, a template for retrieving and displaying photos selected from the feed, etc.). Referring to FIG. 21, several visual templates, including visual template A and visual template B, are stored in template database 2140.

Figure 22:
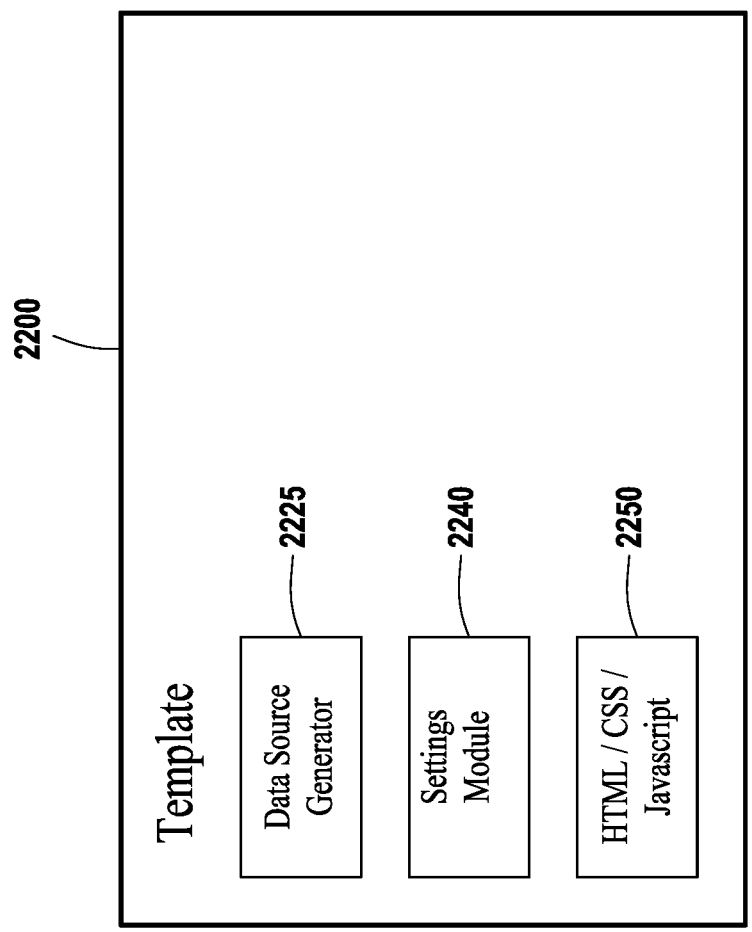
FIG. 22 shows components of a template in accordance with an embodiment.

FIG. 22 shows components of a template in accordance with an embodiment. Template 2200 includes a data source generator 2225, a settings module 2240, and an HTML/CSS/Javascript component 2250.

Data source generator 2225 uses settings specified by a user and generates a data source comprising code (XML). Based on the settings specified by the user, data source generator 2225 generates code capable of rendering the visual defined by the specified settings. The code generated is referred to as a "data source."

Settings module 2220 defines one or more settings that a user may configure. For example, the settings module 2220 may indicate that the user may control the style and color of a title or banner appearing on the visual. Settings module 2220 may indicate that a user may select possible time intervals (real-time, day, week, month, year, etc.) for a line graph. Settings module 2220 may indicate that a user may select social media websites from which items of social media content are to be obtained. Settings module 2220 may indicate that a user may select a geographical area (e.g., continental United States, Southeastern United States, Northeastern United States, Midwest, Western United States) to be displayed in a heat map shown in a visual.

HTML/CSS/Javascript component 2250 includes details controlling how elements of a visual instance is rendered. HTML/CSS/Javascript components are known.

Figure 29:
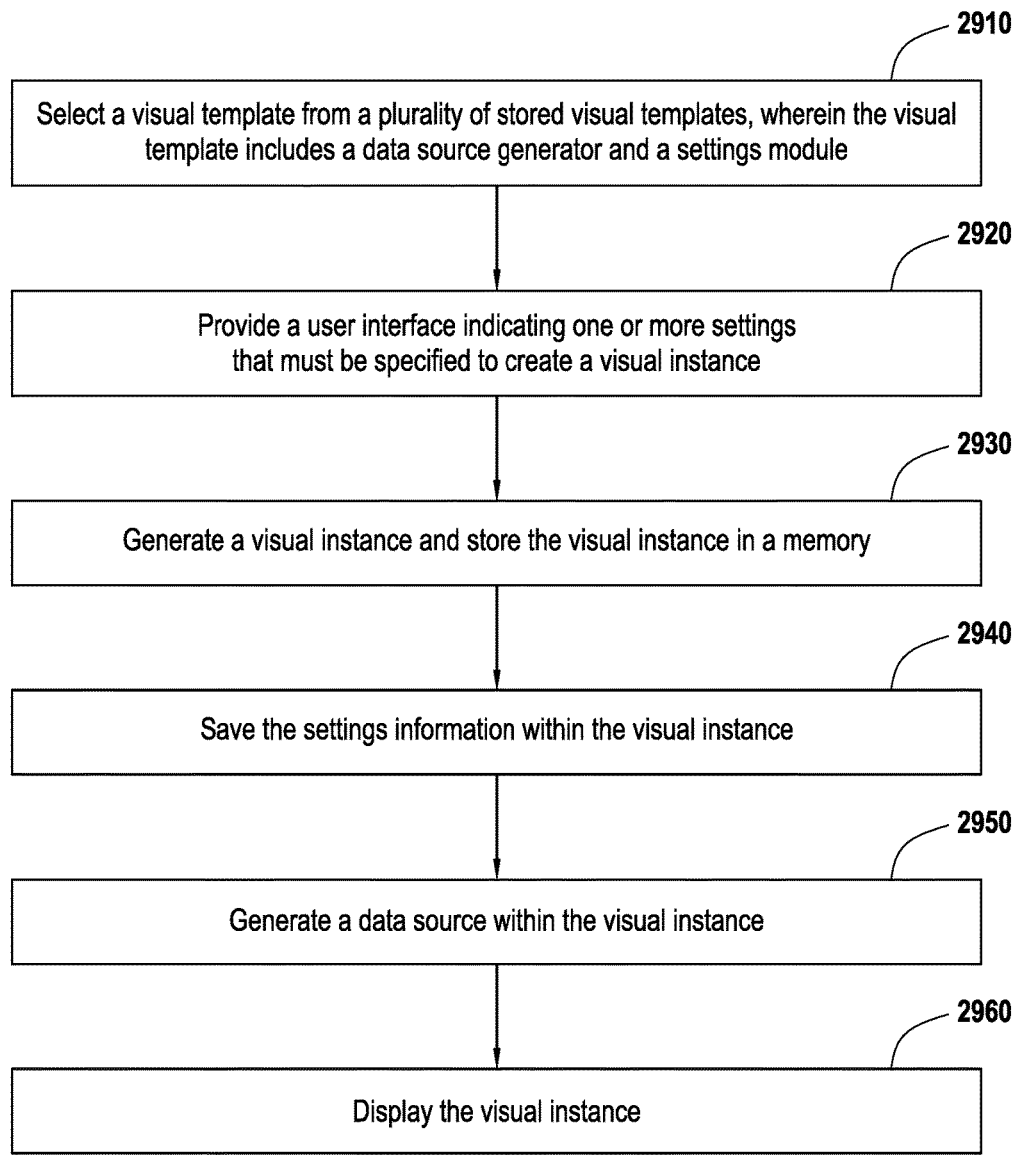
FIG. 29 is a flowchart of a method of creating a visual instance in accordance with an embodiment.

In accordance with an embodiment, a visual instance is generated and displayed based on a template selected by a user. FIG. 29 is a flowchart of a method of creating a visual instance in accordance with an embodiment.

In an illustrative embodiment, suppose that Company X wishes to monitor any comments, mentions, or discussions concerning its products or the company itself, that occur in social media. For example, it wishes to monitor mentions of its products, or of the company itself, that appear in tweets on Twitter, posts on Facebook, images on Instagram, posts on Google+, etc. Accordingly, a user (who may be an employee of Company X, for example) employs user device 2160 and accesses visual generation manager 2135 to create a visual.

In the illustrative embodiment, visual generation manager 2135 provides the user with a selection of templates each of which is a tool for constructing a visual instance, which in turn is adapted to generate a render a particular type of visual. For example, visual generation manager 2135 may cause a web page such as that shown in FIG. 23A to be displayed on user device 2160. Web page 2300 includes a plurality of templates 2303-A, 2303-B, 2303-C, 2303-D, 2303-E, and 2303-F. More or fewer templates may be displayed. Each template is associated with a different type of visual. For example, in the illustrative embodiment, Template A is associated with a visual showing a line graph of social media mentions, Template B is associated with a sentiment analysis of social media mentions, Template C is associated with a heat map of social media mentions, etc.

At step 2910, a visual template is selected by a user from a plurality of stored visual templates, wherein the visual template includes a data source generator and a settings module. In the illustrative embodiment, the user wishes to generate a visual showing a line graph of social media mentions of Company X, and therefore selects Template A. The user may select Template A by clicking on the appropriate icon displayed on the screen, for example. Visual generation manager 2135 receives the user's selection.

Each template requires the user to enter one or more parameters (referred to as settings) in order to generate a visual instance. Accordingly, at step 2920, a user interface indicating one or more settings that must be specified to create the visual instance is provided. In the illustrative embodiment, visual generation manager 2135 provides to the user one or more web pages which prompt the user to select one or more settings. FIGS. 23B-23E show web pages that prompt a user to specify various settings in accordance with an embodiment. FIG. 23B shows a page 2310 that prompts the user to select text for a banner. The user may enter text in a field 2314. In the illustrative embodiment, the user enters the text "Company X". FIG. 23C shows a page 2330 that includes a line 2333 prompting the user to select a color for the banner, and a line 2335 prompting the user to select a font for the banner. In the illustrative embodiment, the user selects the color green and the font "Times New Roman." FIG. 23D shows a page 2340 that includes a line 2342 prompting the user to select possible time intervals for the line graph in the visual. The user may select from among "Real-Time," "Day," "Week," "Month," "Year," "5-Year," and "10-year." In the illustrative embodiment, the user selects "Real-Time," "Day," "Month," and "Year." FIG. 23E shows a page 2360 that includes a line 2364 prompting the user to select the types social media for which data is to be displayed in the visual. In the illustrative embodiment, the user selects Twitter, Facebook, Instagram, and Google+. In other embodiments, page 2360 may include options for other types of social media information.

At step 2930, settings information specifying the one or more settings is received from the user. Visual generation manager 2335 receives the user's selections.

Figure 23B:
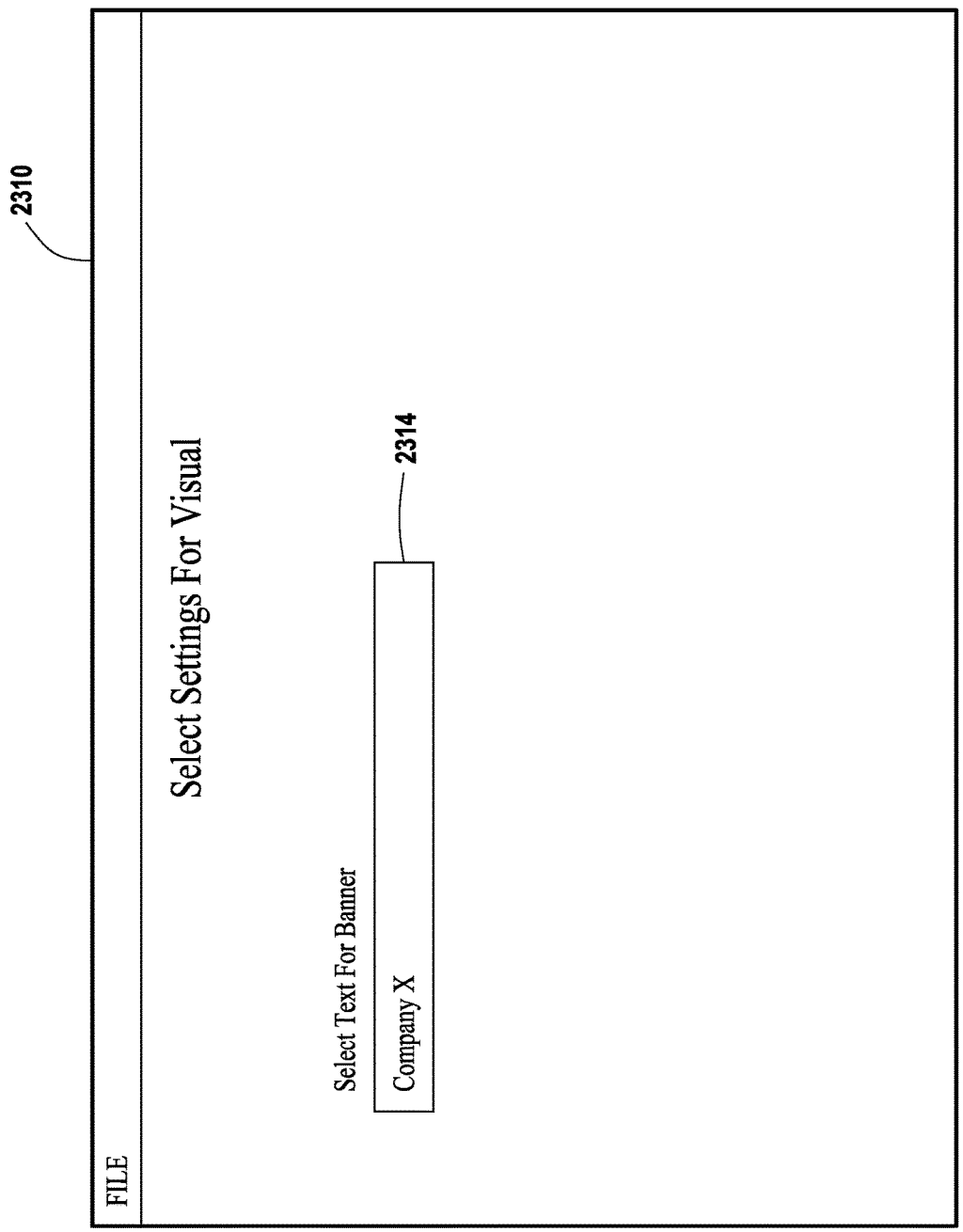
FIGS. 23B-23E show web pages that prompt a user to specify various settings in accordance with an embodiment.
Figure 23C:
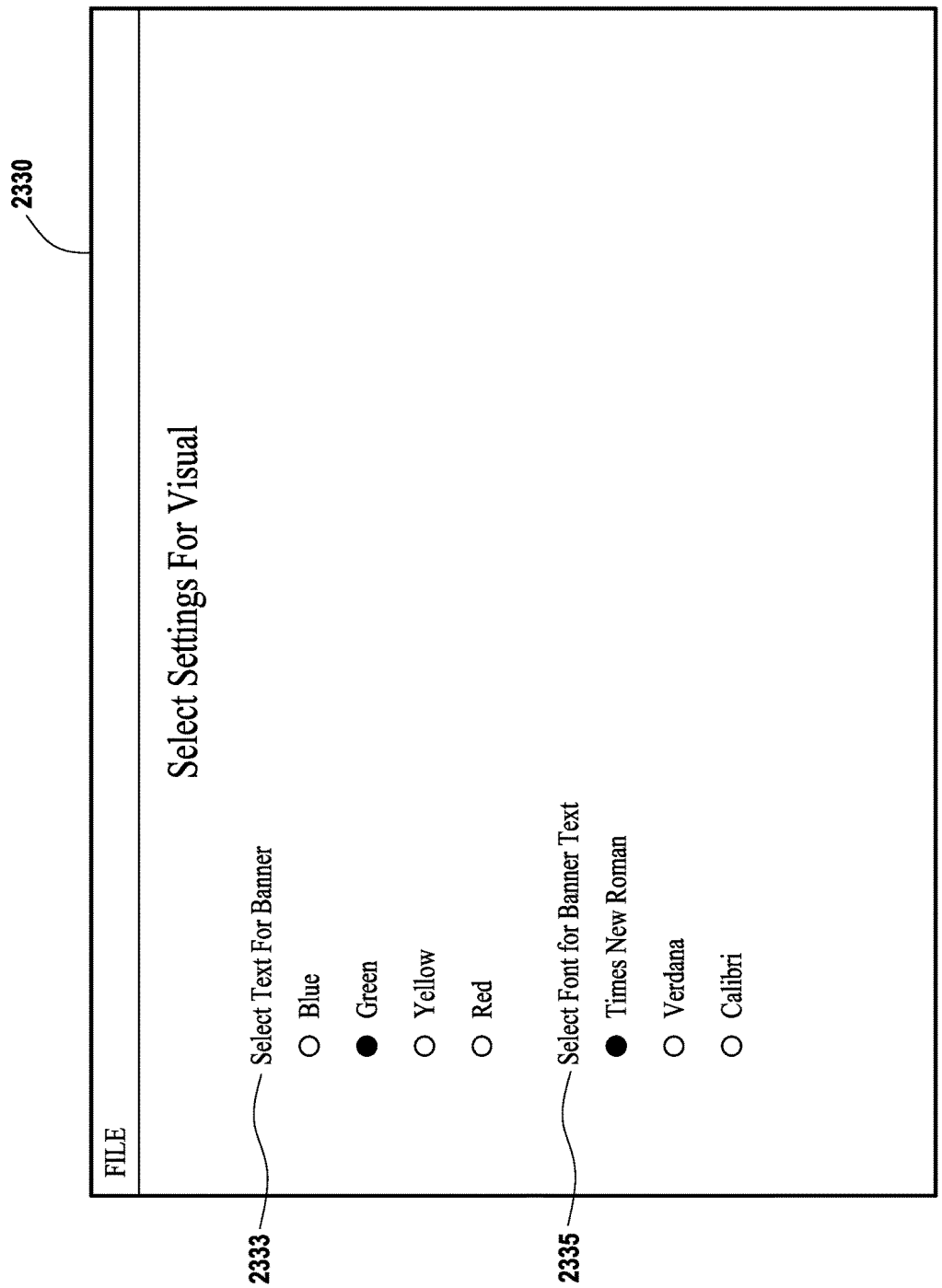
Figure 23D:
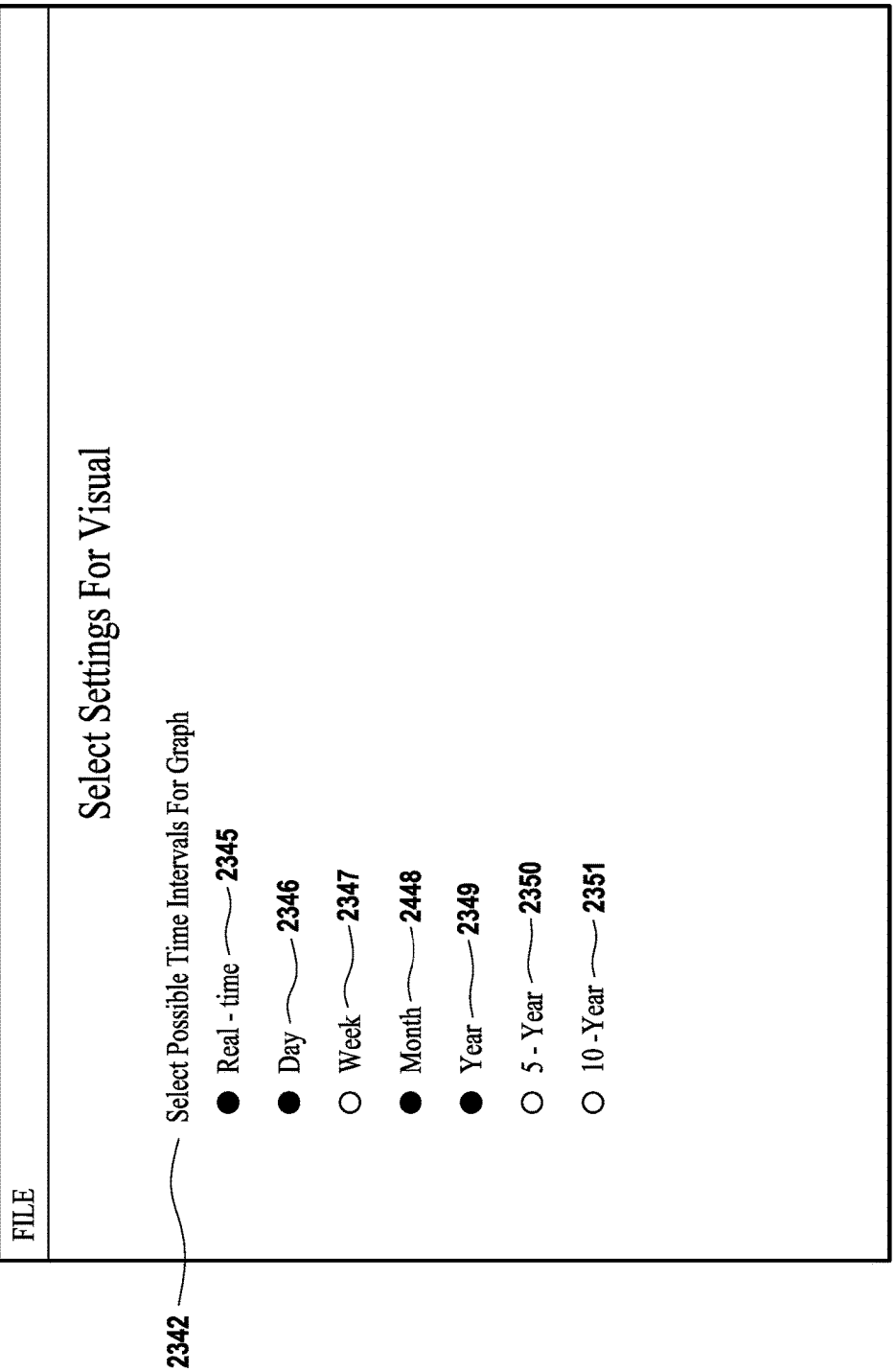
Figure 23E:
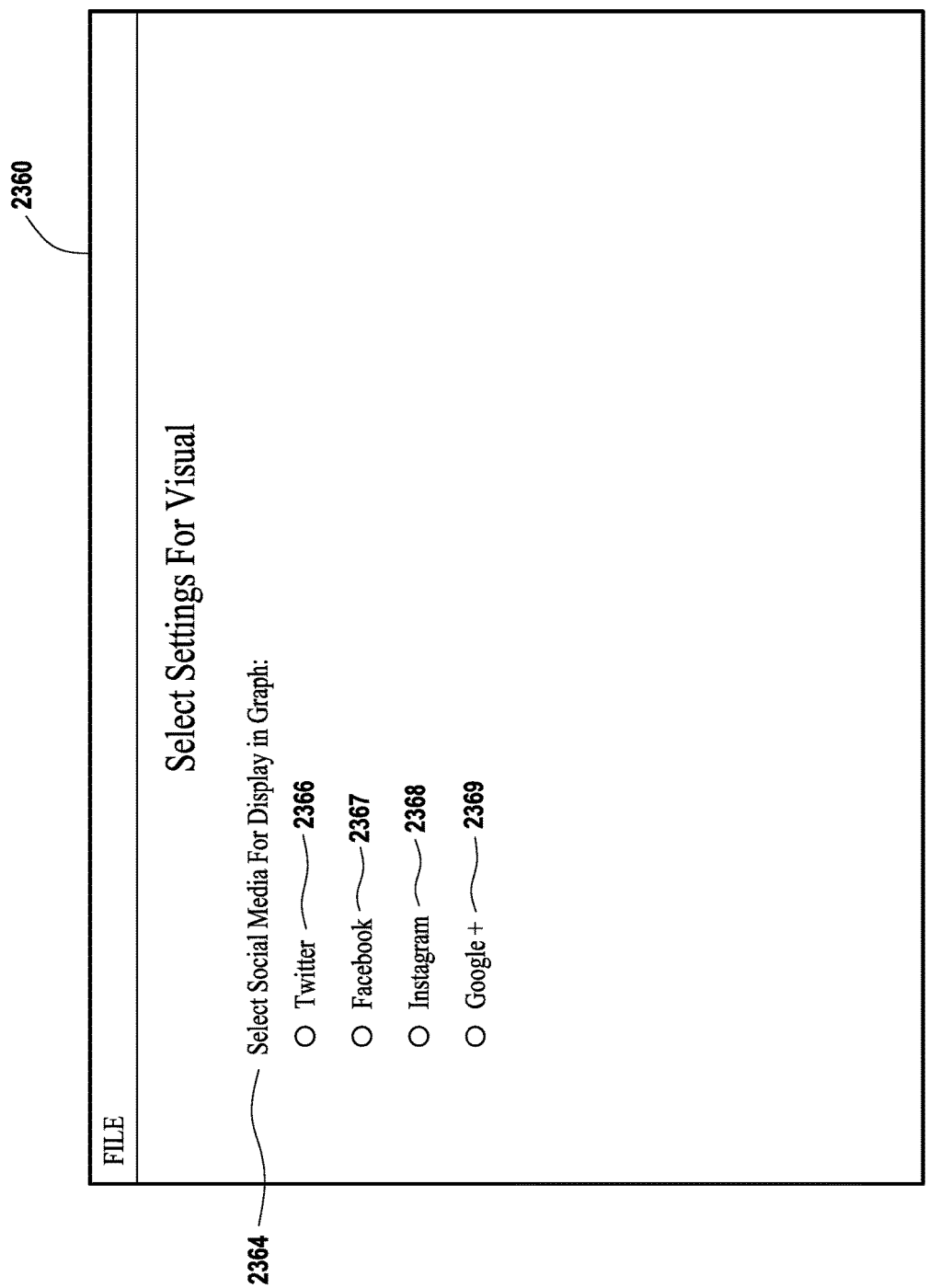
Figure 24:
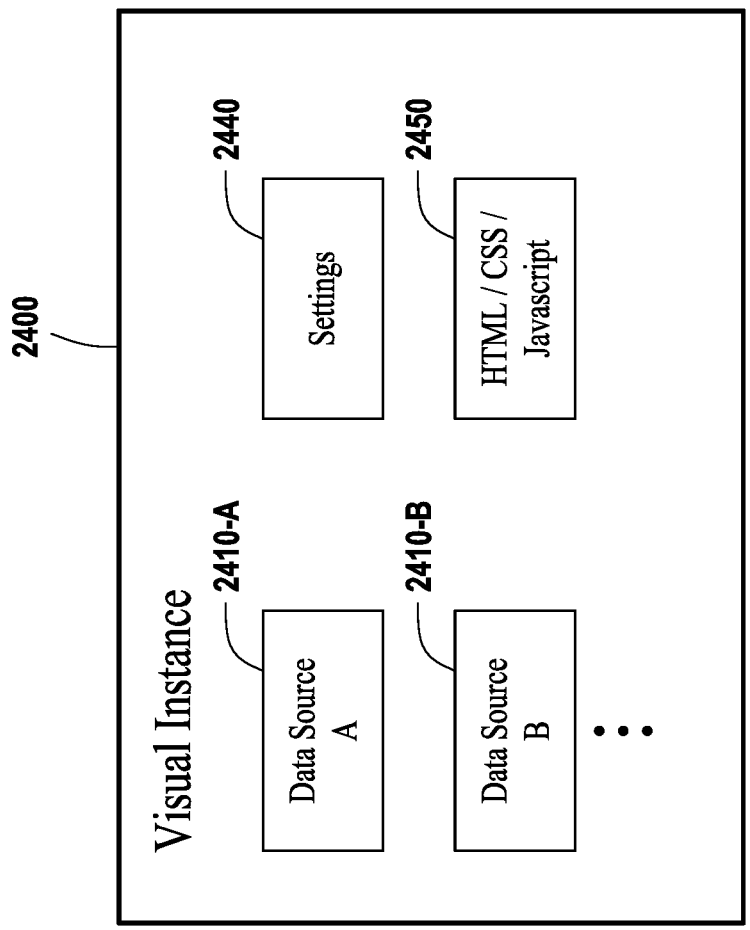
FIG. 24 shows components of a visual instance in accordance with an embodiment.

At step 2930, a visual instance is generated and stored in a memory. At step 2940, the settings information is saved within the visual instance. At step 2950, a data source is generated within the visual instance. Visual generation manager 2135 generates a visual instance based on the user's selection of Template A and on the settings specified by the user. FIG. 24 shows components of a visual instance in accordance with an embodiment. Visual instance 2400 includes a plurality of data sources 2410-A, 2420-B, etc., a settings component 2440, and an HTML/CSS/Javascript component 2450. Settings component 2440 includes information defining the settings selected by the user (as illustrated herein with reference to FIGS. 23B-23E). HTML/CSS/Javascript component 2450 includes details concerning how various elements of the visual instance are to be rendered. Each respective data source 2410 includes code capable of rendering the visual defined by the settings, or of rendering an element within the visual. A data source may include functionality to access the feed generated by feed module 2180 (or one of a plurality of feeds generated by feed module 2180), examine selected items of social media content in the feed, and render the visual defined by the user-specified settings, or an element of the visual.

Referring to FIG. 21, the visual instance is stored in visual instance database 2150 as visual instance 2157.

At a subsequent time, the visual instance may be displayed. In the illustrative embodiment, visual instance loader 2170 access visual instance 2157 and causes the visual instance to be displayed on display device 2195.

Figure 25:
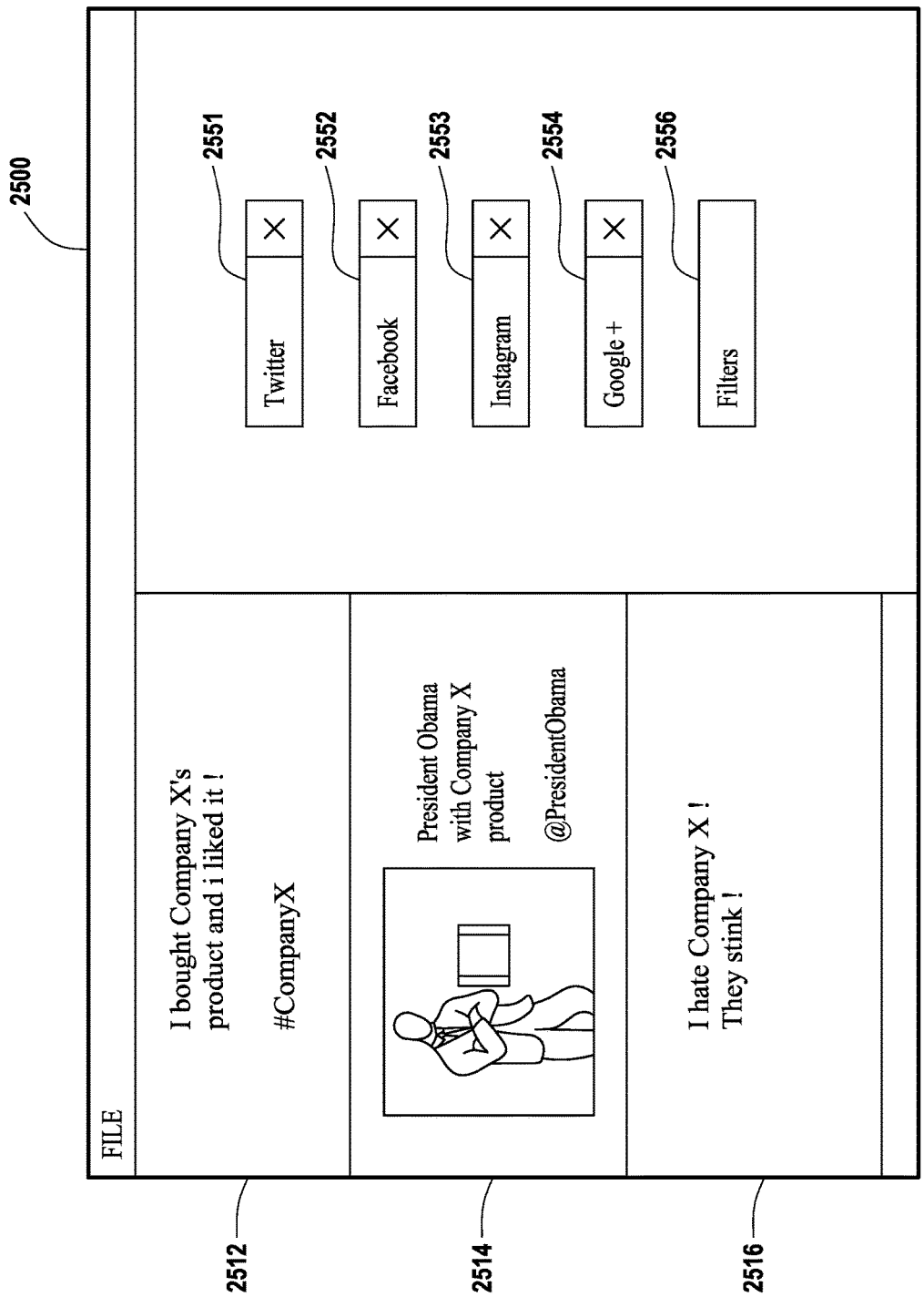
FIG. 25 shows a page which displays a feed in accordance with an embodiment.

When visual instance 2157 is displayed, data sources 2410-A, 2410-B, etc., access a feed generated by feed module 2180. In one embodiment, a feed generated by feed module 2180 may be displayed. FIG. 25 shows a page 2500 which displays a feed. Items of social media content are captured from Twitter, Facebook, Instagram, Google+ and displayed on page 2500. In the illustrative embodiment, items 2512, 2514, 2516 are displayed. A user may filter the items in the feed using buttons 2551, 2552, 2553, 2554, 2556.

Figure 26A:
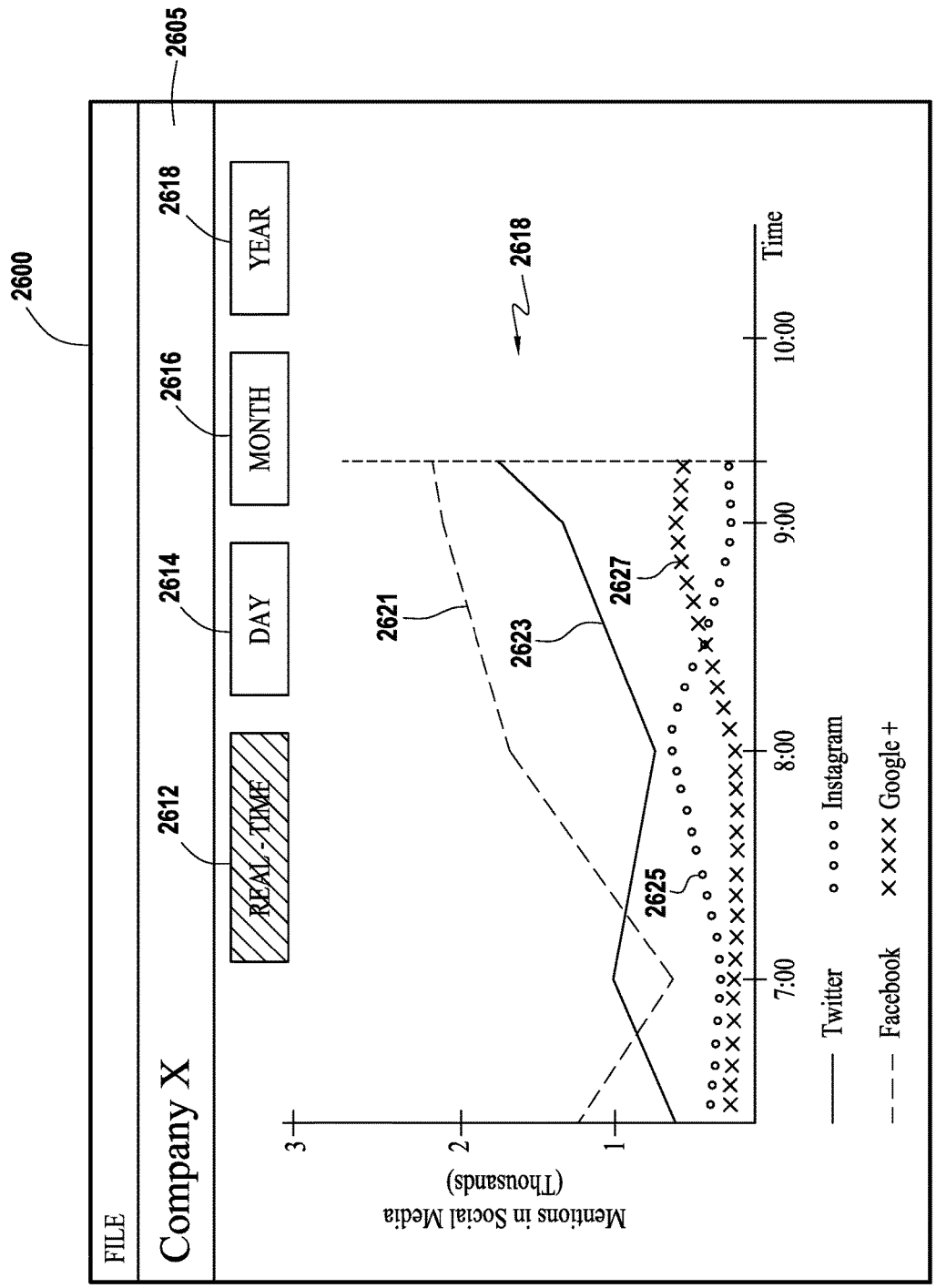
FIG. 26A shows a web page on which a visual instance is displayed in accordance with an embodiment.
Figure 26B:
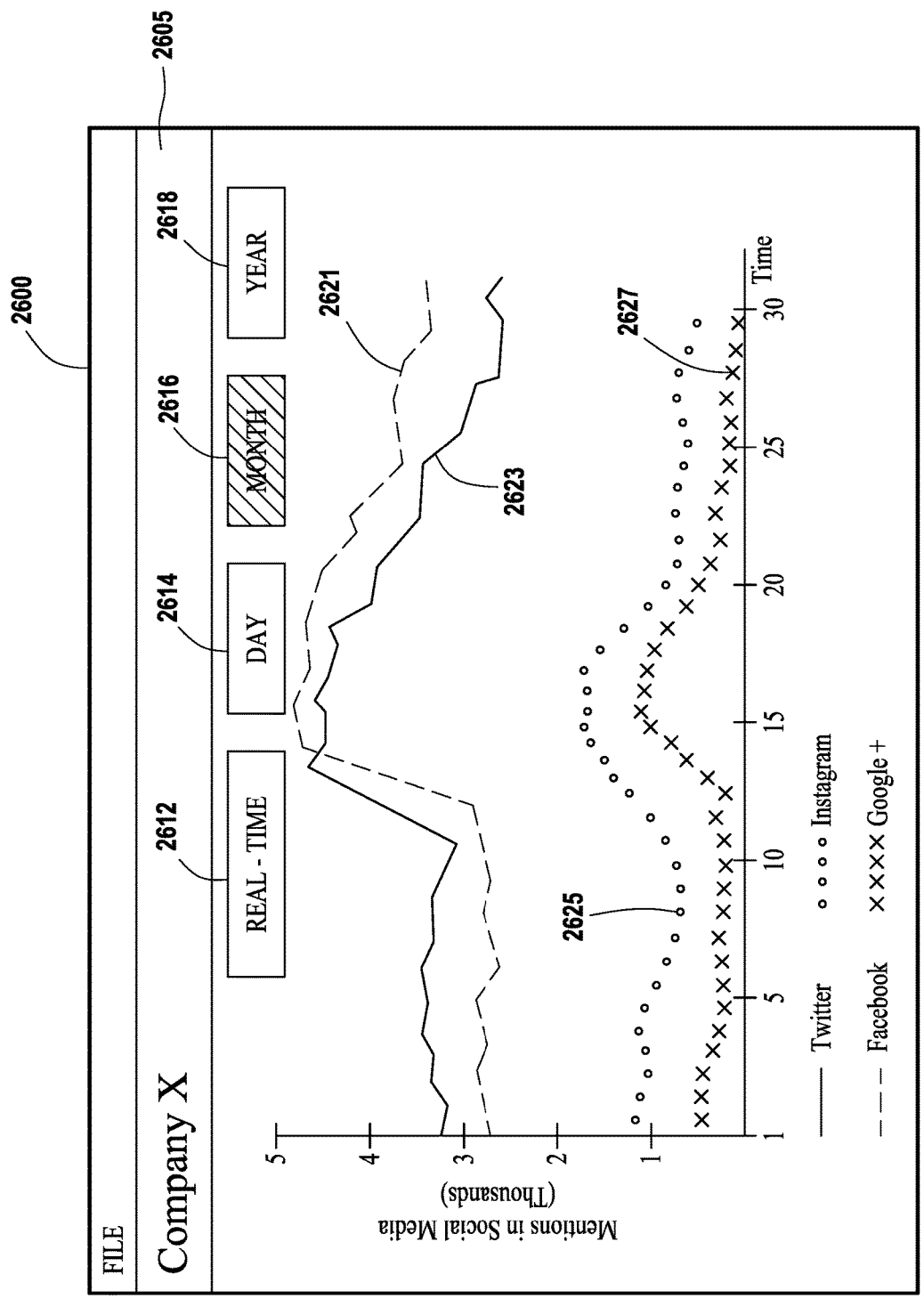
FIG. 26B shows a web page on which a visual instance is displayed in accordance with an embodiment.

At step 2960, the visual instance is displayed. In the illustrative embodiment, visual instance loader 2170 causes the visual instance to be displayed on a web page shown on display device 2195. FIG. 26A shows a web page 2600 on which a visual instance is displayed in accordance with an embodiment. The visual includes a banner 2605 that includes the text "Company X," created based on the user-specified settings. The visual also includes a line graph 2618 showing social media activity related to Company X. Specifically, the line graph includes lines 2621, 2623, 2625, and 2627 showing, respectively, a quantity of mentions of Company X on Twitter, Facebook, Instagram, and Google+. Line graph 2618 shows data in real-time. The visual shown on page 2600 includes a "Real-Time button 2612, a "Day" button 2614, a "Month" button 2616, and a "Year" button 2618 which allow the user to select a time interval for display. The user may select a desired button to view a data for a different time interval. If the user selects "Month" button 2616, data showing mentions of Company X in social media over a month are displayed, as shown in FIG. 26B.

Figure 27:
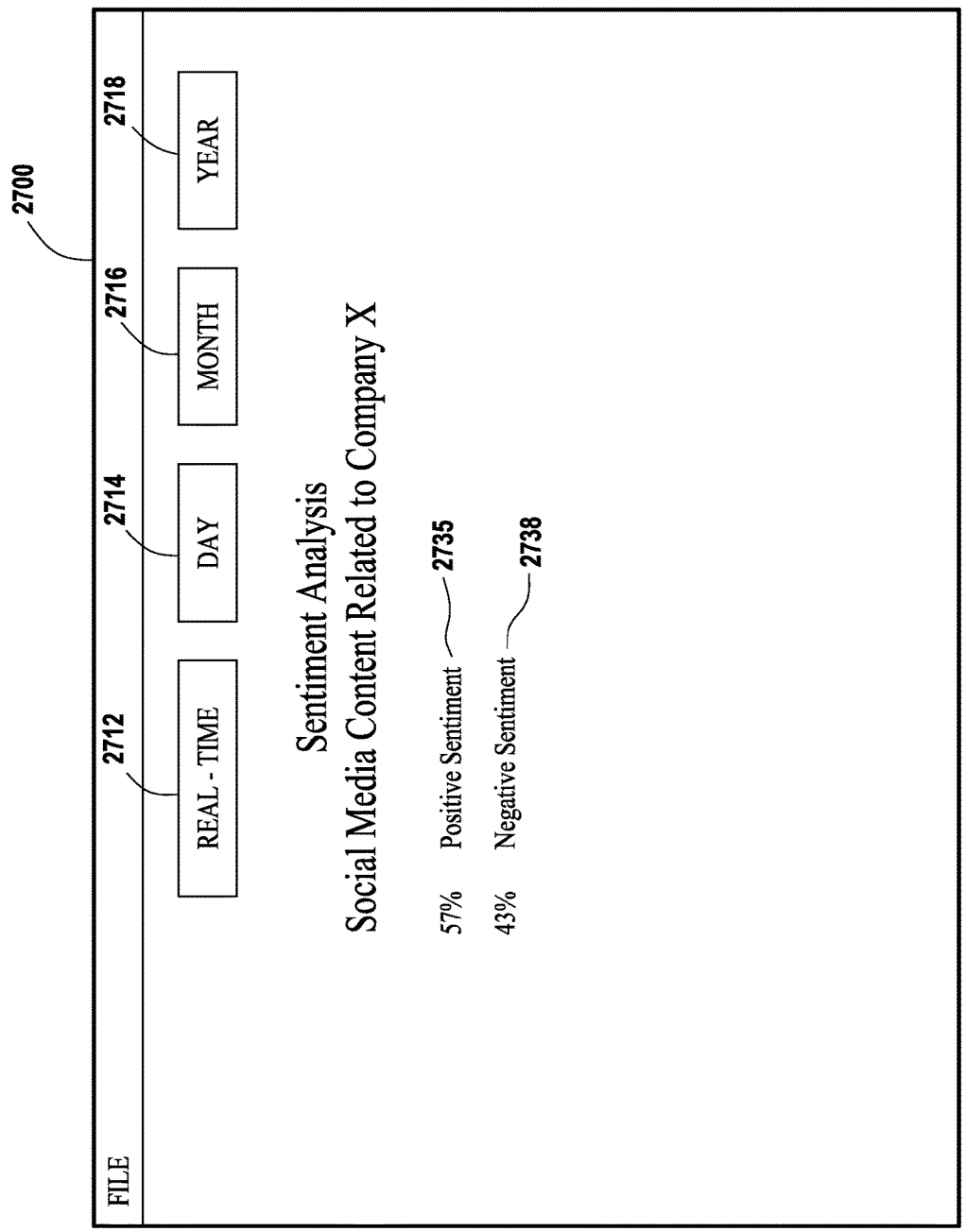
FIG. 27 shows a page displaying a visual showing positive and negative sentiments in accordance with an embodiment.

In other embodiments, visuals may display other types of data. In an illustrative embodiment, Company X may select Template B (2303-B), shown in FIG. 23A, to generate a visual showing positive and negative sentiments toward Company X in social media. A user representing Company X specifies one or more settings, in a manner similar to that described above, and visual generation manager 2135 generates a visual instance based on the user's settings. The visual instance is stored as visual instance 2185 in visual instance database 2150. Subsequently, visual instance loader 2170 displays visual instance 2185 on display device 2195. When visual 2185 is rendered, analysis module 2188 examines items of social content in a feed generated by feed module 2180 and analyzes each item to determine whether the item is associated with a positive sentiment or a negative sentiment. Analysis module 2188 determines a first value representing a percentage of items of social media content that show positive sentiment toward Company X, and a second value representing a percentage of items of social media content that show negative sentiment toward Company X. The first and second values are displayed in a visual. FIG. 27 shows a page 2700 including a visual showing positive and negative sentiments toward Company X in accordance with an embodiment.

Figure 23A:
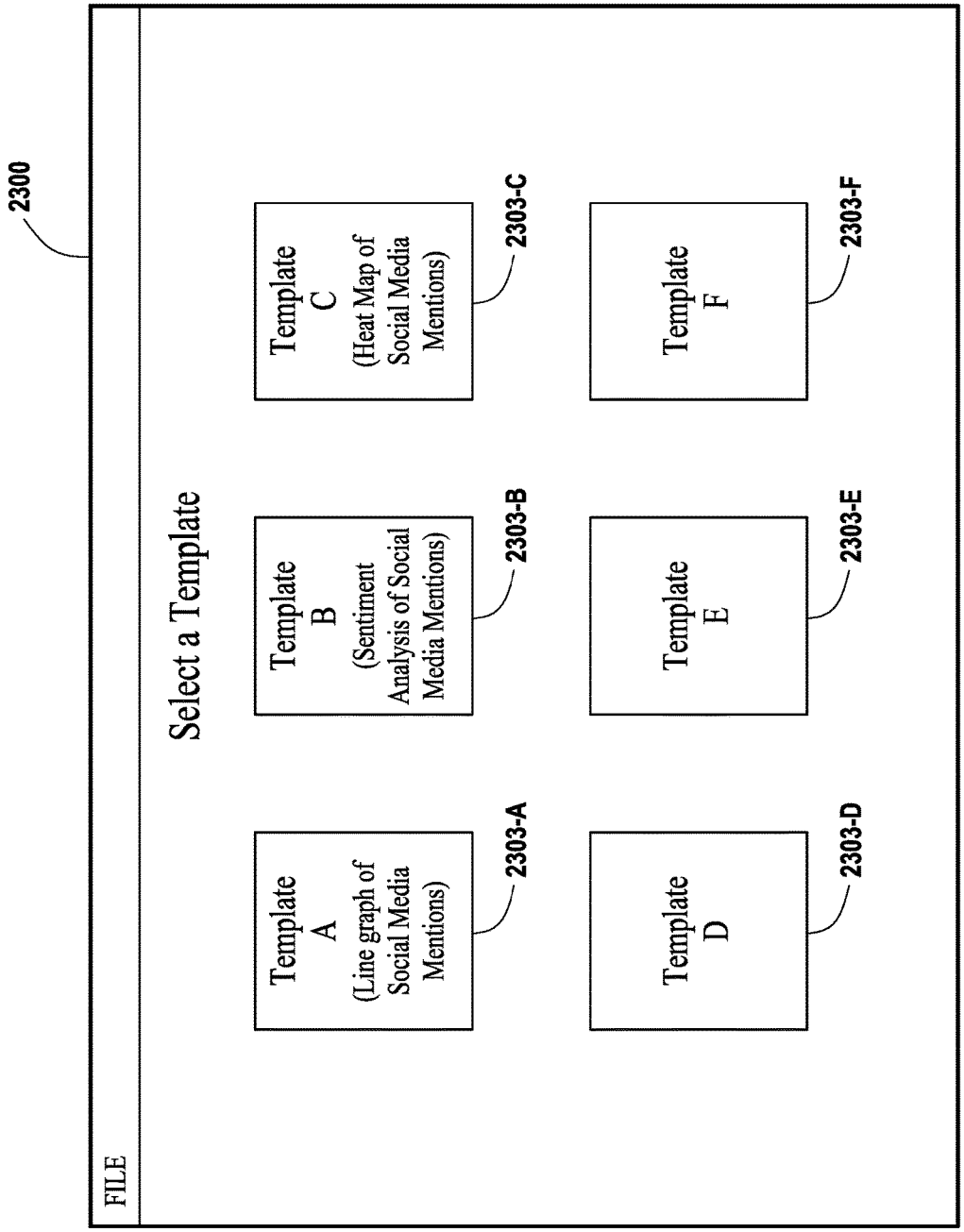
FIG. 23A shows a web page displaying a plurality of templates in accordance with an embodiment.
Figure 28:
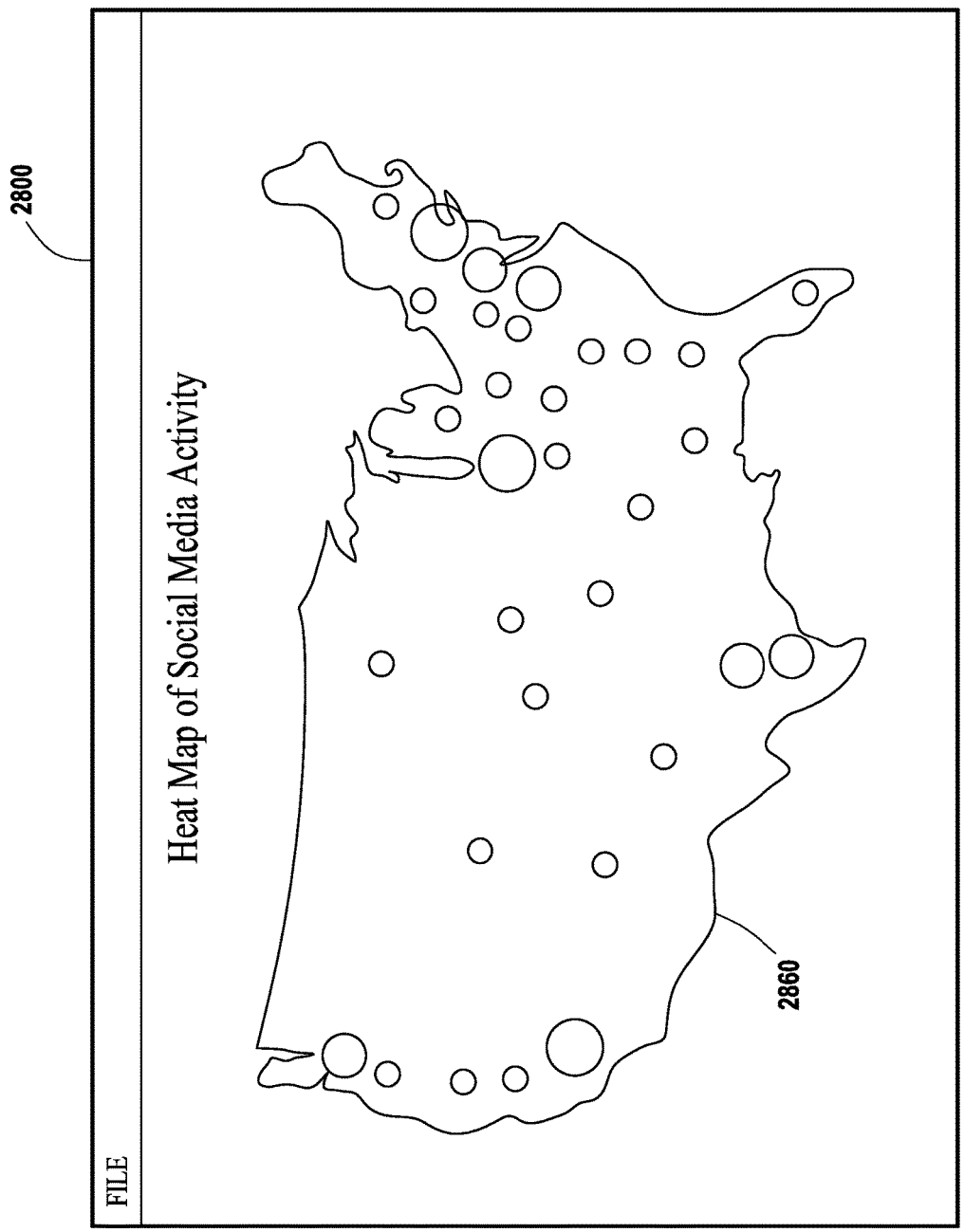
FIG. 28 shows a page displaying a visual showing a heat map of social media activity in accordance with an embodiment.

In another illustrative embodiment, Company X may select Template C (2303-C), shown in FIG. 23A, to generate a visual showing a heat map of social media activity relating to Company X. A user representing Company X specifies one or more settings, in a manner similar to that described above. For example, the user may specify that the heat map should show information for the entire continental United States. Visual generation manager 2135 then generates a visual instance based on the user's settings. The visual instance is stored in visual instance database 2150 as visual instance 2185. Subsequently, visual instance loader 2170 displays visual instance 2185 on display device 2195. When visual 2185 is rendered, analysis module 2188 examines items of social content in a feed generated by feed module 2180 and analyzes each item to determine where the item of social content was generated (where the person who created the tweet, post, tec., is located). Visual instance 2185 uses such information to render a heat map of social media activity. FIG. 28 shows a page 2800 that includes a visual showing a heat map of social media activity relating to Company X in accordance with an embodiment. In accordance with the settings specified by the user, the heat map includes a map 2860 of the continental United States and indicates various-sized circles showing the amount of social media content generated in various cities and regions in the United States.

In another embodiment (not illustrated), a template may be configured to generate a visual instance that displays tagged items of social media content selected from social media content database 2118, or from a feed, based on one or more criteria. The visual instance may also select advertising images having tags that match the selected items of social media content, and display on a display device, simultaneously, the items of social media content and the advertising images. For example, Company X may select items of social media content that show a particular product manufactured by Company X, and tag the items with the tag "Product A". Company X may also prepare an advertisement campaign with one or more advertisement images for the particular product, and tag the advertisement campaign with the tag "Product A." The Company may subsequently select a template and specify that items of social media content having the tag "Product A" are to be selected and displayed. The template then generates a visual instance adapted to select tagged items of social media content and display the items of social media content having the specified tag on a display device. The visual instance is further adapted to retrieve advertising images having a matching tag, and to display the advertising images simultaneously on a screen with the items of social media content. In another embodiment, a visual instance may be generated that is adapted to select an item of social media content from a feed, identify a topic of the item, select advertisement image related to the topic, and display the advertising image simultaneously on a screen with the item of social media content.

Advantageously, systems and methods described herein make it possible to gather and analyze, in real-time, very large quantities of items of social media content from multiple source of social media content. For example, systems and methods described herein may be used to gather and analyze millions, hundreds of millions, or even billions of tweets, Facebook posts, posts on Instagram, posts on Google+, videos on YouTube, etc., in real-time, or to analyze such data over a selected interval of time. The ability to handle such very large quantities of social media content is increasingly valuable in today's world. For example, in today's world, gauging sentiment on social media is now an important, if not crucial, component in the success of many political campaigns, advertising campaigns, product launches, movie debuts, celebrity events, etc. Notably, no existing commercially available computer or software application is capable of handling and analyzing such large amounts of social media content quickly enough to produce useful results.

Figure 30A:
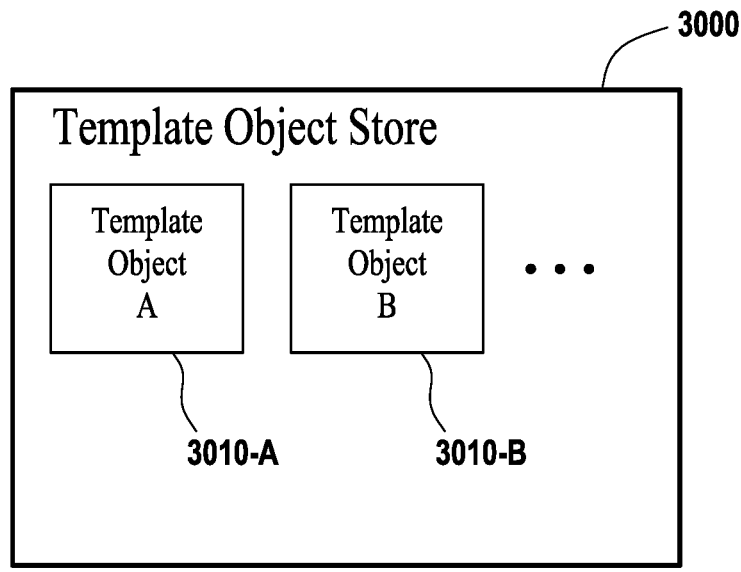
FIG. 30A shows a template object store in accordance with an embodiment.
Figure 30B:
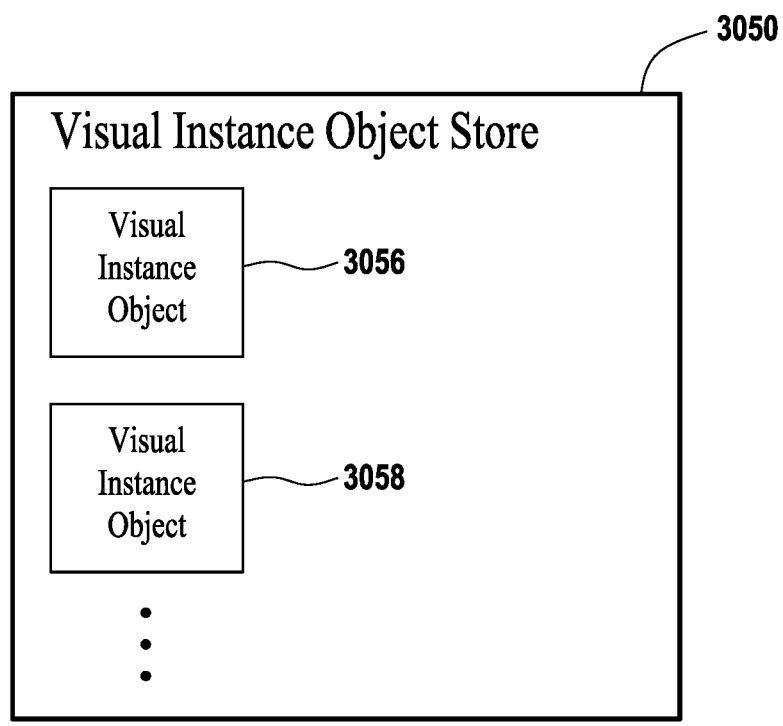
FIG. 30B shows a visual instance object store in accordance with an embodiment.

In another embodiment, templates and/or visual instances may be created and stored in the form of objects. Objects and object-oriented programming are known. For example, templates may be stored as objects in a template store. FIG. 30A shows a template object store in accordance with an embodiment. Template object store 3000 holds a template object A (3010-A) and a template object B (3010-B). Similarly, visual instances may be stored as objects in a visual instance object store. FIG. 30B shows a visual instance object store in accordance with an embodiment. Visual instance object store 3050 holds a first visual instance object 3056 and a second visual instance object 3058.

Figure 31:
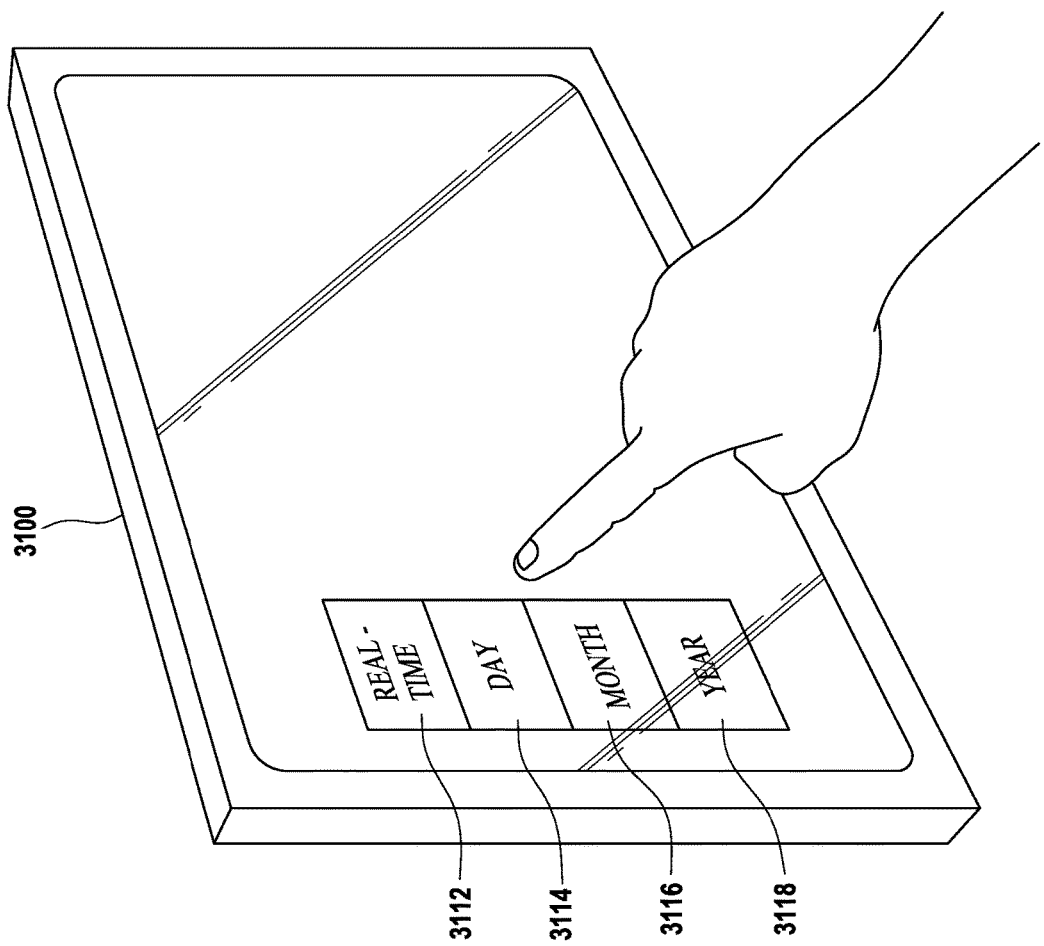
FIG. 31 shows a visual displayed on a touch screen device in accordance with an embodiment.

In one embodiment, display device 2195 includes a touch screen device. FIG. 31 shows a visual displayed on a touch screen device 3100 in accordance with an embodiment. Use of a touch-screen display device enables a user to specify settings information quickly and easily. For example, in the illustrative embodiment of FIG. 31, a user selects one or more time intervals for a line graph to be displayed in a visual.

In another embodiment, an individual attending a live event may be identified. For example, an individual watching a game in a stadium may be identified based on the individual's ticket purchase. An item of social media content associated with the individual may be selected, wherein the item of social media content has a first tag. An advertisement image having a second tag that matches the first tag is selected. A visual instance adapted to display the item of social media content and the advertisement image is generated. During the game, the visual instance is caused to display the item of social media content and the advertisement image simultaneously on a display device located in the live event (e.g., a display device located in the stadium).

Figure 32:
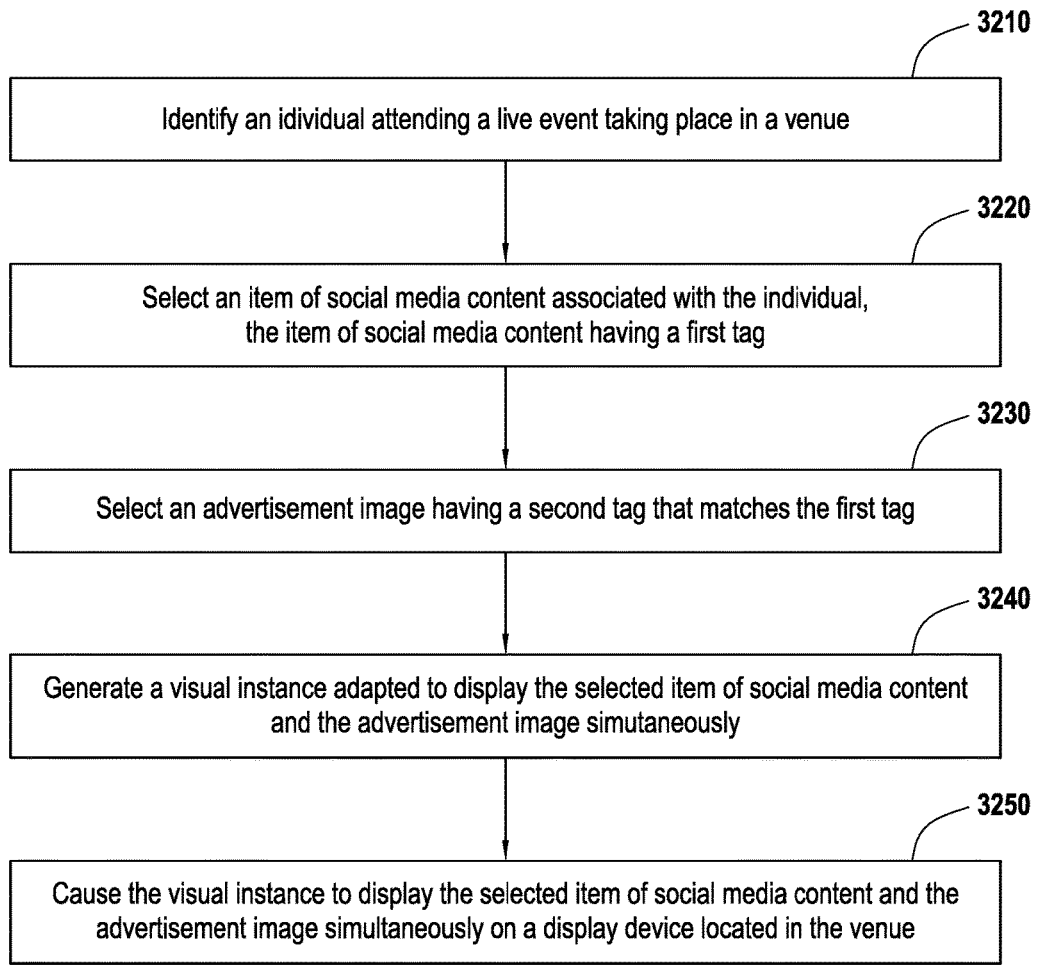
FIG. 32 is a flowchart of a method of displaying social media content and advertisements in accordance with an embodiment.

FIG. 32 is a flowchart of a method of displaying social media content and advertisements in accordance with an embodiment. The method of FIG. 32 employs systems and methods described herein and includes steps similar to those described herein.

At step 3210, an individual attending a live event taking place in a venue is identified. For example, a person at a sporting event, or at a conference may be identified based on the person's ticket purchase, registration, etc. In another embodiment, an image of an individual in the crowd at the event may be obtained, and facial recognition capability (e.g. facial recognition software) may be employed to identify the individual.

At step 3220, an item of social media content associated with the individual is selected, the item of social media content having a first tag. Items of social media content associated with the individual, such as photos of the individual, posts from the individual's Facebook page, etc., may be obtained prior to the event or during the event. The items may be tagged and stored in social media content database 2118, for example.

At step 3230, an advertisement image having a second tag that matches the first tag is selected. An advertisement image may be generated and tagged in the manner discussed above. Tagged advertisement images may be stored in advertisement campaign database 2117, for example.

At step 3240, a visual instance adapted to select the item of social media content and the advertisement image based on the tag and to display the item of social media content and the advertisement image simultaneously is generated. The visual instance may be generated prior to the live event, or during the event. At step 3250, the visual instance is caused to display the item of social media content and the advertisement image simultaneously on a display device located in the stadium. At a selected time during the event, visual instance loader may cause the visual instance to display the selected social media content and the advertisements. For example, during a sporting event at a stadium, the individual's social media content and advertisements may be displayed on a jumbotron television screen.

In various embodiments, opt-in and opt-out options may be provided to users, participants, consumers, and to other individuals to protect privacy rights. For example, persons attending a live event may be provided an option to "opt out" of participating in the system. Thus, by opting out, an individual may indicate that he or she does not wish to have his or her social media content accessed and/or used in connection with an advertisement or for any other reason. Such opt-in and opt-out options may be provided at the time of a ticket purchase, for example, via a web page on the Internet, etc.

In many fields, generating an accurate prediction for an unknown variable based on one or more known variables can provide valuable information. For example, predicting demographic information for 30,000 people in a stadium, based on limited information concerning the individuals in the crowd, can be very helpful in selecting appropriate advertisements to be displayed on display screens (including "jumbotron" television screens, for example) located in the stadium. In another example, knowledge of the demographics of people reacting to a marketing campaign on social media can be helpful in market research. However, in many instances obtaining accurate information can be difficult. Some existing systems generate a prediction for an unknown characteristic by using simple predictive formulas. For example, many systems use a majority-based predictive method to assign characteristics to individuals in a group. For example, such a system might use the fact that 72% of people having the first name "Taylor" are female (although 28% of people having the first name "Taylor" are male) and assign "Female" to any individual in the group having the first name "Taylor." Clearly, for any particular individual named "Taylor," there is a significant probability that such a system will produce an incorrect result.

Accordingly, there is a need for systems and methods capable of producing more accurate predictions of demographic information for individuals in a target audience.

Figure 33:
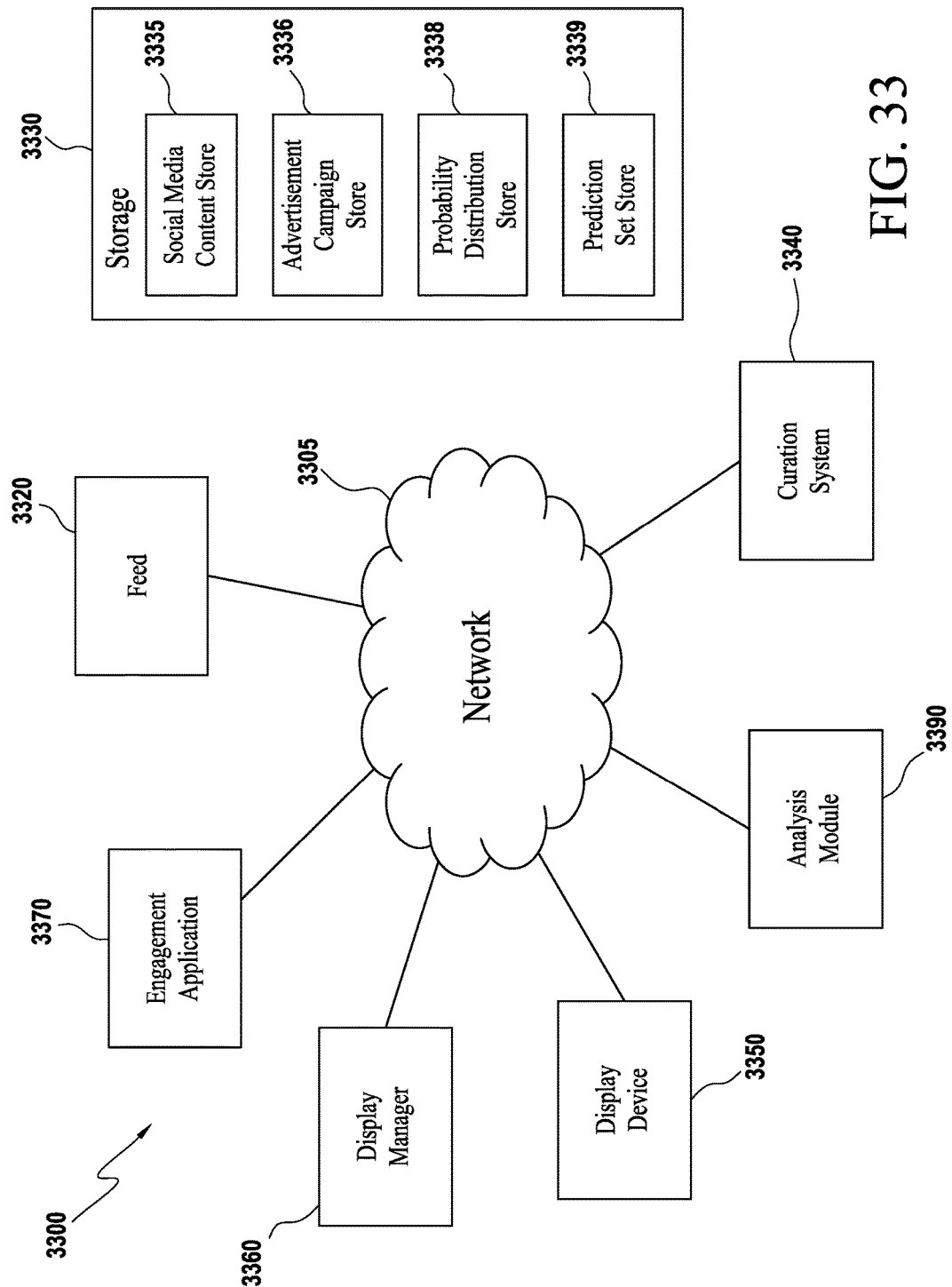
FIG. 33 shows a demographic data gathering and advertisement delivery system in accordance with an embodiment.

FIG. 33 shows a demographic data gathering and advertisement delivery system in accordance with an embodiment. System 3300 includes a network 3305, a feed 3320, a storage 3330, a curation system 3340, a display device 3350, a display manager 3360, and an engagement application 3370. System 3300 also includes an analysis module 3390.

Network 3305 may include, without limitation, the Internet and/or other types of networks such as a wireless network, a wide area network (WAN), a local area network (LAN), an Ethernet network, a storage area network, etc.

Feed 3320 includes items of social media content obtained from sources of social media content that satisfy one or more parameters. For example, feed 3320 may include items of social media content obtained from social media websites such as Twitter, Facebook, YouTube, etc.

Storage 3330 stores data including items of social media content. For example, in the illustrative embodiment, items of social media content may be stored in a social media content store 3335 maintained in storage 3330. Storage 3330 includes an advertisement campaign store 3336 that holds data, including advertisement images, relating to various advertising campaigns. In the illustrative embodiment storage 3330 also includes a probability distribution store 3338 which stores various probability distributions, and a prediction set store 3339 that holds data relating to one or more prediction sets. In other embodiments, other storage methods and other data structures may be used to store data relating to items of social media content, probability distributions, and prediction sets.

Curation system 3340 functions in a manner similar to curation system 104 described above. Curation system 3340 enables users to access stored items of social media content and to curate these items in the manner described above. For example, a user may examine each item of social media content in one or more feeds, and either delete the item, tag the item, or perform another action with respect to the item.

Display device 3350 is adapted to display text, graphics, and other types of content. For example, display device 3350 may be a television, a very large-screen television (sometimes referred to as a jumbotron), a display screen on a computer or cell phone, etc.

Display manager 3360 accesses stored items of social media content and causes the content to be displayed on display device 3350. Display manager 3360 may also cause other types of content, such as advertisements, to be displayed on display device 3350.

Engagement application 3370 functions in a manner similar to engagement application 108 described above. Thus, for example, engagement application 3370 enables a user to access and interact with curation system 3340, and to manage social media content, via a user device.

Analysis module 3390 analyzes data relating to a group of people and generates predictions concerning demographic characteristics of the group. For example, analysis module 3390 may analyze data related to a crowd in a stadium and generate predictions concerning the demographic makeup of the people in the crowd.

Figure 34:
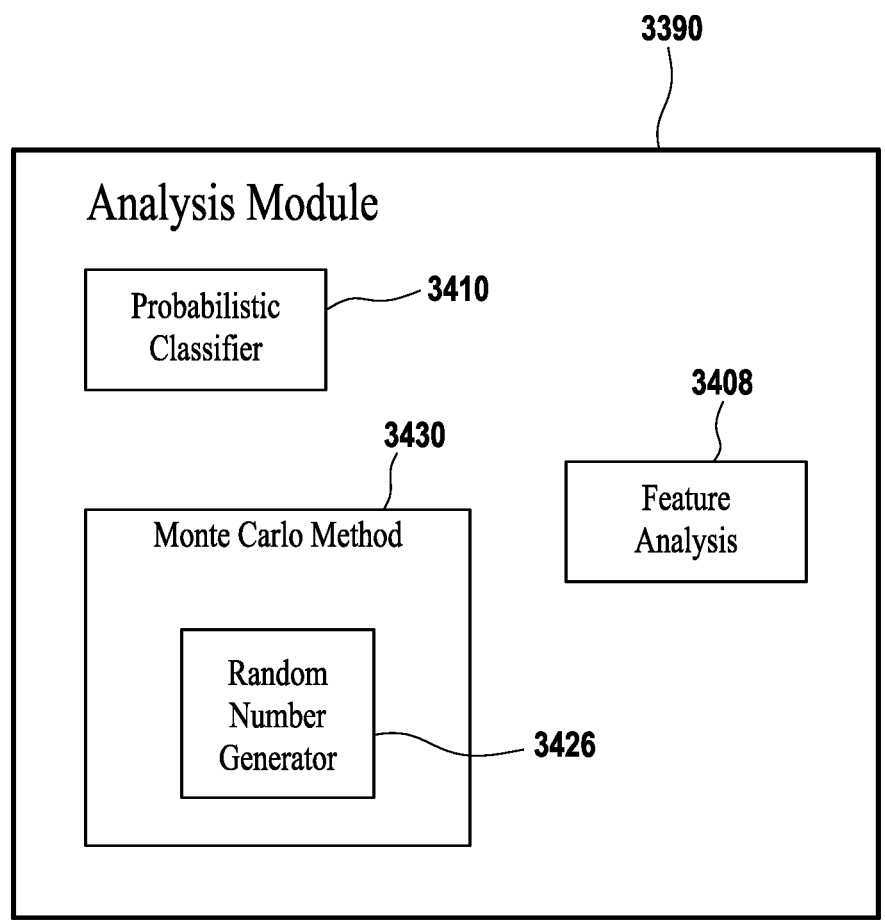
FIG. 34 shows components of an analysis module in accordance with an embodiment.

FIG. 34 shows components of an analysis module in accordance with an embodiment. Analysis module 3390 includes a feature analysis 3408, a probabilistic classifier 3410, and a Monte Carlo Method 3430. Monte Carlo Method 3430 includes a random number generator 3426. Feature analysis 3408 may identify an individual within a group of individuals based on one or more parameters. For example, feature analysis 3408 may examine all ticketholders among a crowd at a stadium and identify a ticketholder who resides in a particular state, who has a particular last name, etc. Feature analysis 3408 may also define features relating to selected characteristics of various individuals. For example, feature analysis 3408 may define various levels of income and predict a particular level of income for an individual based on other features such as name, state of residence, etc. Random number generator 3426 from time to time generates a random number, for example, when required by another component of analysis module 3390.

Probabilistic classifier 3410 includes a probabilistic classifier that is able to predict, given a sample input, a probability distribution over a set of classes. Probabilistic classifiers are known. Probabilistic classifier 3410 may include any one or more of a variety of probabilistic classifiers. For example, probabilistic classifier 3410 may include a Naïve-Bayes method.

Monte Carlo method 3430 applies a Monte Carlo method computational algorithm that relies on repeated random sampling to obtain numerical results. Monte Carlo methods are known. Monte Carlo method 3430 may include any one or more of a variety of Monte Carlo methods.

Figure 35A:
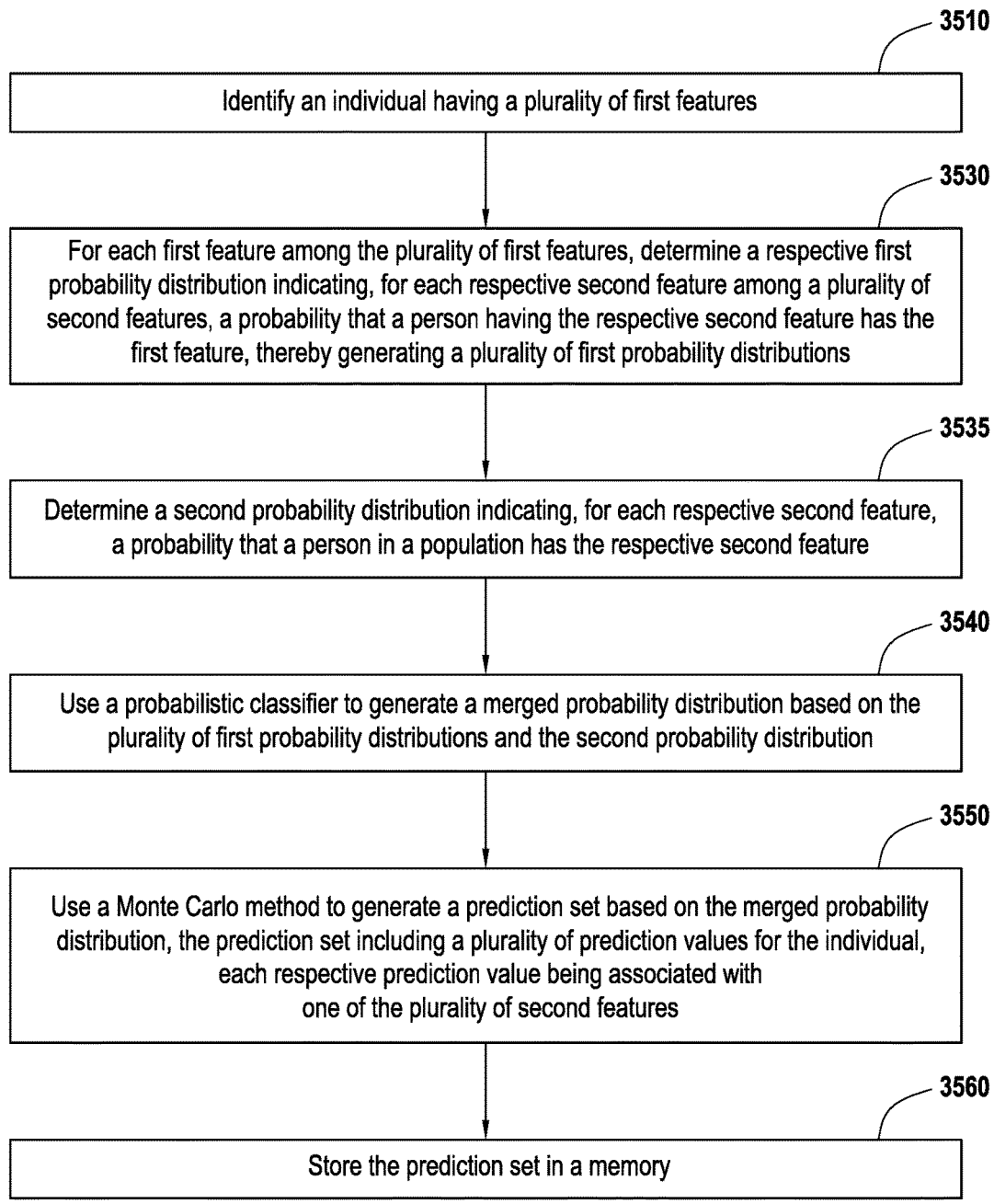
FIG. 35A is a flowchart of a method of generating a plurality of prediction sets for an individual in accordance with an embodiment.

In accordance with an embodiment, demographic data gathering and advertisement delivery system 3300 generates a plurality of prediction sets representing predictions for selected items of demographic information for a defined group of individuals. In an illustrative embodiment, suppose that it is desirable to the manager of a venue (such as a stadium) to identify an individual in a crowd at the venue, define a set of one or more known characteristics of the individual such as name, state of residence, etc., and predict an income level for the individual based on the known information. FIG. 35A is a flowchart of a method of generating a plurality of prediction sets for an individual in accordance with an embodiment. The method described herein may be repeated for a plurality of individuals at a venue to produce a plurality of prediction sets for various individuals at the venue. The prediction sets may then be used to generate predictions for particular individuals or for a group of individuals at the venue.

At step 3510, an individual having a plurality of first features is identified. In an illustrative embodiment, feature analysis 3408 examines the people attending a sporting event at a stadium, based on their ticket purchases, registration information, or other available data. Specifically, in an illustrative embodiment, feature analysis 3408 examines the following characteristics: (1) first name, (2) last name, and (3) state of residence. Suppose in particular that among the crowd attending the sporting event, feature analysis 3408 identifies an individual who has (1) the first name "James," (2) the last name "Smith," and who (3) resides in the State of New Jersey.

At step 3530, for each first feature among the plurality of first features, a respective first probability distribution indicating, for each respective second feature among a plurality of second features, a probability that a person having the respective second feature has the respective first feature, is determined, thereby generating a plurality of first probability distributions.

In the illustrative embodiment, because a prediction of the individuals' income level is desired, feature analysis 3408 defines a variety of possible income levels that an individual may have, including zero (0) to $30,000, $30,001 to $50,000, $50,001 to $80,000, $80,000 to $125,000, 125,000 to $250,000, and greater than $250,000.

Probabilistic classifier 3410 now accesses probability distribution store 3338 and retrieves a probability distribution indicating, for each of the defined income levels, a probability that a person at the respective income level may have the first name "James." The probability level may represent probabilities for a selected population, such as people in the United States, for example. In one embodiment, each respective probability distribution may be scaled to ensure that the sum of all probabilities in the distribution equals one.

Figure 36A:
FIG. 36A shows a probability distribution in accordance with an embodiment.

FIG. 36A shows a probability distribution 3610 indicating probabilities that a person at a respective income level may have the first name "James," in accordance with an embodiment. Specifically, an individual having an income between zero and $30,000 has a 0.5% probability of having the first name "James," an individual having an income between $30,001 and $50,000 has a 0.9% probability of having the first name "James," an individual having an income between $50,001 and $80,000 has a 0.5% probability of having the first name "James," an individual having an income between $80,001 and $125,000 has a 1.0% probability of having the first name "James," an individual having an income between $125,001 and $250,000 has a 1.3% probability of having the first name "James," and an individual having an income greater than $250,000 has a 0.8% probability of having the first name "James,"

The income levels and probabilities shown in FIG. 36A are purely illustrative. Alternatively, probabilistic classifier 3410 may generate a probability distribution, if necessary.

Figure 36B:
FIG. 36B shows a probability distribution in accordance with an embodiment.

Probabilistic classifier 3410 accesses probability distribution store 3338 and retrieves a probability distribution indicating, for each of the defined income levels, a probability that an individual at the respective income level may have the last name "Smith." FIG. 36B shows a probability distribution 3620 indicating probabilities that a person at a respective income level may have the last name "Smith," in accordance with an embodiment. Specifically, an individual having an income between zero and $30,000 has a 0.8% probability of having the last name "Smith," an individual having an income between $30,001 and $50,000 has a 1.2% probability of having the last name "Smith," an individual having an income between $50,001 and $80,000 has a 0.4% probability of having the last name "Smith," an individual having an income between $80,001 and $125,000 has a 0.6% probability of having the last name "Smith," an individual having an income between $125,001 and $250,000 has a 0.9% probability of having the last name "Smith," and an individual having an income greater than $250,000 has a 1.1% probability of having the last name "Smith."

The income levels and probabilities shown in FIG. 36B are purely illustrative. Alternatively, probabilistic classifier 3410 may generate a probability distribution.

Figure 36C:
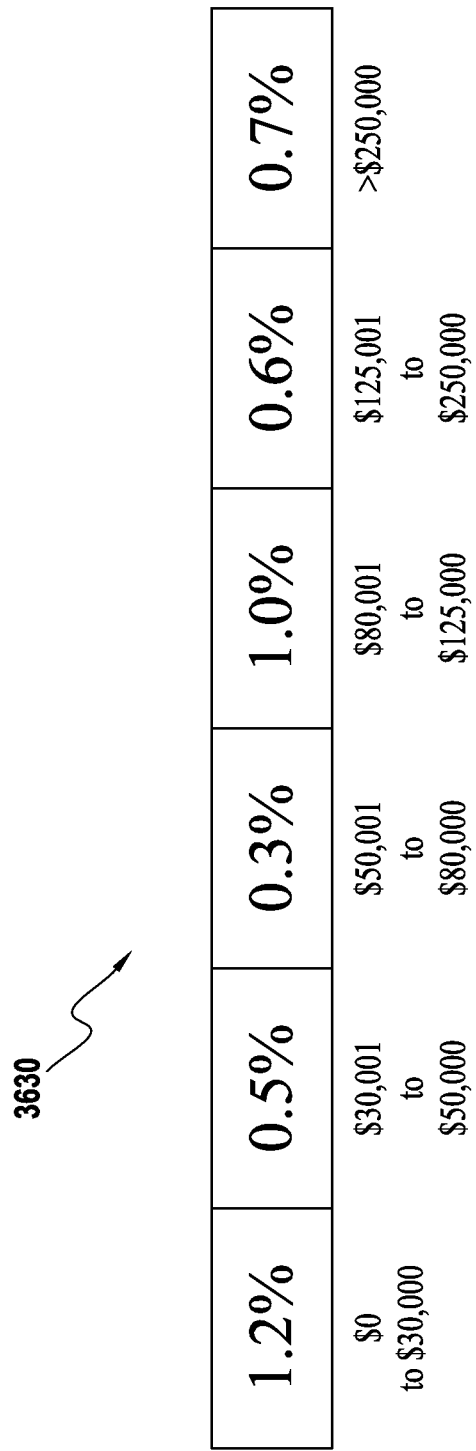
FIG. 36C shows a probability distribution in accordance with an embodiment.

Probabilistic classifier 3410 accesses probability distribution store 3338 and retrieves a probability distribution indicating, for each of the defined income levels, a probability that an individual at the respective income level may reside in the State of New Jersey. FIG. 36C shows a probability distribution 3630 indicating probabilities that an individual at a respective income level may reside in New Jersey, in accordance with an embodiment. Specifically, an individual having an income between zero and $30,000 has a 1.2% probability of residing in New Jersey, an individual having an income between $30,001 and $50,000 has a 0.5% probability of residing in New Jersey, an individual having an income between $50,001 and $80,000 has a 0.3% probability of residing in New Jersey, an individual having an income between $80,001 and $125,000 has a 1.0% probability of residing in New Jersey, an individual having an income between $125,001 and $250,000 has a 0.6% probability of residing in New Jersey, and an individual having an income greater than $250,000 has a 0.7% probability of residing in New Jersey.

The probabilities shown in FIG. 36C are purely illustrative only. Alternatively, a probability distribution may be generated.

Figure 36D:
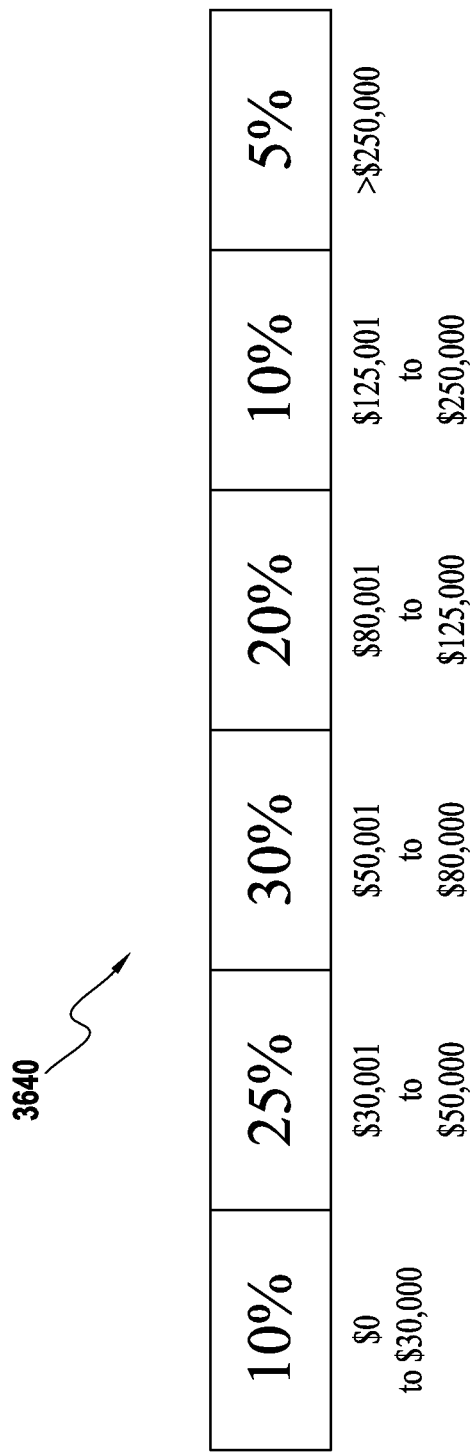
FIG. 36D shows a probability distribution in accordance with an embodiment.

At step 3535, a second probability distribution indicating, for each respective second feature, a probability that a person in a population has the respective second feature, is determined. In the illustrative embodiment, probabilistic classifier 3410 also accesses probability distribution store 3338 and retrieves a fourth probability distribution indicating, for each of the defined income levels, a probability that any given individual in a population may have that respective income level (independent of other features). For example, probabilistic classifier 3410 may obtain a probability distribution indicating, for each defined income level, the probability that a person living in the United States has the respective income level. FIG. 36D shows a probability distribution 3640 indicating probabilities that an individual in a population may have a respective income level, in accordance with an embodiment. Specifically, an individual in the population has a 10% probability of having an income between zero and $30,000, a 25% probability of having an income between $30,001 and $50,000, a 30% probability of having an income between $50,001 and $80,000, a 20% probability of having an income between $80,001 and $125,000, a 10% probability of having an income between $125,001 and $250,000, and a 5% probability of having an income greater than $250,000.

The probabilities shown in FIG. 36D are purely illustrative only. Alternatively, a probability distribution may be generated.

Figure 37:
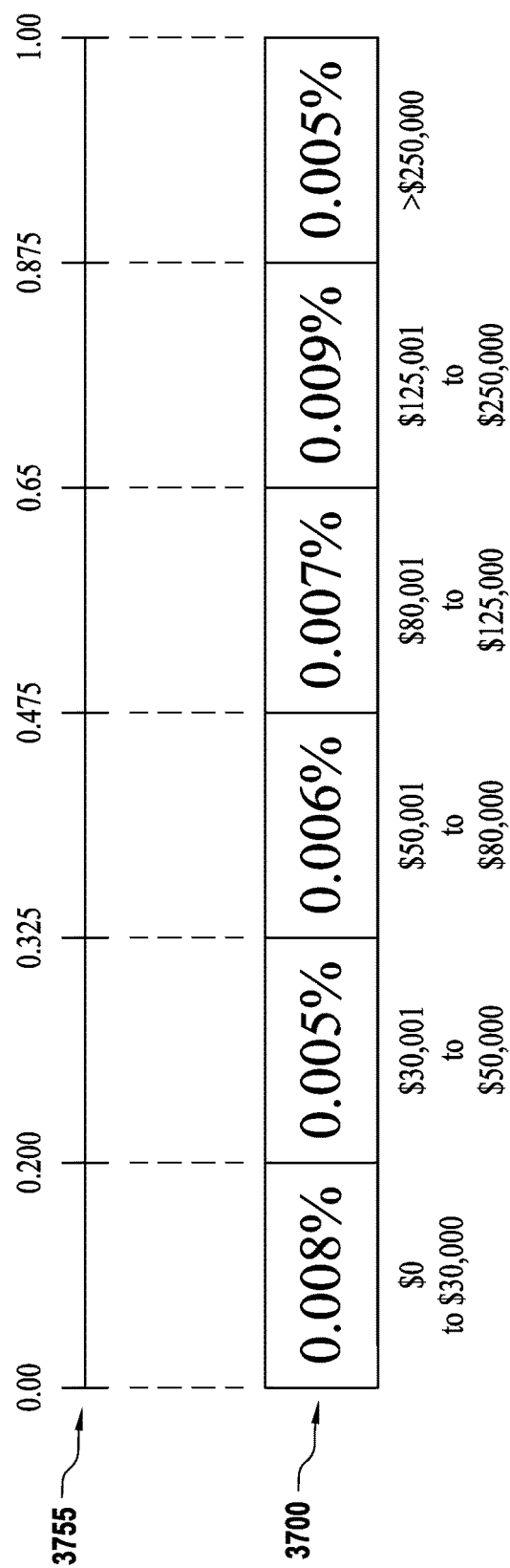
FIG. 37 shows a merged probability distribution in accordance with an embodiment.

At step 3540, a probabilistic classifier is used to generate a merged probability distribution based on the plurality of first probability distributions and the second probability distribution. Referring to FIG. 34, probabilistic classifier 3410 combines probability distributions 3610, 3620, 3630, and 3640 to generate a merged probability distribution. FIG. 37 shows a merged probability distribution in accordance with an embodiment. Merged probability distribution 3700 indicates there is a 0.008% probability that an individual having the first name "James," the last name "Smith," and resides in the state of New Jersey has an income between zero and $30,000, a 0.005% probability that an individual having the first name "James," the last name "Smith," and resides in the state of New Jersey has an income between $30,001 and $50,000, a 0.006% probability that an individual having the first name "James," the last name "Smith," and resides in the state of New Jersey has an income between $50,001 and $80,000, a 0.007% probability that an individual having the first name "James," the last name "Smith," and resides in the state of New Jersey has an income between $80,001 and $125,000, a 0.009% probability that an individual having the first name "James," the last name "Smith," and resides in the state of New Jersey has an income between $125,001 and $250,000, and a 0.005% probability that an individual having the first name "James," the last name "Smith," and resides in the state of New Jersey has an income greater than $250,000. The probabilities shown in FIG. 37 are purely illustrative only.

Probabilistic classifier 3410 also generates a scale 3755 based on probability distribution 3700 that includes a plurality of numerical ranges between zero (0.00) and one (1.00), and establishes correspondences between ranges of numbers on the scale and respective income levels. For example, probabilistic classifier 3410 may scale the probability values in probability distribution to define a plurality of scaled values having a sum equal to one (1.00). In the illustrative embodiment of FIG. 37, numbers from 0 to 0.200 correspond to the income level between 0 and $30,000, numbers between 0.200 and 0.325 correspond to the income level between $30,001 and $50,000, numbers between 0.325 and 0.475 correspond to the income level between $50,001 and $80,000, numbers between 0.475 and 0.65 correspond to the income level between $80,001 and $125,000, numbers between 0.65 and 0.875 correspond to the income level between $125,001 and $250,000, and numbers between 0.875 and 1.00 correspond to income levels greater than $250,000.

In other embodiments, numerical ranges may be scaled differently. For example, ranges between zero and one hundred may be used.

Probabilistic classifier 3410 stores merged probability distribution 3700 and scale 3755 in probability distribution store 3338.

Figure 38:
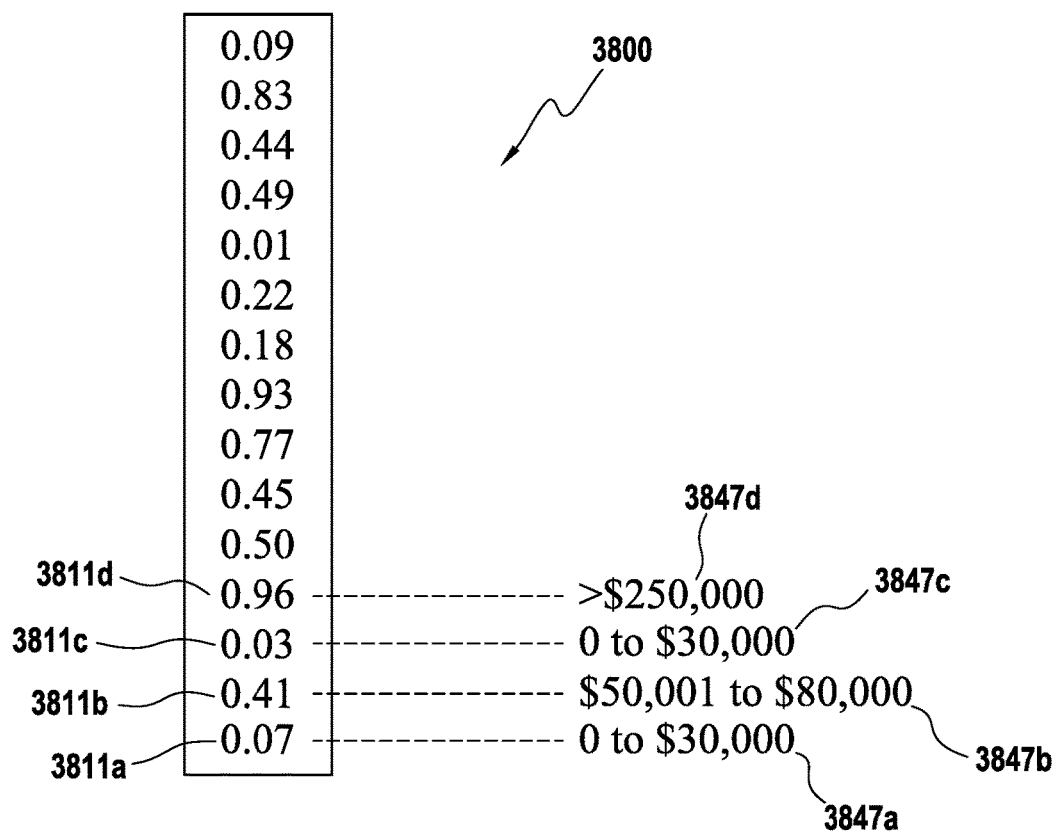
FIG. 38 shows an illustrative example of a prediction set in accordance with an embodiment.

Referring again to the routine of FIG. 35, at step 3550, a Monte Carlo method is used to generate a prediction set based on the merged probability distribution, the prediction set including a plurality of prediction values for the individual, each respective prediction value representing one of the plurality of second features. In the illustrative embodiment of FIG. 34, Monte Carlo Method 3430 performs a plurality of tests. Each test includes generation of a random number between zero (0.00) and one (1.000) (referred to as a "test result" or a "prediction value"). Monte Carlo Method 3430 may cause random number generator 3426 to generate a random number for each test. The test result may be used to identify a position on scale 3755 that corresponds to the test result, and to determine an income level on merged probability distribution 3700 that corresponds to the test result. For each individual in the group, a plurality of test results, referred to as a "prediction set," is generated. A prediction set may include any number of test results. For example, a prediction set may include 100,000 test results, fewer than 100,000 test results, or more than 100,000 test results. FIG. 38 shows an illustrative example of a prediction set in accordance with an embodiment. Prediction set 3800 includes a plurality of test results including test results 3811a, 3811b, 3811c, 3811d. Each test result 3811 may be placed on scale 3755 of FIG. 37 to identify a corresponding income level. Thus, in FIG. 38, each test result 3811 corresponds to a respective income level 3847. Thus, test result 3811a corresponds to income level 3847a, test result 3811b corresponds to income level 3847b, etc.

In one embodiment, the systems and methods described above may be used to generate a separate prediction set for each individual in a plurality of individuals. For example, various individuals in a crowd at a venue such as a stadium may be identified, and for each individual, one or more features may be determined, and a prediction set may be generated for the individual. In this manner, a plurality of prediction sets may be generated for a plurality of people at a venue.

At step 3560, the prediction set is stored in a memory. In the illustrative embodiment of FIG. 33, Monte Carlo method 3430 stores the prediction set in prediction set store 3339. If multiple prediction sets are generated for a plurality of individuals, a plurality of predictions sets may be stored.

Figure 35B:
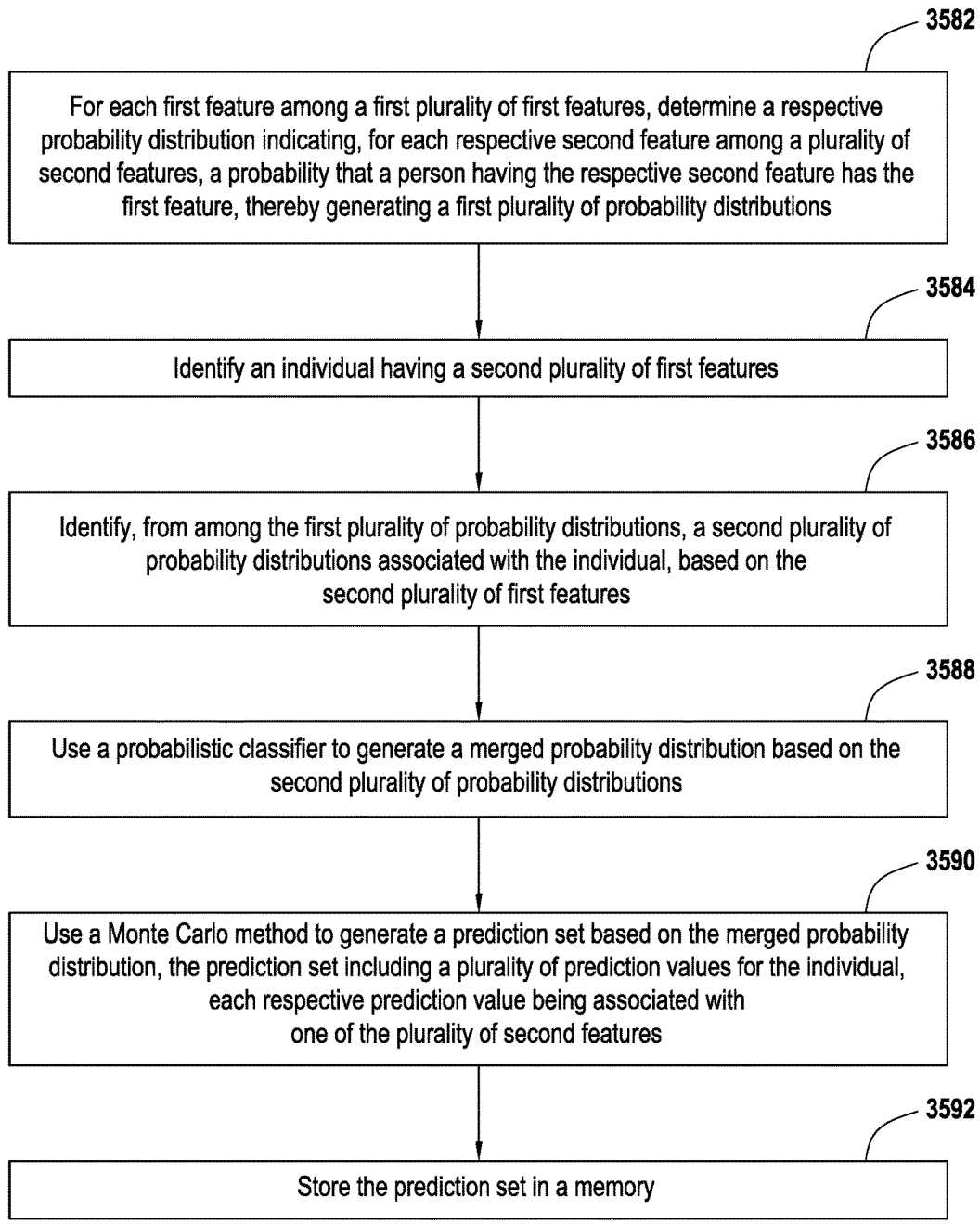
FIG. 35B is a flowchart of a method of generating a plurality of prediction sets for an individual in accordance with another embodiment.

FIG. 35B is a flowchart of a method of generating a plurality of prediction sets for an individual in accordance with another embodiment. At step 3582, for each first feature among a first plurality of first features, a respective probability distribution indicating, for each respective second feature among a plurality of second features, a probability that a person having the respective second feature has the first feature, is determined, thereby generating a first plurality of probability distributions. At step 3584, an individual having a second plurality of first features is identified. At step 3586, a second plurality of probability distributions associated with the individual is identified from among the first plurality of probability distributions, based on the second plurality of first features. At step 3588, a probabilistic classifier is used to generate a merged probability distribution based on the second plurality of probability distributions. Other probability distributions may also be obtained and used in generating the merged probability distribution. At step 3590, a Monte Carlo method is used to generate a prediction set based on the merged probability distribution, the prediction set including a plurality of prediction values for the individual, each respective prediction value being associated with one of the plurality of second features. At step 3592, the prediction set is stored in a memory.

Figure 39:
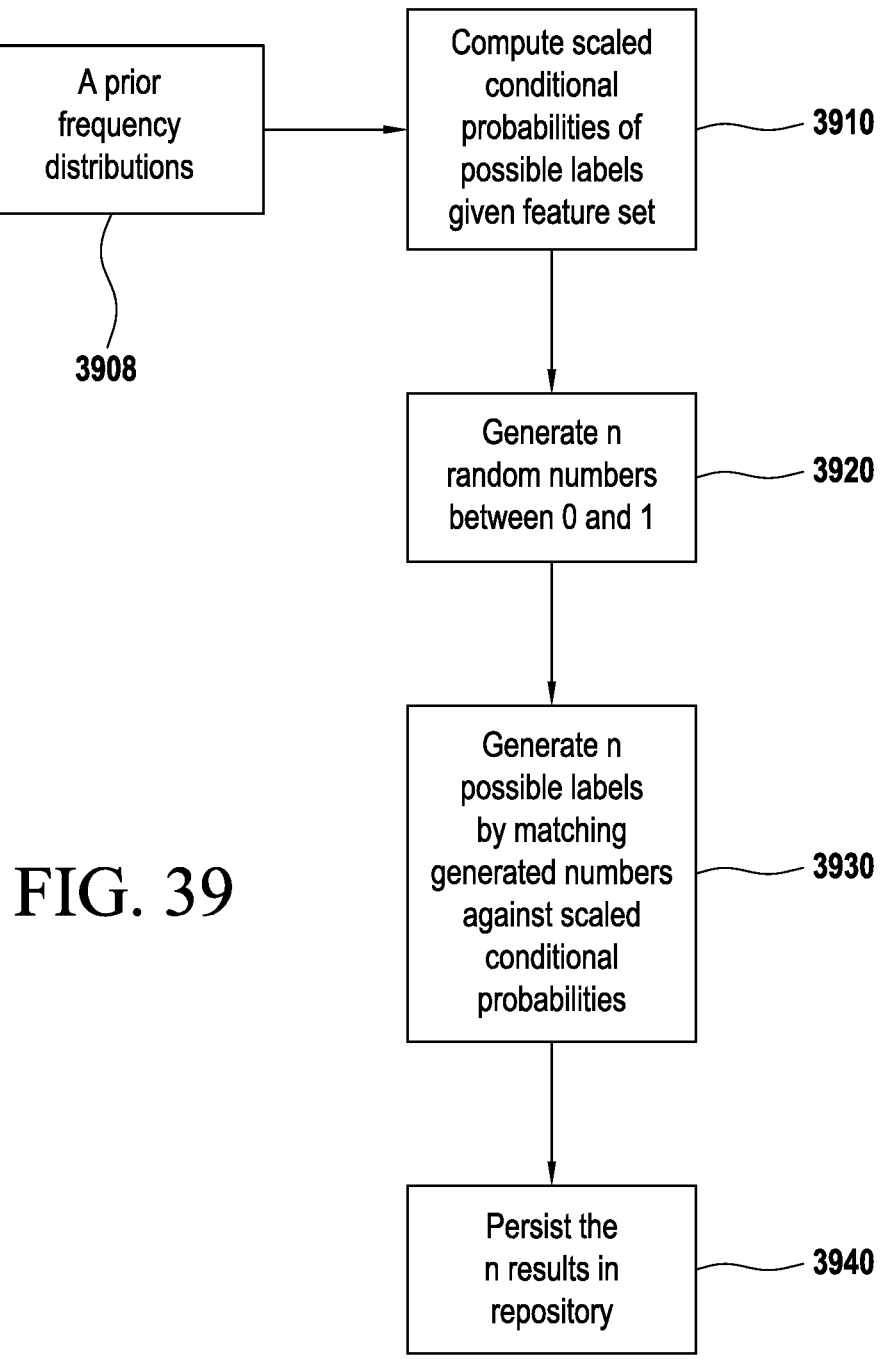
FIG. 39 is a flowchart of a method of generating a plurality of prediction sets for a plurality of individuals in accordance with an embodiment.

In one embodiment, probabilistic classifier 3410 employs a Naïve-Bayes method. FIG. 39 is a flowchart of a method of generating a prediction sets for an individual using a Naïve-Bayes method in accordance with an embodiment.

Referring to block 3908, a plurality of a priori frequency distributions may be generated and stored. In order to generate one or more scaled conditional probabilities, the a priori distributions are retrieved from memory.

At block 3910, scaled conditional probabilities of possible labels are determined given a feature set. In the illustrative embodiment, probabilistic classifier 3410 determines scaled conditional probabilities of possible labels. Scaled conditional probabilities may be computed based on stored probabilities, which may be accessed and retrieved. For example, in an illustrative embodiment, probability distribution store 3339 stores a plurality of probability distributions which may be accessed, and which will allow for the computation of:

$$p(f_j | L_k)$$

Where
  $p(f_j | L_k)$ represents the conditional probability of feature $f_j$ given characteristic value $L_k$
  $L_k$ represents a particular label value in the domain of possible label values of the characteristic L being predicted
  $f_j$ represents a particular feature The determination of scaled conditional probabilities (block 3910) may include methods to calculate the conditional probability of any possible label given the extracted set of features. This computation may be done using a Naïve Bayes approximation shown below. The Naïve Bayes approximation assumes that each of the features are conditionally independent for performance benefits. Other embodiments may use a different conditional probability computation that does not make this assumption.

$$p'(L_k | f_1, \ldots, f_m) = p(L_k) \prod_{j=1}^{m} p(f_j | L_k)$$

Where
  $p'(L_k | f_1, \ldots, f_m)$ represents the conditional probability of seeing a characteristic label $L_k$ given a set of features $f_1, \ldots, f_m$
  $L_k$ represents a particular label value in the domain of possible label values of the characteristic L being predicted
  $f_j$ represents a particular feature where there are m possible features The computation of conditional probability (block 3910) may also include methods for scaling of all computed probabilities of the characteristic L on a scale of 0 to 1 such that:

$$Y \sum_{k=1}^{q} p'(L_k | f_1, \ldots, \ldots, f_m) = 1$$

Where

Y represents a scaling factor such that the sum of conditional probabilities can be scaled to 1 q represents the size of the domain of values for characteristic L

The computation of conditional probability (block 3910) may also methods for computing a running sum of the scaled probabilities as follows:

$$p''(L_k | f_1, \ldots, f_m) = Y \sum_{j=1}^{k} p'(L_j | f_1, \ldots, f_m)$$

Where $p''(L_k | f_1, \ldots, f_m)$ represents a running sum conditional probability The labels $L_1$ to $L_q$ for the characteristic are consistently ordered for all documents processed.

Referring to block 3920, random number generator 3426 will generate a series of random numbers whose values lie between 0 and 1. The number of random numbers generated depend on the degree of smoothing required by the system.

Referring to block 3930, Monte Carlo Method 3430 will generate a label for each random number generated as follows:

$$G_j = L_k \text{ such that } p''(L_k | f_1, \ldots, f_m) \geq r_j > p''(L_{k-1} | f_1, \ldots, f_m)$$

Where $G_j$ represents the generated label for random number $r_j$ j ranges from 1 to n where n is the number or random numbers generated Referring to block 3940, the n predicted characteristics are stored in a persistent memory such as a data repository.

In one embodiment, a plurality of stored prediction sets may be used to determine an advertisement image for display on a particular display device viewed by a defined group of individuals. The advertisement image is then displayed on the particular display device. Specifically, it is often desirable to display a first advertisement on a first display device located in a first section of a venue, based on characteristics of the people present in the first section of the venue, display a second advertisement on a second display device located in a second section of a venue, based on characteristics of the people present in the second section of the venue, etc.

In an illustrative embodiment, suppose that the management of a venue such as a stadium wishes to display targeted advertisements on different display devices viewed by different groups of individuals within the venue during a live event such as a sports event. In accordance with an embodiment, systems and methods described above may be employed to generate, for each individual seated at the venue (stadium), a prediction set containing a plurality of test values (or prediction values) for income level (or for as many individuals as possible or practical). Prediction sets may be generated based on individuals' first names, last names, place of residence, and/or other known characteristics. The prediction sets are stored.

Figure 40:
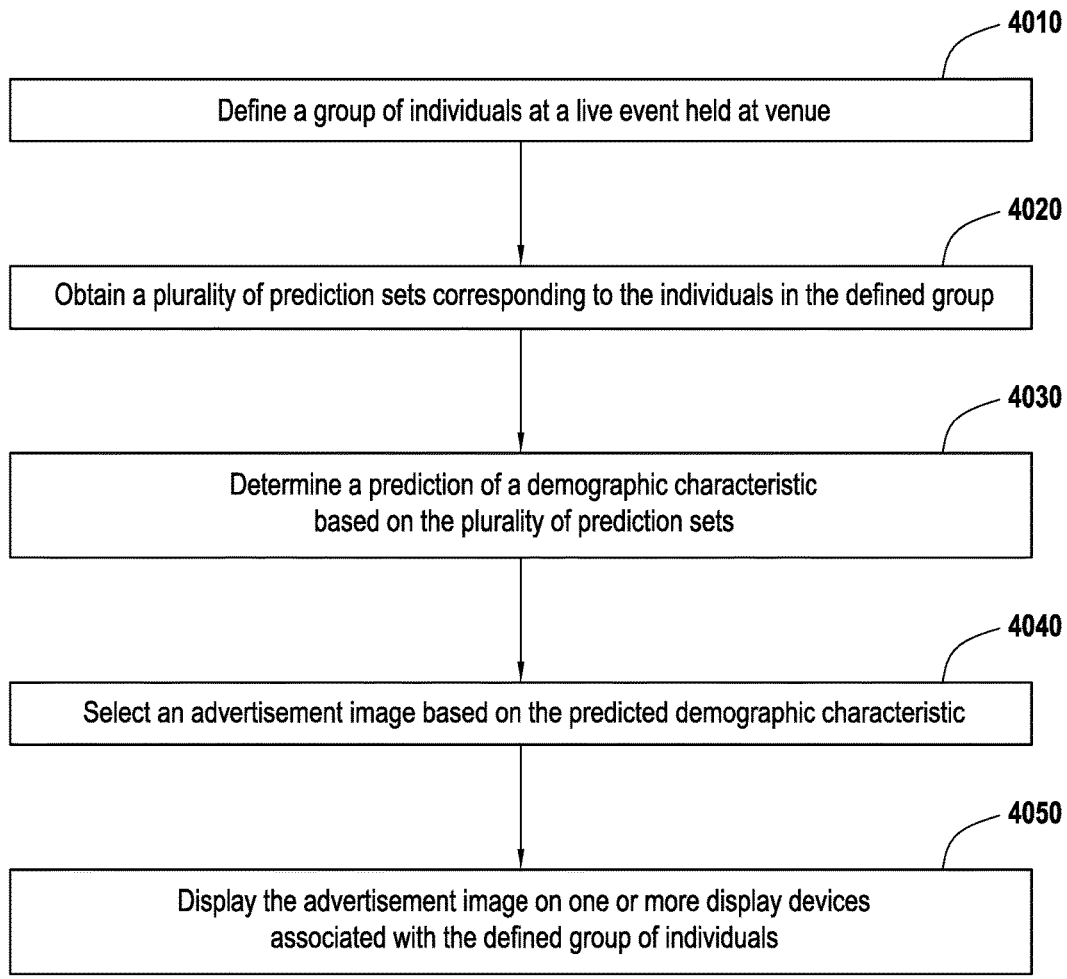
FIG. 40 is a flowchart of a method of selecting an advertisement image based on a plurality of prediction sets in accordance with an embodiment.
Figure 41:
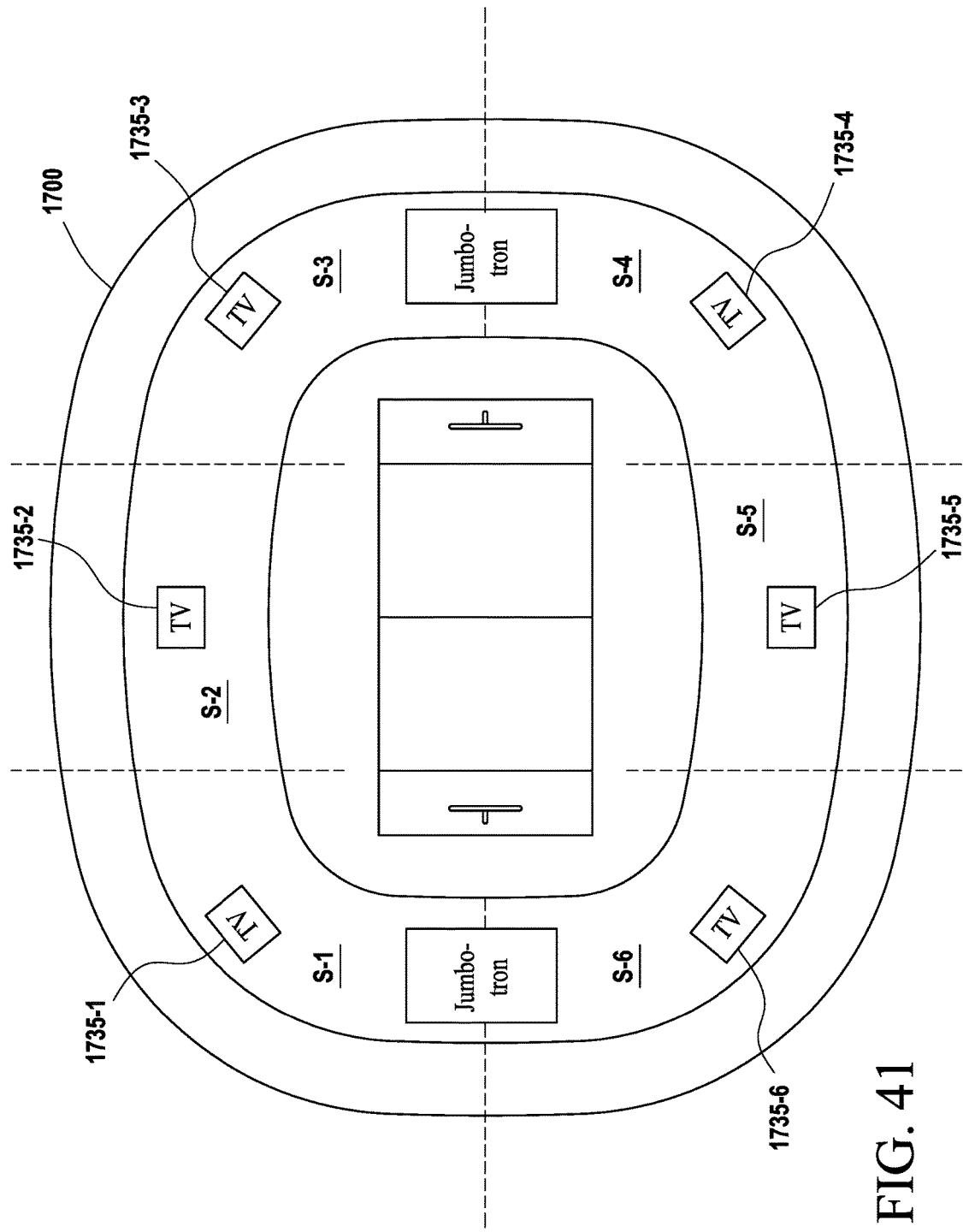
FIG. 41 shows a venue for a live event in accordance with an embodiment.

FIG. 40 is a flowchart of a method of selecting and displaying an advertisement image based on stored prediction sets in accordance with an embodiment. At step 4010, a group of individuals at a live event held at a venue is defined. For example, various sections of seats in the stadium may be defined and the individuals seated in a selected section may be defined as a group. In an illustrative embodiment shown in FIG. 41, multiple sections of seats in stadium 1700 are defined. Specifically, sections S-1, S-2, S-3, S-4, S-5, and S-6 are defined within the stadium. Each section has a plurality of seats. Accordingly, during a live event held at the stadium, a plurality of individuals are seated in each section.

Suppose now that a group referred to as Group S-1 is defined as including the individuals seated in Section S-1. For example, analysis module 3390 may identify a plurality of individuals belonging to the Group S-1 based on ticket sales or other information. Alternatively, facial recognition technology or other methods may be used.

At step 4020, a plurality of prediction sets corresponding to the individuals in the defined group is obtained. In the illustrative embodiment, it is supposed that prediction sets predicting income level are generated and stored for respective individuals seated throughout the stadium during the live event, and therefore, analysis module 3390 may retrieve a plurality of prediction sets corresponding to the individuals in Group S-1 from storage. Alternatively, prediction sets may be generated only for individuals seated in section S-1 using systems and methods described above.

At step 4030, a prediction of a demographic characteristic is determined based on the plurality of prediction sets. In one embodiment, analysis module 3390 may determine an average test result value by averaging the test results in the prediction sets associated with Group S-1, and determine a predicted income level corresponding to the average test result value based on merged probability distribution 3700, for example. Suppose, for example, that the predicted income level for the individuals seated in section S-1 (based on the average test result value) is the $50,001 to $80,000 income level.

At step 4040, an advertisement image is selected based on the predicted demographic characteristic. For example, analysis module 3390, or display manager 1660 may select an advertisement image based on the predicted income level for Group S-1. For example, an advertisement for an automobile or beverage preferred by people having the predicted income level may be selected.

At step 4050, the advertisement image is displayed on one or more display devices associated with the defined group of individuals. A particular display device in the venue that is associated with the defined group of individuals by proximity, preference, etc., may be selected. In the illustrative embodiment, at least one display device is located in each section of stadium 1700 and is visible to most or all of the people in the section. Specifically, TV 1735-1 is located in section S-1, TV 1735-2 is located in section S-2, TV 1735-3 is located in section S-3, TV 1735-4 is located in section S-4, TV 1735-5 is located in section S-5, and TV 1735-6 is located in section S-6. A section may include more than one display device.

In the illustrative embodiment, display manager 1660 displays the selected advertisement on TV 1735-1, which is located in section S-1 of stadium 1700, and which is therefore proximate to and visible to most or all of the individuals in Group S-1.

In accordance with another embodiment, systems and methods described herein may be used to generate a plurality of prediction sets for a plurality of individuals at a venue, and determine a predicted demographic feature associated with the plurality of individuals based on the plurality of prediction sets. An advertisement image associated with a tagged advertisement campaign may be selected based on the predicted feature. One or more items of social media content associated with the plurality of individuals may be obtained and tagged. For example, items of social media content (e.g., tweets, Facebook posts, etc.) may be obtained from social network pages associated with an individual in the group, tagged, and added to a feed. If the tag attached to a particular one of the items of social media content matches the tag associated with the advertisement image, then the particular item of social media content and the advertisement image are displayed simultaneously on a display device associated with the group of individuals (e.g., a display device at a location in a venue associated with the plurality of individuals). In one embodiment, a visual instance adapted to select and display the particular item of tagged social media content and the tagged advertisement image may be generated and used to display the particular item of social media content and the advertisement image.

In other embodiments, data related to prediction sets may be stored in other forms. For example, in another embodiment, individual data objects may be used to organize and store data. For example, an individual data store may be created in storage to store a plurality of individual data objects, where, for example, each individual data object may include data defining an individual, second data defining a prediction set (that includes a plurality of test results), etc. A prediction manager component may be configured to generate prediction sets based on the data relating to each individual.

Figure 42:
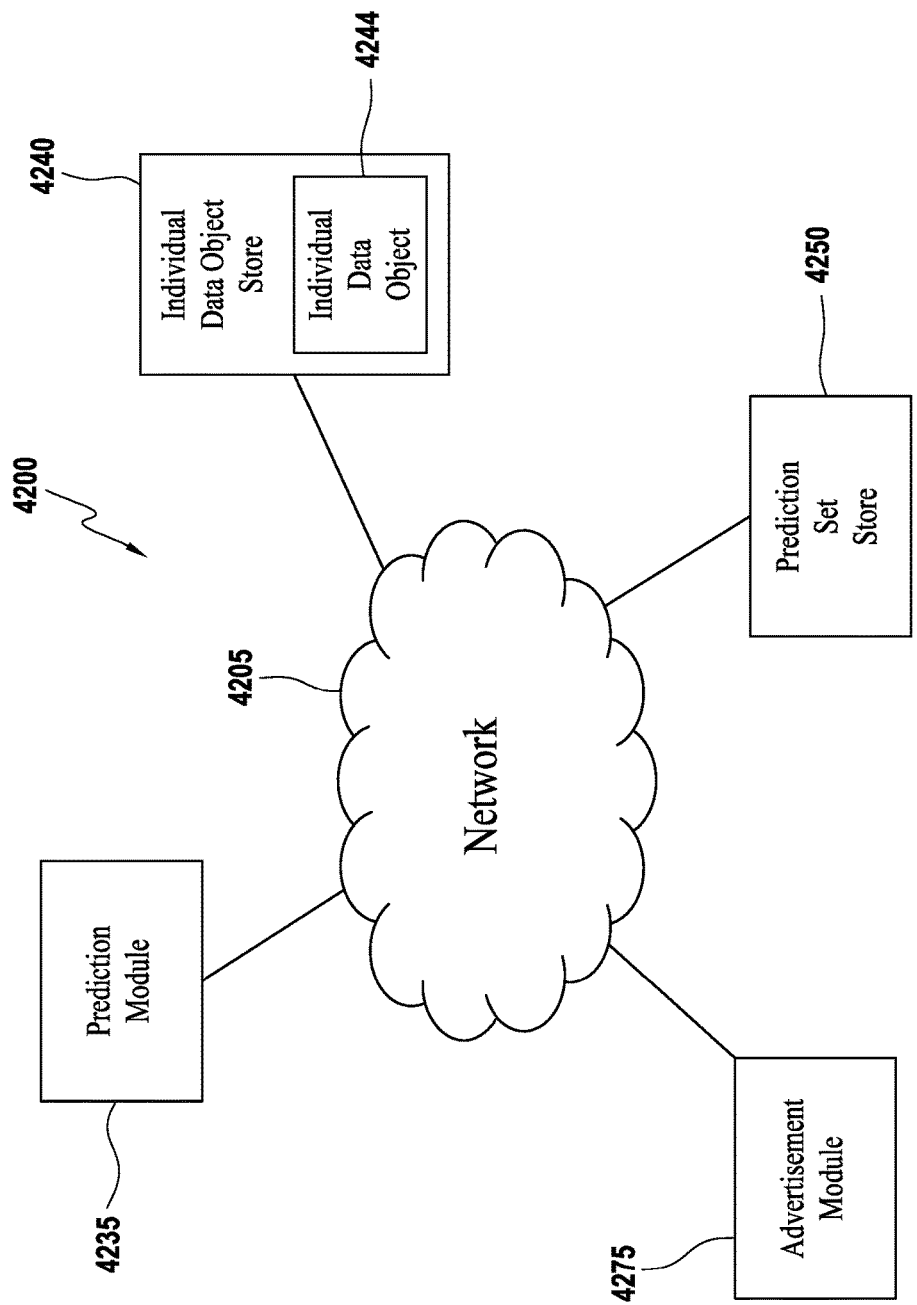
FIG. 42 shows a system in accordance with an embodiment.

FIG. 42 shows a system in accordance with another embodiment. System 4200 includes a network 4205, a prediction module 4235, an individual data object store 4240, a prediction set store 4250, and an advertisement module 4275.

Thus in one embodiment, individual data object store 4240 is configured to store a plurality of individual data objects each defining features of a respective individual, such as individual data object 4244. Prediction set store 4250 is configured to store a plurality of prediction sets. Prediction module 4235 is configured to identify an individual having a plurality of first features, generate an individual data object comprising data specifying the first features, store the individual data object in the individual data object store, and for each first feature among the plurality of first features, determine a respective probability distribution indicating, for each respective second feature among a plurality of second features, a probability that a person having the respective second feature has the first feature, thereby generating a plurality of probability distributions. Prediction module 4235 also uses a probabilistic classifier to generate a merged probability distribution based on the plurality of probability distributions, uses a Monte Carlo method to generate a prediction set based on the merged probability distribution, the prediction set including a plurality of prediction values for the individual, each respective prediction value being associated with one of the plurality of second features, and stores the prediction set in prediction set store 4250. Advertisement module 4275 accesses the stored prediction sets and selects and displays advertisements based on the prediction sets.

Any one of a number of different types of probabilistic classifiers may be used. In one embodiment, the probabilistic classifier includes a Naive-Bayes method.

In another embodiment, the prediction module is further configured to define a scale comprising a plurality of numerical ranges, based on the merged probability distribution, and associate each of the plurality of numerical ranges of the scale with a respective second feature, based on the merged probability distribution.

Any one of a number of different types of Monte Carlo methods may be used. In one embodiment, the Monte Carlo method is further configured to generate a plurality of random numbers, and generate a prediction set associated with a particular individual based on the plurality of random numbers.

In another embodiment, the Monte Carlo method is further configured to perform the following series of steps for each random number among the plurality of random numbers. The Monte Carlo method identifies, from among the plurality of numerical ranges, a particular numerical range associated with the respective random number, identifies a second feature associated with the particular numerical range, and associates the respective random number with the identified second feature.

In another embodiment, a system includes a processor, a memory communicatively coupled to the processor, and an individual feature store, communicatively coupled to the processor, configured to store a plurality of individual feature objects, an individual object comprising data indicating one or more features of an individual. The system also includes a prediction manager component communicatively coupled to the memory, the prediction manager component configured to receive information related to a plurality of individuals, and use a probabilistic classifier and a Monte Carlo method to generate a plurality of prediction sets associated with the plurality of individuals, based on the information, wherein each prediction set comprising a plurality of test results. The system also includes an advertisement module, communicatively coupled to the memory, configured to select an advertisement image based on the plurality of prediction sets, and display the advertisement image on a display device associated with the plurality of individuals.

In accordance with another embodiment, a system is provided. The system includes a feed module adapted to generate a feed comprising a plurality of items of social media content. The system also includes a template store adapted to store a plurality of templates, wherein each template includes a respective data source generator and a settings module. The system also includes a visual generation manager adapted to provide a first user interface displaying a plurality of icons each representing a respective one of the plurality of templates, receive from the user a selection of a template from the plurality of templates, provide a second user interface prompting the user to specify one or more settings, receive from the user settings information specifying the one or more settings, generate a visual instance comprising the settings information and a data source, wherein the data source comprises code adapted to render at least a portion of a visual based on the settings information and on one or more items of social media content selected from the feed, and store the visual instance in a memory. The system further includes a visual instance loader adapted to cause the visual instance to render a visual based on the settings information and on one or more items of social media content selected from the feed.

In one embodiment, the feed module obtains items of social media content including one of a message, a comment, a photo, and a video posted to an online social networking service.

In another embodiment, the plurality of templates include a first template for generating a first visual instance adapted to generate a first visual that includes a line graph of social media activity, a second template for generating a second visual instance adapted to generate a second visual that includes a heat map of social media activity, and a third template for generating a third visual instance adapted to generate a third visual that includes a sentiment analysis of social media activity.

In another embodiment, the system also includes at least one processor adapted to add to an item of social media content a tag defining a characteristic of the item of social media content.

In another embodiment, the at least one processor is further adapted to identify an individual attending a live event taking place in a venue, select an item of social media content associated with the individual, the item of social media content having a first tag, select an advertisement image having a second tag that matches the first tag, generate a visual instance adapted to display the selected item of social media content and the advertisement image simultaneously, and cause the visual instance to display the selected item of social media content and the advertisement image simultaneously on a display device located in the venue.

In another embodiment, the venue is one of a stadium, a conference center, a retail store, and a commercial mall.

In another embodiment, a method is provided. An individual having a plurality of first features is identified. For each first feature among the plurality of first features, a respective probability distribution indicating, for each respective second feature among a plurality of second features, a probability that a person having the respective second feature has the first feature, thereby generating a plurality of probability distributions, is determined. A probabilistic classifier is used to generate a merged probability distribution based on the plurality of probability distributions. A Monte Carlo method is used to generate a prediction set based on the merged probability distribution, the prediction set including a plurality of prediction values for the individual, each respective prediction value being associated with one of the plurality of second features. The prediction set is stored in a memory.

In another embodiment, a plurality of individuals attending a live event at a venue is identified. A plurality of prediction sets associated with the plurality of individuals is generated. An advertisement image is selected based on the plurality of prediction sets. The advertisement image is displayed on a display device associated with the plurality of individuals.

While systems, apparatus and methods for predicting demographic data as described herein are used in illustrative embodiments to generate predictions of demographic data for individuals in a venue such as a stadium, and to select and display advertisements to such individuals, systems, apparatus and methods for predicting demographic data as described herein may be used for other purposes. For example, systems, apparatus and methods described herein may be used to predict demographic data for individuals in a conference center, a public space, and a commercial mall, a retail store, a kiosk, etc., and to display advertisements to such individuals. Alternatively, systems, apparatus and methods described herein may be used to predict demographic data for individuals who visit a web site accessible over the Internet, for individuals who order products from a particular company, etc., and to display advertisements to such individuals.

In other embodiments, systems, apparatus, and methods described herein may be used to predict other types of data (non-demographic in nature) based on other known information. For example, systems, apparatus and methods similar to those described herein may be used to analyze an object (for example, a product, a company, etc.) that is not a human individual. Thus, in one embodiment, an object having a plurality of first features is identified. For each first feature among the plurality of first features, a respective probability distribution indicating, for each respective second feature among a plurality of second features, a probability that an object having the respective second feature has the first feature, thereby generating a plurality of probability distributions, is determined. A probabilistic classifier is used to generate a merged probability distribution based on the plurality of probability distributions. A Monte Carlo method is used to generate a prediction set based on the merged probability distribution, the prediction set including a plurality of prediction values for the object, each respective prediction value being associated with one of the plurality of second feature, The prediction set is stored in a memory.

Embodiments also may be directed to computer program products comprising software stored on any computer-useable medium. Such software, when executed in one or more data processing device, causes a data processing device(s) to operate as described herein.

Embodiments of the invention employ any computer-useable or readable medium. Examples of computer-useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein.

The breadth and scope of the present invention should not be limited by any of the above-described exemplary embodiments or any actual software code with the specialized control of hardware to implement such embodiments, but should be defined only in accordance with the following claims and their equivalents.

The invention claimed is:

1. A method of configuring a plurality of display devices communicatively coupled to a distributed local area communication network, the method comprising:
   obtaining images of a plurality of individuals at an event location, wherein the local area communication network is at the event location:
   identifying a plurality of individual data objects in a data store, each of the plurality of individual data objects defining features of a respective set of the plurality of individuals using facial recognition of images obtained of the plurality of individuals;
   identifying a data object of the plurality of individual data objects, the data object identifying a first set of individuals having a first feature;
   selecting a plurality of content tags based on the first feature;
   tagging a plurality of content items with one or more of the plurality of content tags;
   identifying a first content item of the plurality of content items, the first content item being associated with a first content tag, the first content tag being associated with the first set of individuals;
   selecting a second content item based on the first content tag;
   generating a display layout for the first and second content items;
   selecting a display device among the plurality of the display devices communicatively coupled to the distributed local area communication network, wherein a location of the display device is associated with the respective set of the plurality of individuals;
   transmitting, to the selected display device, the first and second content item, the display layout, and a display time;
   configuring, over the distributed communication network, a first FPGA chip in the selected display device to display the first and second content items having a look and feel of the generated display layout;
   configuring a second FPGA chip in the selected display device to display the second content item for the display time,
   wherein the selecting of the plurality of content tags comprises:
      for the first feature, determining a respective probability distribution indicating, for each of a respective content tag among the plurality of content tags, a probability that a set of individuals associated with a content tag has the first feature, thereby generating a plurality of probability distributions;
      using a probabilistic classifier to generate a merged probability distribution based on the plurality of probability distributions; and
      using a plurality of prediction sets to select the plurality of content tags, the plurality of content tags being associated with the first set of individuals, and
   wherein the method further comprises, using a Monte Carlo method to generate the plurality of prediction sets based on the merged probability distribution, the prediction sets including a plurality of prediction values for the first set of individuals, each respective prediction value being associated with one of the plurality of content tags.

2. The method of claim 1, further comprising:
   determining that a plurality of new content items have been added to the plurality of content items;
   selecting an additional content item from the plurality of new content items based on the first content tag;
   modifying the display layout to include the additional content item; and
   transmitting, to the display device, the additional content item, the modified display layout, and a second display time,
   wherein, the display device is further configured to display the additional content item using the modified display layout, the additional content item being displayed for the second display time.

3. The method of claim 1, wherein the first feature comprises a hashtag.

4. The method of claim 1, wherein the tagging of the plurality of content items with the one or more of the plurality of content tags comprises tagging of the plurality of content items based on text included in one of the content items.

5. The method of claim 1, wherein the tagging of the plurality of content items with the one or more of the plurality of content tags comprises tagging of the plurality of content items based on an image included in one of the content items.

6. A system of a plurality of display devices communicatively coupled to a distributed local area communication network, the system comprising:
   a display device of the plurality of display devices adapted to display text and images;
   a memory adapted to store instructions; and
   one or more devices adapted to execute the instructions, which, when executed by the one or more devices, cause the one or more devices to perform operations comprising:

obtaining images of a plurality of individuals at an event location, wherein the local area communication network is at the event location;

identifying a plurality of individual data objects in a data store, each of the plurality of individual data objects defining features of a respective set of the plurality of individuals using facial recognition of images of the plurality of individuals;

identifying a data object of the plurality of individual data objects, the data object identifying a first set of individuals having a first feature;

selecting a plurality of content tags based on the first feature;

tagging a plurality of content items with one or more of the plurality of content tags;

identifying a first content item of the plurality of content items, the first content item being associated with a first content tag, the first content tag being associated with the first set of individuals;

selecting a second content item based on the first content tag;

generating a display layout for the first and second content items;

selecting a display device among the plurality of the display devices communicatively coupled to the distributed local area communication network, wherein a location of the display device is associated with the respective set of the plurality of individuals;

transmitting, to the selected display device, the first and second content item, the display layout, and a display time;

configuring, over the distributed communication network, a first FPGA chip in the selected display device to display the first and second content items having a look and feel of the generated display layout;

configuring a second FPGA chip in the selected display device to display the second content item for the display time, wherein the selecting of the plurality of content tags comprises:

for the first feature, determining a respective probability distribution indicating, for each of a respective content tag among the plurality of content tags, a probability that a set of individuals associated with a content tag has the first feature, thereby generating a plurality of probability distributions;

using a probabilistic classifier to generate a merged probability distribution based on the plurality of probability distributions; and using a plurality of prediction sets to select the plurality of content tags, the plurality of content tags being associated with the first set of individuals, and wherein the method further comprises, using a Monte Carlo method to generate the plurality of prediction sets based on the merged probability distribution, the prediction sets including a plurality of prediction values for the first set of individuals, each respective prediction value being associated with one of the plurality of content tags.

7. The system of claim 6, wherein the first feature comprises a hashtag.

8. The system of claim 6, wherein the tagging of the plurality of content items with the one or more of the plurality of content tags comprises tagging of the plurality of content items based on text included in one of the content items.

9. The system of claim 6, wherein the tagging of the plurality of content items with the one or more of the plurality of content tags comprises tagging of the plurality of content items based on an image included in one of the content items.

10. The system of claim 6, wherein the one or more processors are further adapted to:

determine that a plurality of new content items have been added to the plurality of content items;

select an additional content item from the plurality of new content items based on the first content tag;

modify the display layout to include the additional content item; and transmit, to the display device, the additional content item, the modified display layout, and a second display time, wherein, the display device is further configured to display the additional content item using the modified display layout, the additional content item being displayed for the second display time.

11. A non-transitory computer-readable medium storing software comprising instructions executable by one or more computers which, upon said execution, cause the one or more computers to perform operations of configuring a plurality of display devices communicatively coupled to a distributed local area communication network, the operation comprising:

obtaining images of a plurality of individuals at an event location, wherein the local area communication network is at the event location;

identifying a plurality of individual data objects in a data store, each of the plurality of individual data objects defining features of a respective set of the plurality of individuals using facial recognition of images of the plurality of individuals;

identifying a data object of the plurality of individual data objects, the data object identifying a first set of individuals having a first feature;

selecting a plurality of content tags based on the first feature;

tagging a plurality of content items with one or more of the plurality of content tags;

identifying a first content item of the plurality of content items, the first content item being associated with a first content tag, the first content tag being associated with the first set of individuals;

selecting a second content item based on the first content tag;

generating a display layout for the first and second content items;

selecting a display device among the plurality of the display devices communicatively coupled to the distributed local area communication network, wherein a location of the display device is associated with the respective set of the plurality of individuals;

transmitting, to the selected display device, the first and second content item, the display layout, and a display time;

configuring, over the distributed communication network, a first FPGA chip in the selected display device to display the first and second content items having a look and feel of the generated display layout;

configuring a second FPGA chip in the selected display device to display the second content item for the display time, wherein the selecting of the plurality of content tags comprises:

for the first feature, determining a respective probability distribution indicating, for each of a respective content tag among the plurality of content tags, a probability that a set of individuals associated with a content tag has the first feature, thereby generating a plurality of probability distributions;

using a probabilistic classifier to generate a merged probability distribution based on the plurality of probability distributions; and using a plurality of prediction sets to select the plurality of content tags, the plurality of content tags being associated with the first set of individuals, wherein the operations further comprise, using a Monte Carlo method to generate the plurality of prediction sets based on the merged probability distribution, the prediction sets including a plurality of prediction values for the first set of individuals, each respective prediction value being associated with one of the plurality of content tags.

12. The non-transitory computer-readable medium of claim 11, wherein the operations further comprise:

determining that a plurality of new content items have been added to the plurality of content items;

selecting an additional content item from the plurality of new content items based on the first content tag; and modifying the display layout to include the additional content item; and transmitting, to the display device, the additional content item, the modified display layout, and a second display time, wherein, the display device is further configured to display the additional content item using the modified display layout, the additional content item being displayed for the second display time.

13. The non-transitory computer-readable medium of claim 11, wherein the first feature comprises a hashtag.

14. The non-transitory computer-readable medium of claim 11, wherein the tagging of the plurality of content items with the one or more of the plurality of content tags comprises tagging of the plurality of content items based on text included in one of the content items.

* * * * *